United States Patent
Rosenberg et al.

(10) Patent No.: US 12,197,676 B2
(45) Date of Patent: Jan. 14, 2025

(54) ENVIRONMENTAL COMPENSATION ELEMENT OF A FORCE-SENSING MEMBRANE

(71) Applicant: Sensel, Inc., Sunnyvale, CA (US)

(72) Inventors: Ilya Daniel Rosenberg, Mountain View, CA (US); Stephanie Jeanne Oberg, Sunnyvale, CA (US); Scott Gregory Isaacson, Mountain View, CA (US); Elliott Chen Wu, Sunnyvale, CA (US); Darren Lochun, Mountain View, CA (US); Alexander Meagher Grau, Durham, NC (US); Jacob Terracina, Los Altos Hills, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 17/492,470

(22) Filed: Oct. 1, 2021

(65) Prior Publication Data

US 2022/0137744 A1 May 5, 2022

Related U.S. Application Data

(60) Provisional application No. 63/108,807, filed on Nov. 2, 2020.

(51) Int. Cl.
*G06F 3/041* (2006.01)
*G06F 3/045* (2006.01)

(52) U.S. Cl.
CPC ............ *G06F 3/0418* (2013.01); *G06F 3/045* (2013.01)

(58) Field of Classification Search
None
See application file for complete search history.

(56) References Cited

U.S. PATENT DOCUMENTS

| | | | | |
|---|---|---|---|---|
| 6,016,140 A * | 1/2000 | Blouin | ................... | G06F 3/045 178/18.05 |
| 6,505,522 B1 * | 1/2003 | Wilssens | ............. | A61B 5/1036 73/862.51 |
| 11,016,610 B2 | 5/2021 | Moscovich et al. | | |
| 2009/0066673 A1* | 3/2009 | Molne | ................... | G06F 3/0418 345/178 |
| 2009/0260898 A1* | 10/2009 | Jin | ......................... | G06F 3/0418 178/18.03 |

(Continued)

FOREIGN PATENT DOCUMENTS

CN           105900046 B * 10/2018 ............. G01L 1/146

OTHER PUBLICATIONS

Perabo, Volume Resistivity vs. Volume Conductivity vs. Surface Resistivity, May 16, 2013, Caplinq Blog, https://www.caplinq.com/blog/linqstat-vs-resistivity-vs-volume-conductivity-vs-surface-resistivity_267/, p. 1 (Year: 2013).*

*Primary Examiner* — Kirk W Hermann

(57) ABSTRACT

The disclosed subject matter provides structures, devices, and methods for environmental compensation of temperature and humidity impacts on resistive force or touch sensor devices. Accordingly, various disclosed embodiments can be configured to determine sheet resistance of a device comprising force-sensing membrane and to apply an environmental compensation factor based on the sheet resistance. Further disclosed embodiments are directed to devices, systems and methods associated with disclosed environmental compensating elements and methods related thereto.

9 Claims, 25 Drawing Sheets

(56) References Cited

U.S. PATENT DOCUMENTS

| | | | |
|---|---|---|---|
| 2010/0214231 A1* | 8/2010 | D'Souza | G06F 3/0416 |
| | | | 345/173 |
| 2011/0080347 A1* | 4/2011 | Steeves | G06F 3/0416 |
| | | | 345/173 |
| 2011/0134069 A1* | 6/2011 | Shen | G06F 3/0418 |
| | | | 345/174 |
| 2011/0157083 A1* | 6/2011 | Hershman | G06F 3/045 |
| | | | 345/174 |
| 2014/0216174 A1* | 8/2014 | Aberg | G06F 3/041 |
| | | | 73/862.628 |
| 2015/0091858 A1* | 4/2015 | Rosenberg | G06F 3/04144 |
| | | | 345/174 |
| 2016/0055937 A1* | 2/2016 | Hakii | C07D 401/14 |
| | | | 345/174 |
| 2016/0124573 A1* | 5/2016 | Rouaissia | G06F 3/04182 |
| | | | 345/174 |
| 2016/0139717 A1* | 5/2016 | Filiz | G01L 1/205 |
| | | | 345/173 |
| 2017/0075489 A1* | 3/2017 | Jääskelä | G06F 3/03545 |
| 2017/0075496 A1* | 3/2017 | Rosenberg | G06F 3/04162 |
| 2017/0336891 A1* | 11/2017 | Rosenberg | G06F 3/0412 |
| 2018/0059866 A1* | 3/2018 | Drake | G06F 3/0446 |
| 2018/0107378 A1* | 4/2018 | Rosenberg | G06F 3/04883 |
| 2018/0299997 A1 | 10/2018 | Isaacson et al. | |
| 2018/0319016 A1* | 11/2018 | Ibrocevic | G01L 1/205 |
| 2019/0179469 A1* | 6/2019 | Quinn | G06F 3/0416 |
| 2020/0205527 A1* | 7/2020 | Maezawa | A61B 5/6807 |
| 2021/0200403 A1* | 7/2021 | Nam | G06F 3/0445 |

* cited by examiner

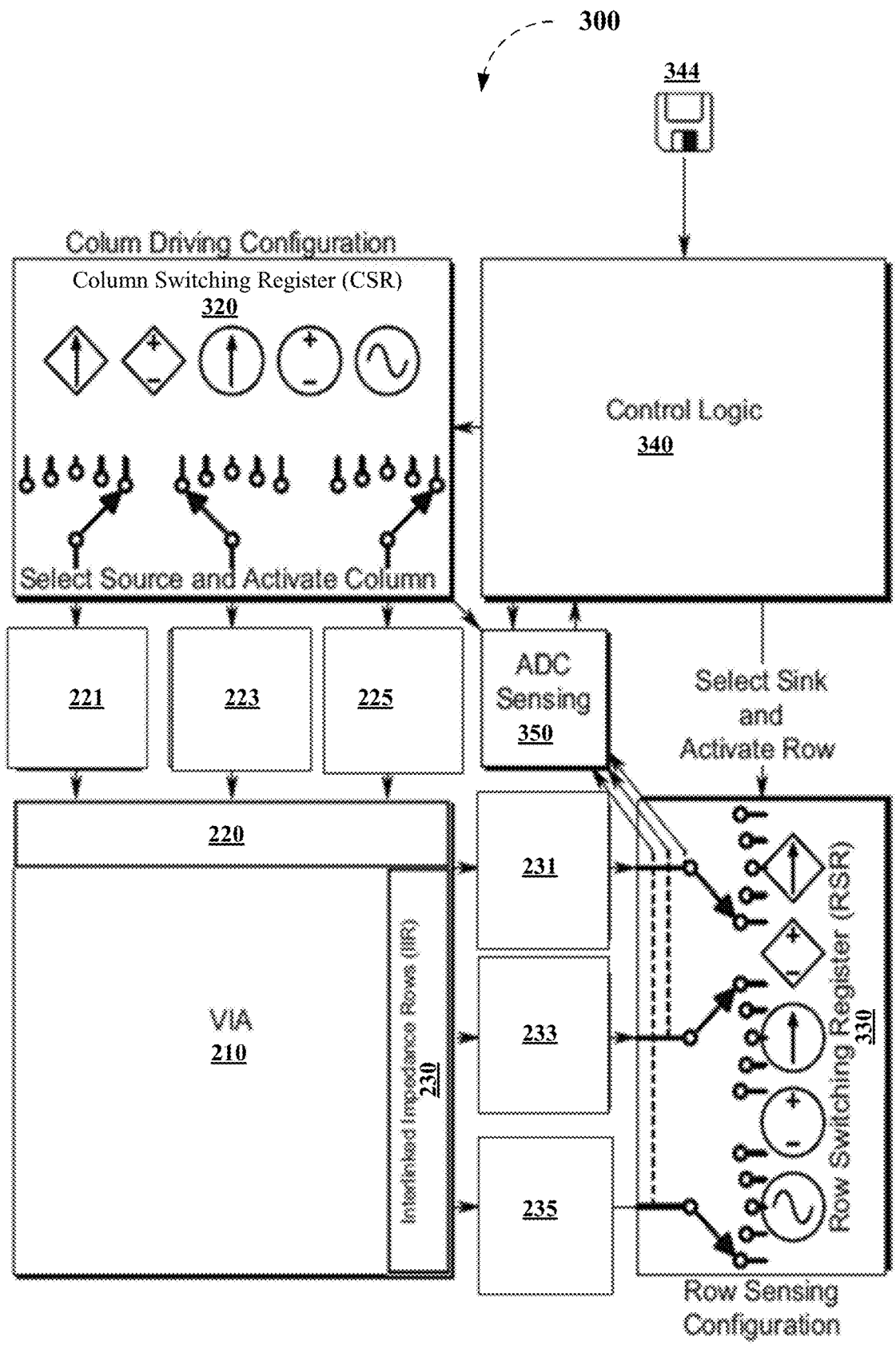
AMENDED
FIG. 3

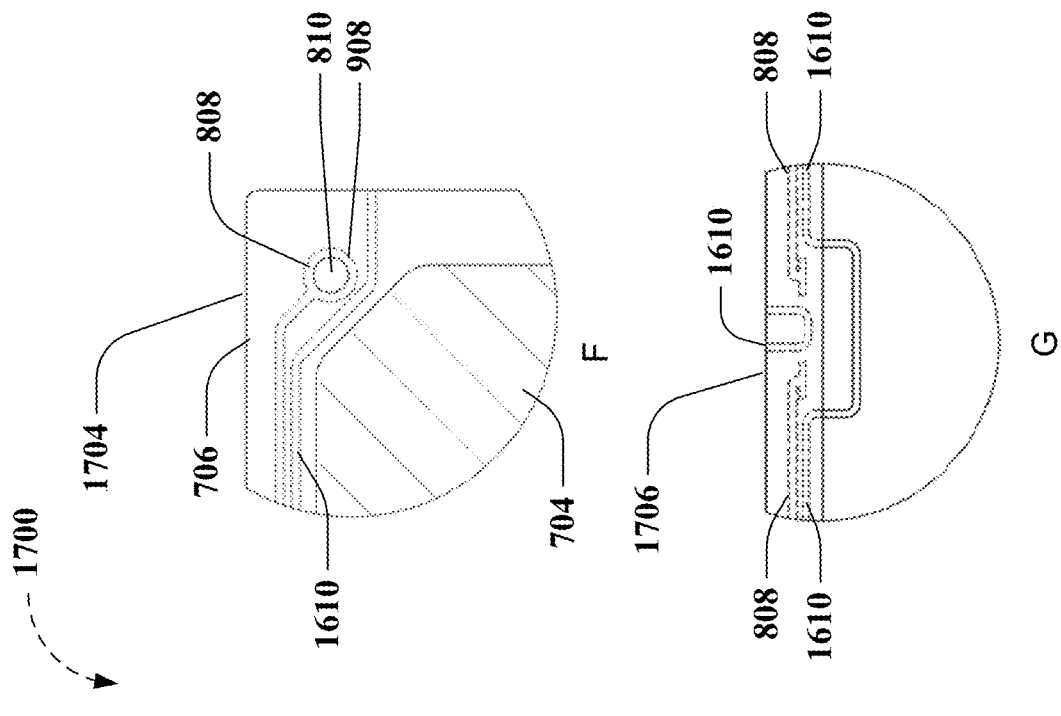
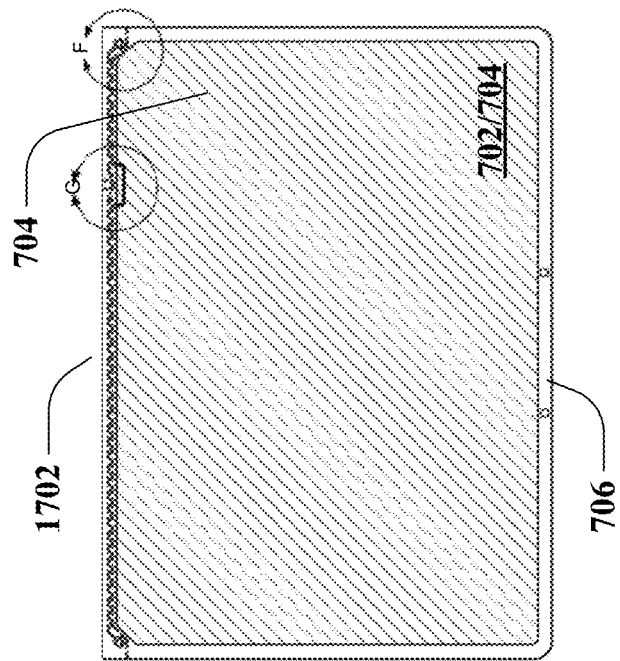
FIG. 17

2200

2202 — DETERMINE ONE OR MORE ELECTRICAL CHARACTERISTIC ASSOCIATED WITH SHEET RESISTANCE OF A FORCE-SENSING MEMBRANE (FSM) OF A DEVICE FOR USE IN DETERMINATION OF AN ENVIRONMENTAL COMPENSATION FACTOR TO A MEASUREMENT OF A FORCE APPLIED TO THE FSM

2204 — DETERMINE A CORRECTION FACTOR BASED AT LEAST IN PART ON A COMPARISON OF THE SHEET RESISTANCE OF THE FSM WITH A SHEET RESISTANCE OF THE FSM DETERMINED DURING MANUFACTURE OF THE DEVICE AND STORED IN A COMPUTER-READABLE MEMORY ASSOCIATED WITH THE DEVICE

2206 — CORRECT A CALIBRATION TABLE COMPRISING POSITION AND FORCE INFORMATION ASSOCIATED WITH THE FSM OF THE DEVICE WITH THE CORRECTION FACTOR TO CREATE A COMPENSATED CALIBRATION TABLE AS THE ENVIRONMENTAL COMPENSATION FACTOR

2208 — DETERMINE ONE OR MORE OF FORCE APPLIED OR POSITION OF THE FORCE APPLIED FOR A CONTACT WITH THE FSM OF THE DEVICE BASED AT LEAST IN PART ON THE COMPENSATED CALIBRATION TABLE AS THE ENVIRONMENTAL COMPENSATION FACTOR

2210 — STORE ONE OR MORE OF THE ELECTRICAL CHARACTERISTIC ASSOCIATED WITH THE SHEET RESISTANCE, THE SHEET RESISTANCE OF THE FSM DETERMINED DURING MANUFACTURE OF THE DEVICE, THE CALIBRATION TABLE, THE CORRECTION FACTOR, OR THE COMPENSATED CALIBRATION TABLE IN THE COMPUTER-READABLE MEMORY ASSOCIATED WITH THE DEVICE

2212 — EXECUTE CONTROL LOGIC STORED IN THE COMPUTER-READABLE MEMORY ASSOCIATED WITH THE DEVICE, WHEREIN THE CONTROL LOGIC IS CONFIGURED TO DETERMINE ONE OR MORE OF THE CORRECTION FACTOR OR THE COMPENSATED CALIBRATION TABLE AS THE ENVIRONMENTAL COMPENSATION FACTOR

FIG. 22

ENVIRONMENTAL COMPENSATION ELEMENT OF A FORCE-SENSING MEMBRANE

CROSS REFERENCE TO RELATED APPLICATIONS

This application claims priority to U.S. Provisional Patent Application Ser. No. 63/108,807, titled: "ENVIRONMENTAL COMPENSATION ELEMENT," filed Nov. 2, 2020, the disclosure of which is hereby incorporated herein by reference in its entirety.

TECHNICAL FIELD

The subject disclosure is directed to resistive touch sensor devices and, more specifically, to structures, devices, and methods for environmental compensation of touch sensor and other related devices.

BACKGROUND

Resistive touch sensor devices are generally constructed such that a conductive layer is deposited on a flexible membrane, suspended above groups of sensors (e.g., drive sensor electrodes and sense sensor electrodes). Resistive touch sensor devices generally rely on the same basic principles of using the conductive layer (e.g., a force sensitive/sensing resistor (FSR) material) to create an electrical pathway between drive sensor electrodes and sense sensor electrodes when the flexible membrane is deflected or when the flexible membrane is depressed.

To perform touch detection, a bias can be applied across adjacent sensor electrodes. Thus, when a force is applied to deflect or depress the flexible membrane, the conductive layer (e.g., a conductive polymer composite, or other conductive substance) contacts a sensor electrode and creates a new electrical path. Depending on sensor design, magnitude, location, area, and other characteristics of this force can be determined by measuring resistance or conductivity changes that can result from creation of new electrical path.

However, depending on the composition of the FSR material, environmental factors (e.g., temperature, humidity, time at temperature or humidity, and so on) can impact the sensitivity of the resultant sensor. For instance, polymers and plastics such as can be employed in a flexible membrane can swell and move conductive particles away from each other, causing a change in resistance. Resistance also increases with an increase in temperature. Humidity sensors can be manufactured of conductive polymer or other materials, which are selected for their humidity sensitivity, further illustrating the problem of using such materials for force sensing in changing environments. In addition, although resistance increases with temperature, the sensitivity of exemplary sensors can increase with temperature.

Conventional solutions to such problems can include relying on additional humidity and temperatures sensors and associated control circuitry and logic, which would add cost, size, weight and power draw to the sensor module. For instance, humidity effects can be partially compensated for by measuring relative humidity—the percentage of moisture that air holds relative to what it can hold at that temperature—adding attendant costs and complexity, and which relative humidity changes with temperature. This also has the potential to introduce inaccuracies due to the need to make assumptions about how humidity and temperature affect conductance of the FSR material. For instance, while a humidity sensor could give instantaneous indications of humidity, long-term exposure of the FSR material to moisture and humidity can have effects independent of current humidity sensed by a humidity sensor.

Other solutions can comprise restricting sensors to specific temperature ranges for the resultant sensors and/or hermetically sealing a sensor from outside humidity influences, neither of which presents ideal solutions due to added complexity, cost, failure modes, and/or a lack of flexibility.

It is thus desired to provide solutions for environmental compensation of resistive touch sensors that improve upon these and other deficiencies. The above-described deficiencies of environmental compensation of resistive touch sensors are merely intended to provide an overview of some of the problems of conventional implementations, and are not intended to be exhaustive. Other problems with conventional implementations and techniques and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In various non-limiting embodiments of the disclosed subject matter, devices and methods for environmental compensation of temperature and humidity impacts on exemplary resistive force or touch sensor devices. Accordingly, various disclosed embodiments can be configured to determine sheet resistance, based on measurement of resistance of an environmental compensation element (ECE), of a device comprising force-sensing membrane, and to apply an environmental compensation factor based on the resistance. Further non-limiting embodiments are directed to devices, systems and methods associated with disclosed environmental compensating elements and methods related thereto.

Other non-limiting implementations of the disclosed subject matter provide exemplary systems and methods directed to these and/or other aspects described herein.

BRIEF DESCRIPTION OF THE DRAWINGS

Various non-limiting embodiments are further described with reference to the accompanying drawings in which:

FIG. 3 depicts a block-diagram of an exemplary system suitable for incorporation of further non-limiting aspects described herein;

FIG. 17 depicts still further non-limiting aspects of sub-assemblies of the exemplary embodiment depicted in FIG. 7;

FIG. 22 depicts yet another non-limiting flow diagram of exemplary methods associated with an environmental compensation element, in accordance with various aspects described herein;

DETAILED DESCRIPTION

Figure 1:
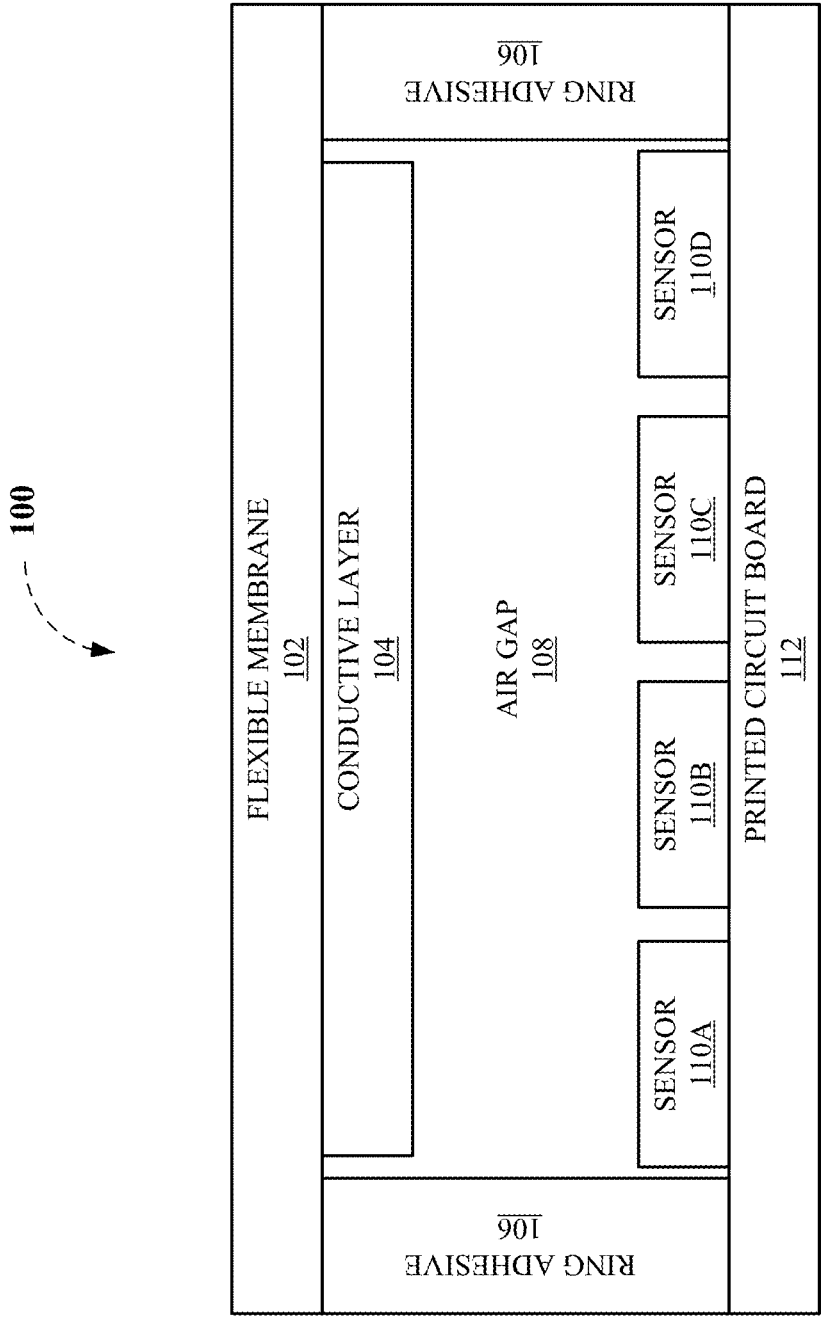
FIG. 1 depicts an exemplary resistive force or touch sensor device suitable for incorporation of various non-limiting aspects described herein.

While a brief overview is provided, certain aspects of the disclosed subject matter are described or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, techniques, and methods of the disclosed subject matter are described in the context of environmental compensation of resistive touch sensors. However, as further detailed below, various exemplary implementations can be applied to other applications of environmental compensation and/or of force sensitive/sensing resistor (FSR) material, without departing from the subject matter described herein.

As described in the background, depending on the composition of a FSR material, also referred to herein as FSR ink, conductive ink, and resistive ink, environmental factors (e.g., temperature, humidity, time at temperature or humidity, and so on) can impact the sensitivity of a resultant sensor. For instance, polymers and plastics such as can be employed in a flexible membrane can swell as a result of moisture absorption and can move conductive particles away from each other, causing an increase in resistance. In addition, even for non-polymeric sheet materials such as glass, suitable for a display, for example, ingress of humidity through a ring adhesive can impact the electrical characteristics of a resultant device, for which compensation can be required. Resistance also increases generally with an increase in temperature. Humidity sensors can be manufactured of a conductive polymer or other material, which are selected for their humidity sensitivity, further illustrating the problem of using such materials for force sensing in changing environments.

Conventional solutions to such problems can include relying on additional humidity and temperatures sensors and associated control circuitry and logic, which would add cost, size, weight and power draw to the sensor module. This also has the potential introduce inaccuracies due to the need to make assumptions about how humidity and temperature affect conductance of the FSR material. For instance, while a humidity sensor could give instantaneous indications of humidity, long-term exposure of the FSR material to moisture and humidity can have effects independent of current humidity sensed by a humidity sensor.

For example, an FSR ink that is sensitive to heat and humidity, applied separately or together, will result in changes in properties (e.g., sheet resistance and contact resistance). For some FSR materials or inks, these changes can interact and amplify each other strongly. As a non-limiting example, an environmental change from 25 degrees Celsius (C) to 50 degrees C., with relative humidity held fixed, may cause the sheet resistance of a certain FSR material to increase by 5%. In another non-limiting example, an independently applied change in relative humidity (RH) from 50% to 95% with temperature held constant at 25 degrees C. may similarly cause the sheet resistance of the same FSR element to increase by 5%. It is notable that it is not possible to predict the change in sheet resistance that would be shown by that element being exposed to the elevated conditions of 50 degrees C. and 95% RH simultaneously. For instance, in a non-limiting example, an experiment may show that the change in sheet resistance is typically much greater than the sum of individual changes. For instance, a 50 degrees C. and 95% RH change can cause a 30% increase in sheet resistance.

In addition, while FSR ink responds to heat and humidity, applied separately or together, by changing electrical characteristics, notably sheet resistance and contact resistance, some fraction of these changes can be reversible on a short time scale, e.g., exhibits a longer-term hysteresis effect. However, other portions of such changes can take a longer time to be reversed, or can even prove irreversible over reasonable time frames and environmental conditions. As a non-limiting example, when an FSR material is exposed to high heat and high humidity and then is placed in a moderately humid room temperature environment, the FSR material may not return exactly to its original electrical characteristics (e.g., sheet resistance, contact resistance) for weeks or months, which may be beyond a reasonable time frame for a resistive touch sensor comprising such FSR in active operation.

As a result, given the multiple factors that can affect sheet and contact resistance—which include both the instantaneous values of temperature and humidity, as well as the historical values experienced over the element's life—it is not reasonably possible to characterize an FSR material a priori to predict its properties in advance of employment in a sensor such as a resistive touch sensor, even if the environmental conditions were known exactly. Accordingly, various disclosed embodiments can comprise or be associated with an environmental compensation element (ECE) or portions thereof that can readily compensate for historical changes, as it reports and compensates for whatever electrical properties the FSR material exhibits at any given point in time, regardless of whether they are the same or even close to the original values.

As used herein, non-limiting embodiments of an environmental compensation element can comprise or be associated with structures and/or a methods, or portions thereof, that facilitate a force-sensing resistor or resistive touch sensor associated with a force/pressure grid array to maintain a constant calibration over widely varying storage and operating conditions, even when inherent material properties (e.g., conductance, contact resistance, sheet resistance) may vary widely due to changing environmental conditions.

In a non-limiting aspect, non-limiting embodiments of an environmental compensation element can comprise or be associated with a force sensing membrane (FSM) that can have or be associated with two or more electrical contacts (e.g., a conductive ink, a silver-based conductive ink, or another low-resistance material), spaced apart and in contact with an area of the FSR material. In a further non-limiting aspect, non-limiting embodiments of an environmental compensation element can comprise or be associated with a printed circuit board (PCB) with sensor grid electrodes and two or more electrical contacts, corresponding to locations of the FSM electrical contacts. In yet another non-limiting aspect, non-limiting embodiments of an environmental compensation element can comprise or be associated with a conductive adhesive or other bonding element (e.g., a liquid adhesive such as a conductive epoxy, a dry film conductive adhesive, or other bonding element), which can be placed in between an FSM contact and its corresponding PCB contact, so as to form a very low-resistance contact there between. In still other non-limiting aspects, non-limiting embodiments of an environmental compensation element can comprise or be associated with exemplary control circuitry, as further described herein, comprising components, or portions thereof, configured to generate a voltage or other measurable electrical characteristic proportionate to the measured resistance across the FSM contacts. In a further non-limiting aspect, non-limiting embodiments of an environmental compensation element can comprise or be associated with exemplary control logic, configured to the employ the generated voltage or other measurable electrical characteristic to derive a variable factor (e.g., an environmental compensation factor) that can be applied to modify values in a pre-existing calibration table for an exemplary force-sensing resistor or resistive touch sensor associated with a force/pressure grid array to create an environmentally-compensated calibration table. In various non-limiting embodiments described herein, an exemplary environmentally-compensated calibration table can be employed to readily compensate for historical environmental changes (including instantaneous environmental changes), as it reports and compensates for whatever electrical properties the FSR material exhibits at any given point in time, regardless of whether they are the same or even close to the original values.

Exemplary Embodiments

For instance, FIGS. 1-4 depict various non-limiting aspects of resistive force or touch sensor devices suitable for incorporation of exemplary embodiment disclosed herein. As further described herein, for example, regarding FIGS. 5-20, various exemplary embodiments of the disclosed environmental compensation element (ECE) can be incorporated into resistive force or touch sensor devices as a separate or discrete sensor element incorporated into the exemplary resistive force or touch sensor devices. FIG. 1 depicts an exemplary resistive force or touch sensor device suitable for incorporation of various non-limiting aspects described herein. For instance, FIG. 1 depicts exemplary resistive force or touch sensor device 100, which can comprise a flexible membrane 102, a conductive layer 104, an enclosed air gap 108, the grouping of sensor electrodes 110A, 110B, 110C, and 110D formed on a printed circuit board or other electrode substrate 112. As illustrated, flexible membrane 102 can be constrained and held apart from a grouping of sensor electrodes 110, e.g., sensor electrodes 110A, 110B, 110C, and 110D, by a ring adhesive 106, around the outer perimeter of the sensor active area. Flexible membrane 102 is held apart from the printed circuit board or other electrode substrate 112 and over from the grouping of sensor electrodes 110, e.g., sensor electrodes 110A, 110B, 110C, and 110D, formed on the printed circuit board or other electrode substrate 112 by the ring adhesive 106. It should be noted in regard to the grouping of sensor electrodes 110, e.g., sensor electrodes 110A, 110B, 110C, and 110D, formed on the printed circuit board or other electrode substrate, that while the grouping is illustrated as comprising four sensor electrodes 110 (e.g., sensor electrodes 110A, 110B, 110C, and 110D), fewer or greater numbers of sensor electrodes formed on the printed circuit board or other electrode substrate 112 is contemplated by the subject disclosure and thus fall within the purview of the subject disclosure. It should further be noted in regard to the subject disclosure that the pattern formed by the grouping of sensor electrodes 110, e.g., sensor electrodes 110A, 110B, 110C, and 110D, can configured as a N×M array, wherein N and M are integers.

Figure 2:
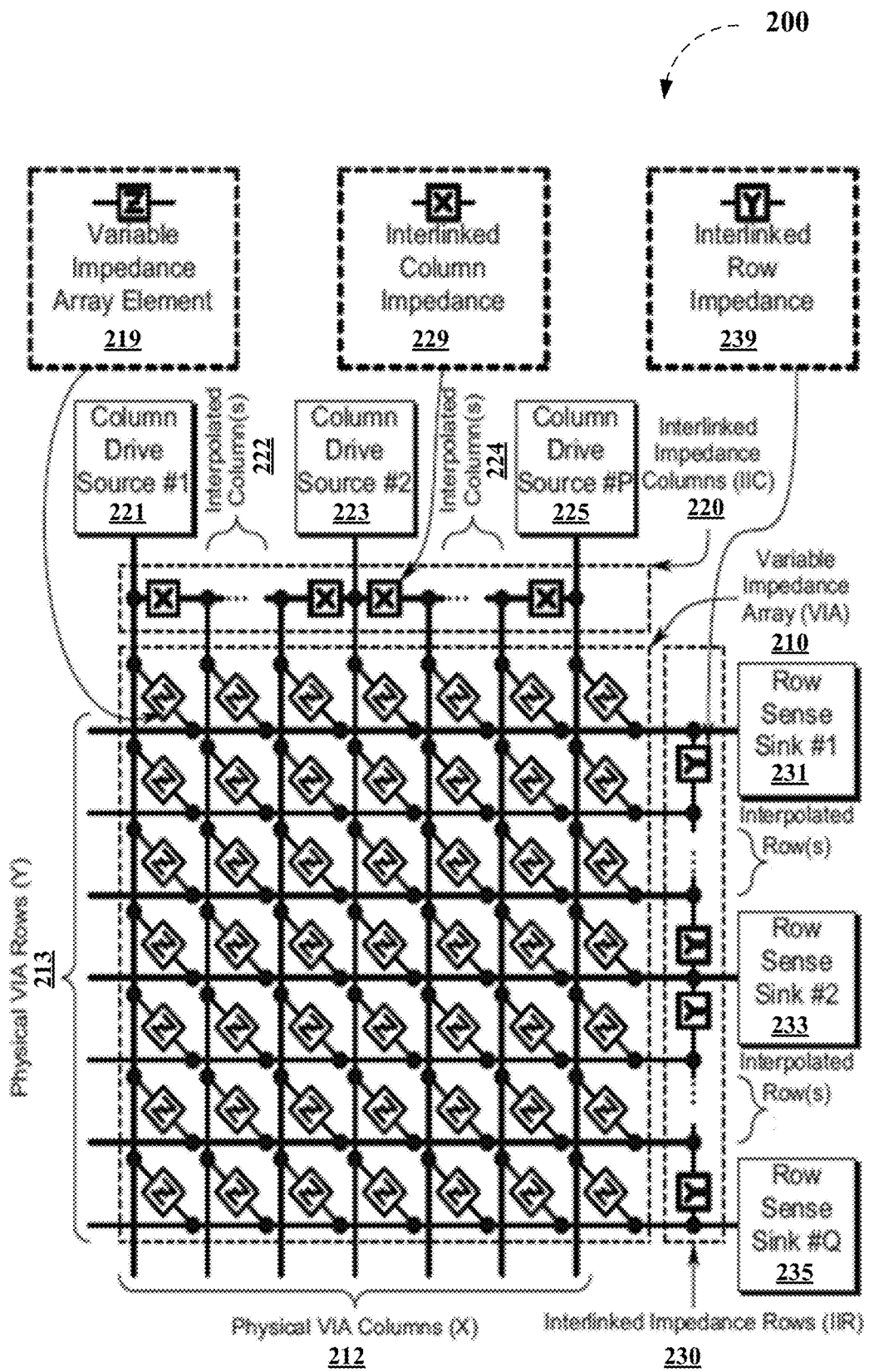
FIG. 2 depicts an exemplary sensor device suitable for incorporation of further non-limiting aspects described herein.
Figure 4:
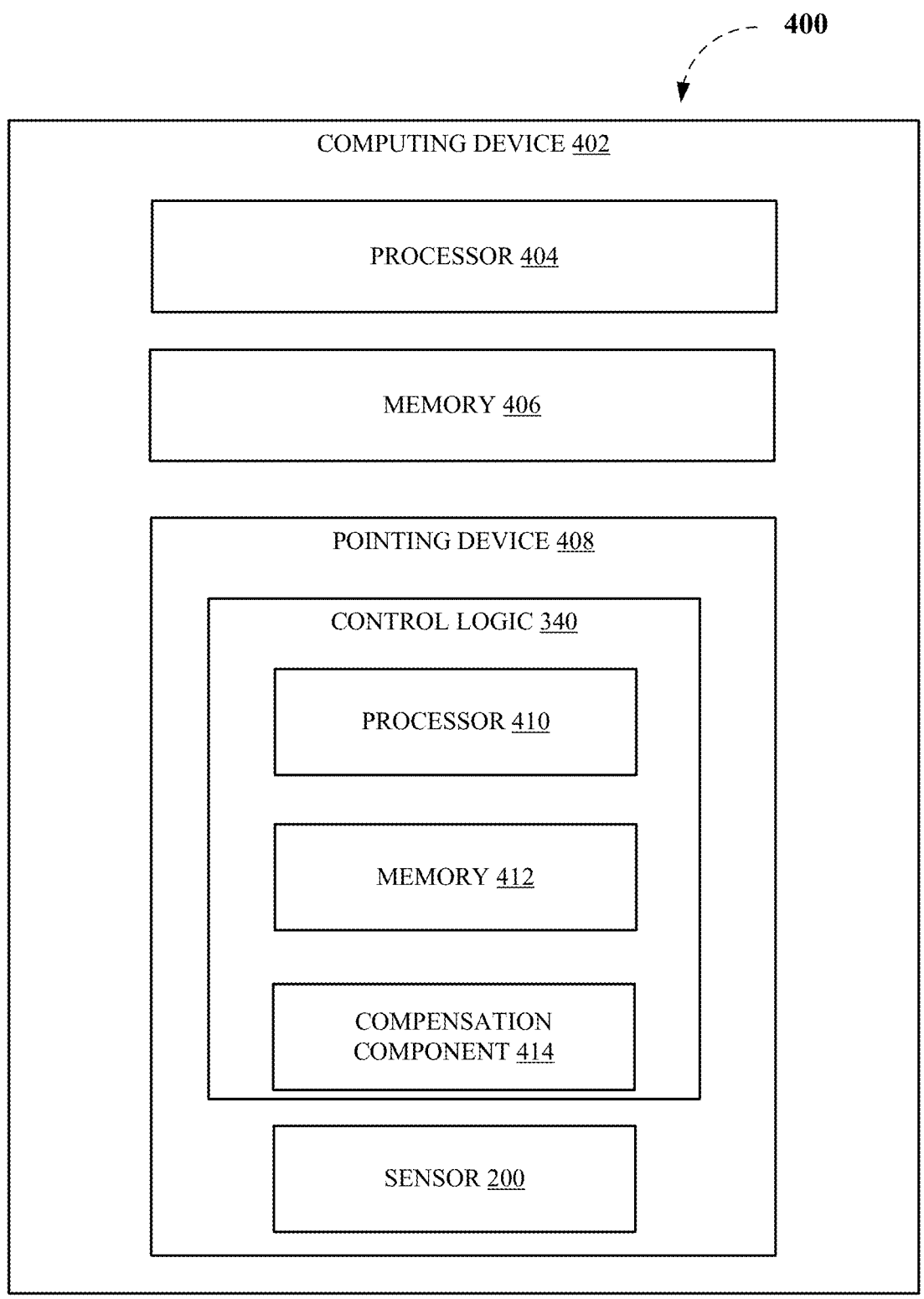
FIG. 4 depicts a block-diagram of an exemplary computing device suitable for incorporation of further non-limiting aspects described herein.

For instance, FIG. 2 depicts an exemplary sensor device 200 suitable for incorporation of further non-limiting aspects described herein. In a non-limiting aspect, sensor device 200 can comprise or be associated with exemplary resistive force or touch sensor device 100 or portions thereof, such as, for example, a grouping or variable impedance array (VIA) 210 of sensor electrodes 110, e.g., sensor electrodes 110A, 110B, 110C, and 110D, which can be configured as a N×M array, as described above regarding FIG. 1. FIG. 3 depicts a block-diagram of an exemplary system 300 suitable for incorporation of further non-limiting aspects described herein. FIG. 4 depicts a block-diagram 400 of an exemplary computing device or system 402 suitable for incorporation of further non-limiting aspects described herein.

As a non-limiting example, exemplary sensor device 200 and exemplary system 300 can comprise or be associated with an exemplary control logic component 340 and corresponding switching registers 320, 330 for controlling exemplary sensor device 200 (e.g., comprising variable impedance array (VIA) 210), and a computing device or system 402, can comprise or be associated with an exemplary compensation component 414, comprising or associated with exemplary sensor device 200 to facilitate environmental compensation according to various non-limiting aspects described herein, in accordance with various non-limiting embodiments. For example, exemplary sensor device 200 comprising a VIA 210, and exemplary system 300 comprising exemplary control logic component 340 and corresponding switching registers 320, 330, can be configured for controlling exemplary sensor device 200, respectively, in accordance with various example embodiments.

Returning to FIG. 2, in this regard, exemplary VIA 210 can comprise physical VIA columns 212 and physical VIA rows 213, in which individual variable impedance array elements 219 can interconnect within row/column cross points of the VIA. The individual variable impedance array elements 219—depicted as generalized impedance values Z—can comprise active and/or passive components, and any combination of resistive, capacitive, and/or inductive components, devices, and other suitable sensor elements, depending on context, in various non-limiting aspects.

Physical VIA columns 212 and physical VIA rows 213 can be connected via interlinked impedance columns (IICs) 220 and interlinked impedance rows IIRs 230, respectively. The IICs 220 and IIRs 230 can be configured to reduce the number of columns and rows that are connected to column drive sources 221, 223, 225 and row sense sinks 231, 233, 235. As such, a combination of the IICs 220 and the IIRs 230 can reduce an amount of external components, e.g., column drive sources, row sense sinks, and related components that are used to drive and connect to the physical VIA columns 212 and the physical VIA rows 213.

In this regard, in exemplary embodiments, IICs 220 can reduce a number of the column drive sources 221, 223, 225 to less than a number of the physical VIA columns 212, and the IIRs 230 can reduce a number of the row sense sinks 231, 233, 235 to less than a number of the physical VIA rows 213, in non-limiting aspects. For example, this reduction can be achieved by having one or more interlinked column impedance (ICI) elements 229 between each VIA physical column 212, and one or more interlinked row impedance (IRI) elements 239 between each VIA physical row 213. Thus, an 20Y sensor path of the VIA 210 can be translated to an electrical interface only requiring P column drivers and Q row sensors. In various non-limiting embodiments, constraints $P \leq X$ and $Q \leq Y$ can be satisfied, in a non-limiting aspect. In other non-limiting embodiments, constraints $X/P \geq 2$ or $Y/Q \geq 2$ can be satisfied, according to further non-limiting aspects.

It should be appreciated that in various embodiments, an IIC of the IICs 220 can incorporate a plurality of interlinked impedance elements, and an IIR of the IIRs 230 can incorporate a singular interlinked impedance element. In other non-limiting embodiments, an IIC of the IICs 220 can incorporate a singular interlinked impedance element, and an IIR of the IIRs 230 can incorporate a plurality of interlinked impedance elements.

The ICI elements 229 can be configured to connect individual columns of the physical VIA columns 212, and can comprise active and/or passive components, e.g., comprising any combination of resistive, capacitive, and/or inductive components, devices, and other suitable sensor elements, depending on context, in various non-limiting aspects. Thus, ICI elements 229 are depicted, e.g., generically, in FIG. 2 as generalized impedance values X. In non-limiting embodiments, individual columns of physical VIA columns 212 can be directly driven using respective drive sources of the column drive sources 221, 223, 225, or indirectly driven, e.g., via interpolated column(s) 222, 224 that are between directly driven columns of the physical VIA columns 212.

Exemplary IRI elements 239 can be configured to connect individual rows of the physical VIA rows 213, and can comprise active and/or passive components, e.g., comprising any combination of resistive, capacitive, and/or inductive components, devices, and other suitable sensor elements, depending on context, in various non-limiting aspects. Thus, IRI elements 239 are depicted, e.g., generically, in FIG. 2 as generalized impedance values Y. In non-limiting embodiments, individual columns of the physical VIA rows 213 can be directly sensed using respective sense sinks of the row sense sinks 231, 233, 235, or indirectly sensed, e.g., via interpolated row(s) 232, 234 that are between directly sensed rows of the physical VIA rows 213.

Returning to FIG. 3, in further non-limiting embodiments, column drive sources 221, 223, 225 can be combined utilizing a series of switches controlled by a column switching register 320 that can define a type of column drive source to be electrically coupled to each column that is externally accessible to the VIA 210. In other embodiments, variations of AC/DC excitation, voltage sources, open circuits, current sources, and/or other electrical source driver combinations can be used, e.g., as switched configurations, for the column drive sources 221, 223, 225. In this regard, column switching register 320 can be configured to select a type of electrical source, e.g., of the electrical source driver combinations, to be applied to VIA 210, and/or an amplitude/magnitude of the electrical source.

In yet other embodiments, row sense sinks 231, 233, 235 can be combined utilizing a series of switches controlled by a row switching register 330 that can define a type of row sense sink to be electrically coupled to each row that is externally accessible to VIA 210. In other embodiments, variations of AC/DC excitation, voltage sources, open circuits, current sources, and other electrical sense sink combinations can be used, e.g., as switched configurations, for row sense sinks 231, 233, 235. In this regard, row switching register 330 can be configured to select a type of electrical sink, e.g., of the sense sink combinations, to be applied to VIA 110, and/or an amplitude/magnitude of the electrical sink.

Column switching registers 320 can comprise a set of latches or other memory elements that can configure switches that control a type of drive source associated with each column drive source of the column drive sources 221, 223, 225, an amplitude/magnitude of the drive source, and/or whether the drive source is activated, in a non-limiting aspect. Further, row switching registers 330 can comprise a set of latches or other memory elements that can configure switches that control a type of sense sink associated with each row sense sink of the row sense sinks 231, 233, 235, an amplitude/magnitude of a sink, and/or whether the sink is activated, in another non-limiting aspect.

In exemplary embodiments, IICs 220 and IIRs 230 can comprise a wide variety of impedances that can be static or actively engaged by respective configurations of column switching registers 320 and row switching registers 330, respectively. As a non-limiting example, column switching registers 320 and row switching registers 330 can be configured to not only stimulate/sense VIA 210 or portions thereof, but can also be configured to configure an interlinked nature of the VIA 210 or portions thereof by reconfiguring column cross-links and row cross-links of the VIA 210.

Returning to FIG. 4. exemplary computing device 402 can comprise an exemplary processor 404, a memory 406, and can comprise or be associated with an exemplary pointing device 408, according to various non-limiting embodiments. In a non-limiting aspect, exemplary pointing device 408 can comprise or be associated with exemplary sensor device 200 and/or exemplary control logic component 340, as further described herein. In another non-limiting aspect, exemplary control logic component 340 can further comprise or be associated with an exemplary processor 410, and/or a memory 406. In various non-limiting implementations, one of more of exemplary processor 404 and/or exemplary processor 410 can comprise a computer processor, a microcontroller, or other suitable computing device, that can be configured to execute machine executable instructions, e.g., which can be read, via the one or more processor, from a computer-readable medium, e.g., memory 406, memory 412, or other memory, whether volatile or nonvolatile, for example, such as from nonvolatile memory 344. In further non-limiting implementations, exemplary control logic component 340 can comprise or be associated with an exemplary compensation component 414, comprising or associated with exemplary sensor device 200 to facilitate environmental compensation according to various non-limiting aspects described herein, in accordance with various non-limiting embodiments.

Further, in various embodiments, exemplary control logic component 340 can configure the column switching registers 320 and row switching registers 330 to stimulate/sense the VIA 210, reconfigure column cross-links and row cross-links of VIA 210, and can comprise or be associated with control circuitry (not shown) configured to facilitate environmental compensation of various non-limiting embodiments described herein, as well as facilitating related operations and functions incident to the various embodiments described herein.

For example, in various embodiments, exemplary control logic component 340 can control respective states of column drive switches (not shown) of column switching registers 320 and row sink switches (not shown) of row switching registers 330. In this regard, column drive switches can control whether respective columns of the VIA 210 are grounded, driven to a voltage potential from a voltage source, e.g., adjustable by control logic component 340 to enable "on-the-fly" adjustment for non-linearities in driving electronics or otherwise, or electrically coupled to an analog-to-digital (ADC) converter, e.g., ADC sensing 350, to sense the VIA 210, or portions thereof. In other non-limiting embodiments, such exemplary control circuitry as depicted in FIG. 3, or portions thereof, can be configured to configured to determine at least one electrical characteristic associated with sheet resistance for use in determination of an environmental compensation factor to a measurement of a force applied to an exemplary an exemplary resistive force or touch sensor device (e.g., exemplary resistive force or touch sensor device associated with an exemplary FSM), associated with a grouping of sensor electrodes associated with a force/pressure grid array (e.g., VIA 210), for example, as further described herein, regarding FIGS. 5-20. Further, row sink switches can control whether respective rows of the VIA 210 are grounded, electrically coupled to current sinks, or electrically coupled to the ADC converter, e.g., ADC sensing 350, to sense VIA 210 or portions thereof. Correspondingly, one or more of processor 404, 410 can facilitate control, configuration, and similar functionality (e.g., via exemplary control logic component 340), described herein and/or incident thereto, ADC sensing 350 based on configurations of column switching registers 320, row switching registers 330, exemplary control logic component 340, and/or other components or subcomponents, e.g., to sense VIA 210, portions thereof, and/or other functionality described herein and/or incident thereto.

Returning to FIG. 4, exemplary computing device 402 can comprise or be associated with any computing device. By way of illustration, and not limitation, such computing devices can comprise or be associated with a tablet, a tablet computer, personal digital assistant (PDA), a laptop computer, a desktop computer, an appliance, a vehicle control system, a television, a telephone, a smartphone, and other similarly functional devices that can comprise or be associated with a pointing device 408, e.g., touchpad, trackpad, a touch screen interface or pad, and similar functional devices, and can comprise exemplary sensor 200, e.g., comprising force-based sensors, such as a resistive force or touch sensor 100, VIA 210 comprising variable impedance elements that interconnect with respective row and column cross points of VIA 210. In other non-limiting aspects, computing device 402 can comprise or be associated with exemplary control logic component 340, and/or portions thereof, such as exemplary compensation component 414, comprising or associated with exemplary sensor device 200 to facilitate environmental compensation according to various non-limiting aspects described herein, in accordance with various non-limiting embodiments.

In various non-limiting embodiments, exemplary sensor 200 can comprise capacitive-based sensors (not shown), an array of capacitive-based sensors (not shown), and/or force-based sensor(s) embedded within, above, and/or below the capacitive-based sensors, the array of capacitive-based sensors, and so on. In yet other non-limiting embodiments, exemplary sensor 200 can comprise optical-based sensors (not shown), an array of optical-based sensors (not shown), and the like and force-based sensor(s) embedded within, above, and/or below the array of optical-based sensors, and so on.

Figure 5:
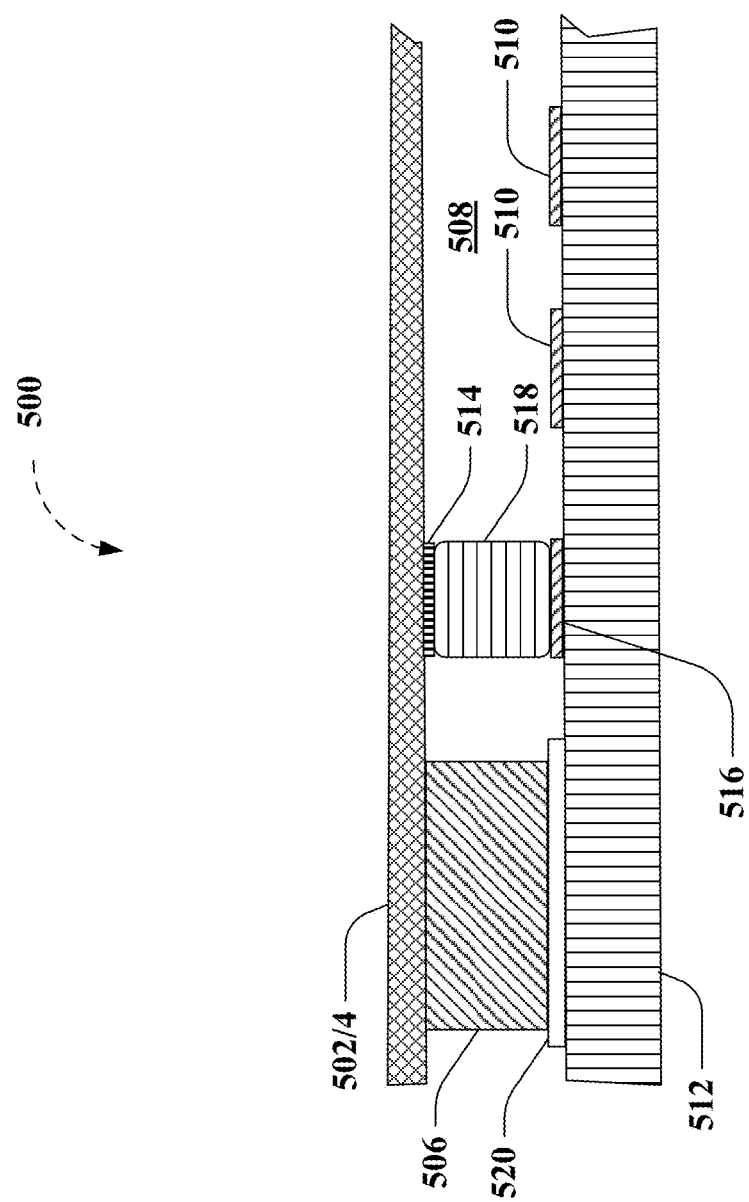
FIG. 5 depicts a block-diagram of an exemplary embodiment of an environmental compensation element according to non-limiting aspects described herein.

FIG. 5 depicts a block-diagram of an exemplary embodiment of an environmental compensation element according to non-limiting aspects described herein. The embodiment depicted in FIG. 5 employs similar numbering to that of FIG. 1. As such, the descriptions of various devices, systems, and operations described herein regarding FIGS. 1-4 can be understood, depending on context, to apply to the exemplary embodiment of an environmental compensation element depicted in FIG. 5. For instance, FIG. 5 depicts an exemplary resistive force or touch sensor device 500, which can comprise a flexible membrane 502, a conductive layer 504 (depicted as combined flexible membrane with FSR or conductive layer of force sensing membrane (FSM) 502/504), an enclosed air gap 508, the grouping of sensor electrodes 510, e.g., sensor electrodes 510A, 510B, 510C, and 510D (of which, only two are shown), formed on a printed circuit board or other electrode substrate 512. As described above regarding FIG. 1, flexible membrane 502 can be constrained and held apart from a grouping of sensor electrodes 510, by a ring adhesive 506, around the outer perimeter of the sensor active area. Flexible membrane 502 is held apart from the printed circuit board or other electrode substrate 512 and over from the grouping of sensor electrodes 510, formed on the printed circuit board or other electrode substrate 512 by the ring adhesive 506. It should be noted in regard to the grouping of sensor electrodes 510, formed on the printed circuit board or other electrode substrate, that while the grouping is described as comprising four sensor electrodes 510 (e.g., sensor electrodes 510A, 510B, 510C, and 510D), fewer or greater numbers of sensor electrodes formed on the printed circuit board or other electrode substrate 512 is contemplated by the subject disclosure and thus fall within the purview of the subject disclosure. It should further be noted in regard to the subject disclosure that the pattern formed by the grouping of sensor electrodes 510, e.g., sensor electrodes 510A, 510B, 510C, and 510D, can configured as a N×M array, wherein N and M are integers.

In addition, FIG. 5 depicts an exemplary resistive force or touch sensor device 500, which can further comprise a non-limiting embodiments of an environmental compensation element. In a non-limiting aspect, non-limiting embodiments of an environmental compensation element can comprise or be associated with FSM 502/504 that can have or be associated with two or more electrical contacts (e.g., a conductive ink, a silver-based conductive ink, or another low-resistance material), spaced apart and in contact with an area of the FSR 504 material of FSM 502/504. In the non-limiting embodiment depicted in FIG. 5, FSM 502/504 is depicted with one electrical contact 514 of the two or more electrical contacts (e.g., a conductive ink, a silver-based conductive ink, or another low-resistance material), spaced apart and in contact with an area of the FSR 504 material of FSM 502/504. In a further non-limiting aspect, non-limiting embodiments of an environmental compensation element can comprise or be associated with PCB or other electrode substrate 512 with sensor grid electrodes 510 and two or more electrical contacts, corresponding to locations of the FSM 502/504 electrical contacts (e.g., electrical contact 514 of the two or more electrical contacts). In the non-limiting embodiment depicted in FIG. 5, PCB or other electrode substrate 512 is depicted with one electrical contact 516 of the two or more electrical contacts, corresponding to locations of the FSM 502/504 two or more electrical contacts (e.g., electrical contact 514 of the two or more electrical contacts).

In yet another non-limiting aspect, non-limiting embodiments of an environmental compensation element can comprise or be associated with a conductive adhesive 518 or other bonding element (e.g., a liquid adhesive such as a conductive epoxy, a dry film conductive adhesive, or other bonding element, which can be placed in between an FSM 502/504 contact (e.g., electrical contact 514) and its corresponding PCB or other electrode substrate 512 contact (e.g., electrical contact 516), so as to form a very low-resistance contact therebetween.

In still other non-limiting aspects, non-limiting embodiments of an environmental compensation element can comprise or be associated with exemplary control circuitry (not shown), as further described herein regarding FIGS. 1-4, for example, comprising components, or portions thereof, configured to generate a voltage or other measurable electrical characteristic proportionate to the measured resistance across the FSM 502/504 contacts (e.g., electrical contact 514 of the two or more electrical contacts). In a further non-limiting aspect, non-limiting embodiments of an environmental compensation element can comprise or be associated with exemplary control logic (not shown), as further described herein regarding FIGS. 1-4, for example, configured to the employ the generated voltage or other measurable electrical characteristic to derive a variable factor (e.g., an environmental compensation factor) that can be applied to modify values in a pre-existing calibration table (not shown) for an exemplary force-sensing resistor or resistive touch sensor associated with a force/pressure grid array (e.g., VIA 210) to create an environmentally-compensated calibration table (not shown). In various non-limiting embodiments described herein, an exemplary environmentally-compensated calibration table can be employed to readily compensate for historical environmental changes (including instantaneous environmental changes), as it reports and compensates for whatever electrical properties the FSR 504 material exhibits at any given point in time, regardless of whether they are the same or even close to the original values.

In a non-limiting aspect, disclosed embodiments can comprise an exemplary VIA 210 array employing a carbon-based conductive ink (e.g., FSR 504 of FSM 502/504) having suitable properties of correct bulk resistance, manufacturability, and durability. As described herein, a carbon-based conductive ink can be sensitive to environmental factors in that its resistance can change dramatically in certain storage/operating conditions of high heat and/or high humidity, which changes can be partially reversible or irreversible. Accordingly, a signal output of a resultant force-sensitive touch sensor device can depend strongly on this variable material property, if it is not corrected. Various non-limiting embodiments of an ECE as described herein can provide a straightforward, low cost, low profile, and low power method of adjusting a stored factory calibration setting (e.g., a calibration table (not shown)) to account for current storage or operating conditions by accounting for environmental changes via an environmental compensation factor to create a compensated calibration table, as further described herein.

Various disclosed embodiments add minimal components, printed circuits, and logic within the envelope of an existing sensor device implementation, which does not require exact knowledge of how resistance will vary due to unknown, future environmental conditions. For instance, by incorporating exemplary ECE structures into an exemplary force/pressure grid array (e.g., VIA 210), exemplary ECE implementations can derives measurements directly from exemplary FSM 502/504 that forms part of the exemplary force/pressure grid array (e.g., VIA 210). In turn, this facilitates manufacturing flexibility in selection of FSR 504 materials including a range of current or future formulations of force-sensing ink, without having to be constrained by the need for stable conductance over a range of environmental conditions, which can facilitate selection of lower priced materials and/or the ability to optimize other properties with less restrictions dictated by limited material selections not otherwise possible.

Exemplary embodiments of FIG. 5 have been described in connection with exemplary ECE implementations. However, it is to be understood that other similar embodiments may be used or modifications and additions may be made to the described embodiments for performing the same function of the disclosed subject matter without deviating there from. For example, one skilled in the art will recognize that aspects of the disclosed subject matter as described in the various embodiments of the present application may apply to other configurations, measurement techniques, sensor devices, and so on, where environmental compensation can provide improvements over existing implementations.

As a non-limiting example, while FIG. 5 depicts one electrical contact 514 of the two or more electrical contacts, spaced apart and in contact with an area of the FSR 504 material, exemplary implementations of an ECE can employ any number of electrical contacts from two to a large number, the measurement of which can be independent, averaged, compared, and so on, and/or measurement can be done on a 4-wire basis, or as otherwise available to one skilled in the art. In another non-limiting example, while FIG. 5 depicts one electrical contact 514 of the two or more electrical contacts printer atop the FSR 504 material (e.g., conductive ink), exemplary implementations of an ECE can employ other suitable configurations such as underneath the FSR 504 material with a window in the FSR 504 material to allow low-resistance contact to the corresponding PCB or other electrode substrate 512 contact (e.g., electrical contact 516).

In still other non-limiting embodiments, electrical contact 514 of the two or more electrical contacts, spaced apart and in contact with an area of the FSR 504 material, can comprise a conductive substance, such as an ink based on a conductor (e.g., silver, another metal, carbon particles, carbon nanotubes, an organometallic material, a conductive polymer, and/or a combination of any of the above). In addition, various disclosed embodiments encompass one or more variations in one or more of the described physical size, shape, and relative location of the respective electrical contacts, depending on the format of the particular non-limiting implementation of the exemplary force/pressure grid array (e.g., VIA 210). Moreover, as further described herein, various disclosed embodiments encompass one or more variations in one or more of the described control circuitry, control logic, and/or calibration schemes as available to one skilled in the art, upon review of the disclosed subject matter. As a non-limiting example, FIG. 6 depicts exemplary variations in configurations of electrical contacts associated with an exemplary ECE embodiment.

Figure 18:
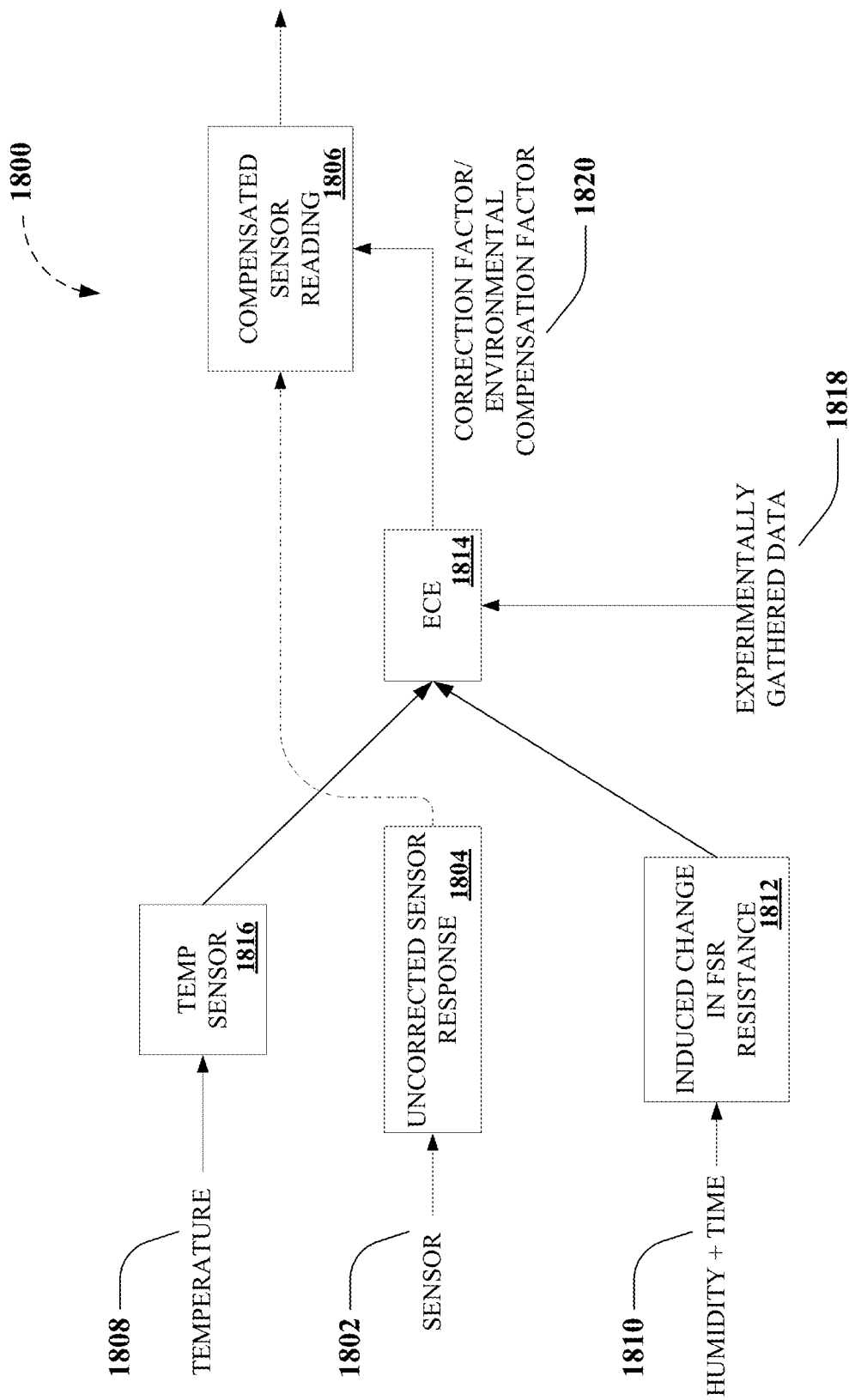
FIG. 18 depicts a non-limiting conceptual block diagram illustrating exemplary aspects of exemplary environmental compensation or correction for a sensor, according to non-limiting aspects described herein.
Figure 19:
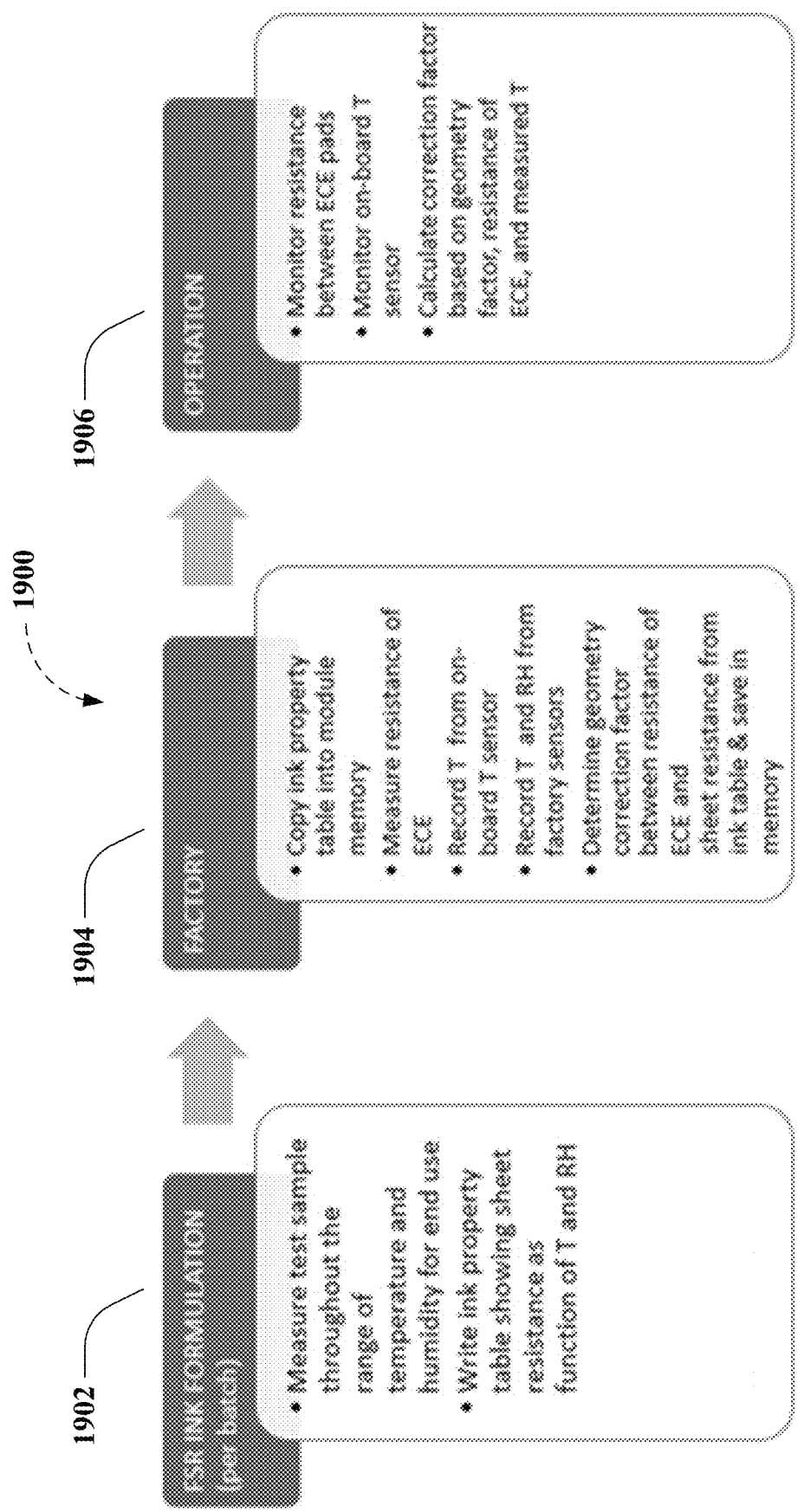
FIG. 19 depicts a non-limiting flow diagram demonstrating an overview of exemplary methods associated with an environmental compensation element, in accordance with various aspects described herein.
Figure 20:
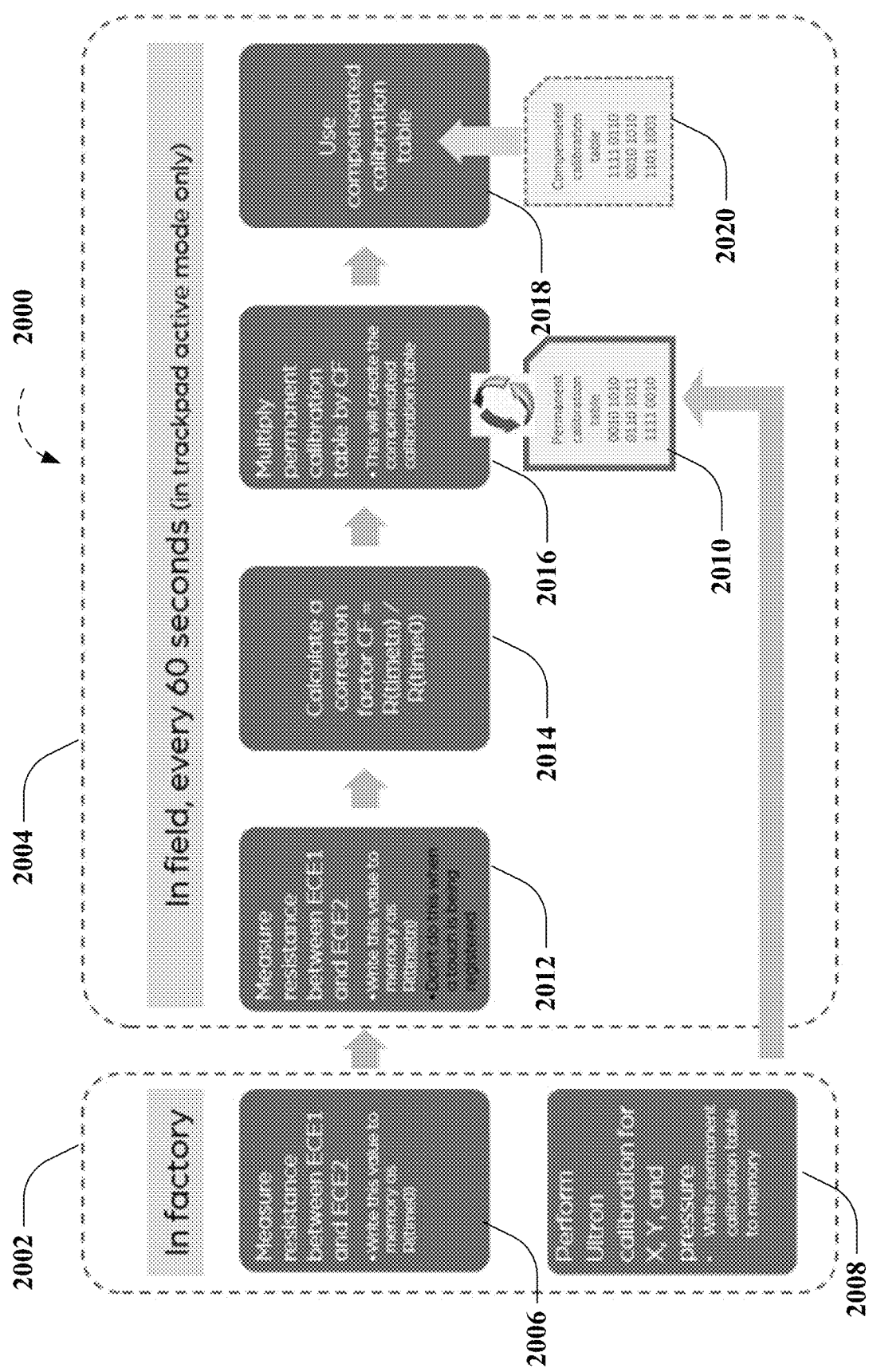
FIG. 20 depicts a further non-limiting flow diagram demonstrating an overview of further exemplary methods associated with an environmental compensation element, in accordance with various aspects described herein.

In still further non-limiting embodiments, while not necessary for various embodiments of an exemplary ECE or for the implementation of exemplary resistive force or touch sensor device 500 comprising an exemplary ECE as described herein, exemplary resistive force or touch sensor device 500 comprising an exemplary ECE can further comprise or be associated with a temperature sensor, which can be employed to determine a temperature associated with exemplary resistive force or touch sensor device 500, as further described herein, regarding FIGS. 18-20, for example. As a non-limiting example, exemplary processor 410, exemplary control logic component 340, and/or portions thereof or otherwise, such as a microcontroller unit (MCU) (not shown), associated with exemplary resistive force or touch sensor device 500, can comprise a temperature sensor (not shown), which can be employed to determine a temperature associated with exemplary resistive force or touch sensor device 500, as further described herein, regarding FIGS. 18-20. In other non-limiting embodiments, a temperature associated with exemplary resistive force or touch sensor device 500 can include a temperature from a temperature sensor incorporated into exemplary force/pressure grid array (e.g., VIA 210), wherein temperature can optionally be included in exemplary control circuitry, control logic, and/or portions thereof in the determination of the environmental compensation factor. In still other non-limiting embodiments of exemplary resistive force or touch sensor device 500, as further described herein, regarding FIGS. 18-20, for example, an available temperature associated with exemplary resistive force or touch sensor device 500 can be employed to derive humidity data associated with exemplary resistive force or touch sensor device 500 based on data obtained during manufacture regarding FSR 504 material of FSM 502/504 response to changes in humidity and temperature, whether determine when changes of temperature and humidity are applied separately or together (e.g., changes in electrical characteristics such as sheet resistance, contact resistance, conductivity, and/or resistivity).

Figure 6:
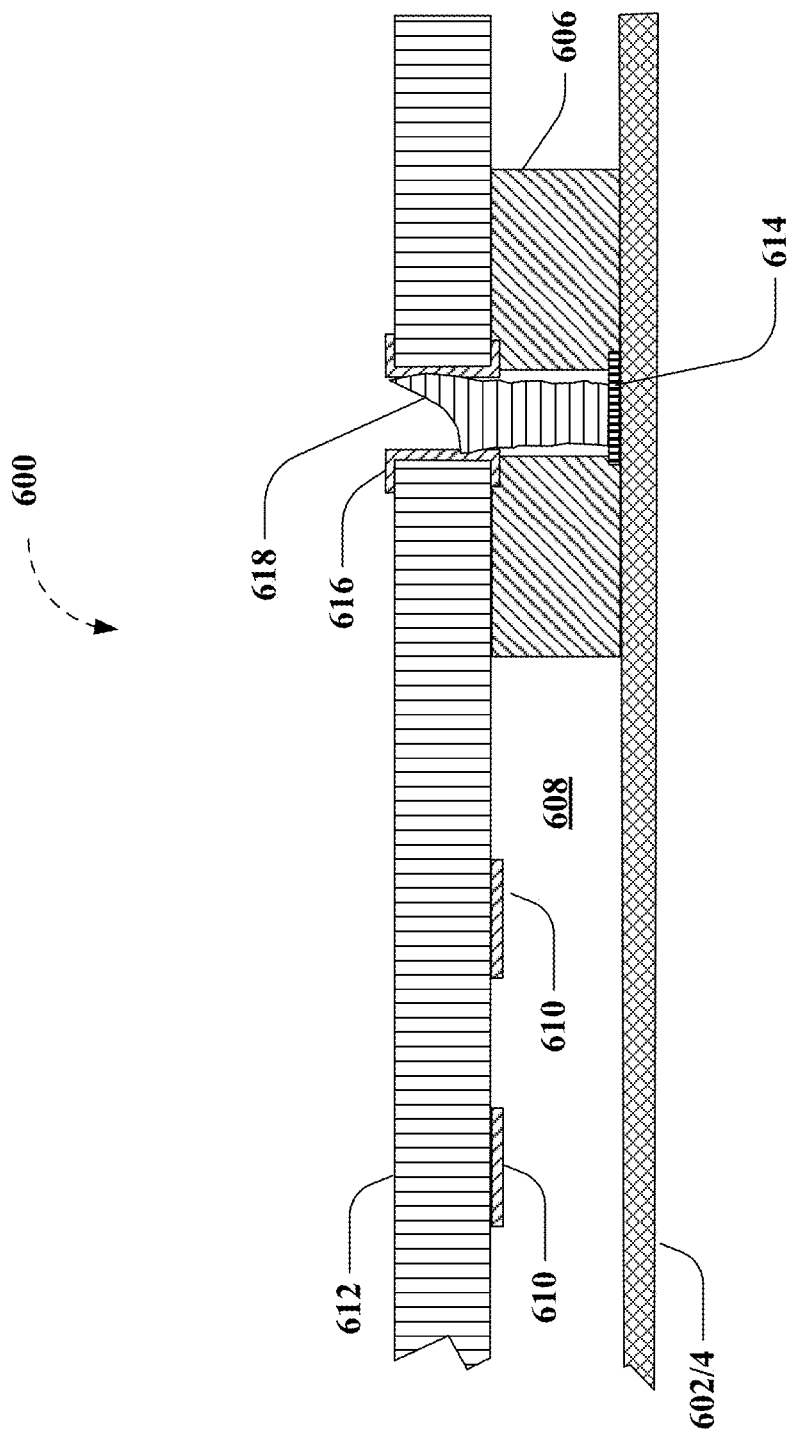
FIG. 6 depicts a block-diagram of another exemplary embodiment of an environmental compensation element according to non-limiting aspects described herein.

FIG. 6 depicts a block-diagram of another exemplary embodiment of an environmental compensation element according to non-limiting aspects described herein. The embodiment depicted in FIG. 6 employs similar numbering to that of FIGS. 1 and 5. As such, the descriptions of various devices, systems, and operations described herein regarding FIGS. 1-4 can be understood, depending on context, to apply to the exemplary embodiment of an environmental compensation element depicted in FIG. 6. For instance, FIG. 6 depicts an exemplary resistive force or touch sensor device 600, which can comprise a flexible membrane 602, a conductive layer 604 (depicted as combined flexible membrane with FSR or conductive layer of force sensing membrane (FSM) 602/604), an enclosed air gap 608, the grouping of sensor electrodes 610 formed on a printed circuit board or other electrode substrate 612. As described above regarding FIGS. 1 and 5, flexible membrane 602 can be constrained and held apart from a grouping of sensor electrodes 610, by a ring adhesive 606, around the outer perimeter of the sensor active area. Thus, the description of FIG. 5 is applicable to FIG. 6, except where differences are noted herein.

For instance, it should be noted in regard to the grouping of sensor electrodes 610, formed on the printed circuit board or other electrode substrate, that, as with FIG. 5, while the grouping is described as comprising four sensor electrodes 610 (e.g., sensor electrodes 610A, 610B, 610C, and 610D), fewer or greater numbers of sensor electrodes formed on the PCB or other electrode substrate 612 is contemplated by the subject disclosure and thus fall within the purview of the subject disclosure. It should further be noted in regard to the subject disclosure that the pattern formed by the grouping of sensor electrodes 610 can configured as a N×M array, wherein N and M are integers.

In addition, FIG. 6 depicts an exemplary resistive force or touch sensor device 600, which can further comprise a non-limiting embodiments of an environmental compensation element. In a non-limiting aspect, non-limiting embodiments of an environmental compensation element can comprise or be associated with FSM 602/604 that can have or be associated with two or more electrical contacts (e.g., a conductive ink, a silver-based conductive ink, or another low-resistance material), spaced apart and in contact with an area of the FSR 604 material of FSM 602/604. In the non-limiting embodiment depicted in FIG. 6, FSM 602/604 is depicted with one electrical contact 614 of the two or more electrical contacts (e.g., a conductive ink, a silver-based conductive ink, or another low-resistance material), spaced apart and in contact with an area of the FSR 604 material of FSM 602/604. In a further non-limiting aspect, non-limiting embodiments of an environmental compensation element can comprise or be associated with PCB or other electrode substrate 612 with sensor grid electrodes 610 and two or more electrical contacts, corresponding to locations of the FSM 602/604 electrical contacts (e.g., electrical contact 614 of the two or more electrical contacts). In yet another non-limiting aspect, one or more of the FSM 602/604 electrical contacts (e.g., electrical contact 614 of the two or more electrical contacts) can comprise plated through-hole contacts 616, located to correspond to electrical contact 614 of the two or more electrical contacts, and for which ring adhesive 606 can be configured to accept a conductive adhesive 618 (e.g., via an opening in the ring adhesive 606) that can be applied after lamination of the FSM 602/604 with the PCB or other electrode substrate 612 to make electrical contact between the electrical contact 614 of the two or more electrical contacts of the FSM 602/604 with the plated through-hole (PTH) contacts 616 of the PCB or other electrode substrate 612. In the non-limiting embodiment depicted in FIG. 6, PCB or other electrode substrate 612 is depicted with one electrical contact 616 of the two or more electrical contacts, corresponding to locations of the FSM 602/604 two or more electrical contacts (e.g., electrical contact 614 of the two or more electrical contacts). In a further non-limiting aspect, other exemplary embodiments of the two or more electrical contacts of the FSM 602/604 with the plated through-hole (PTH) contacts 616 of the PCB or other electrode substrate 612 can be formed with PCB or other electrode substrate 612 to make electrical contact between the electrical contact 614 and PCB or other electrode substrate 612 other than via use of a conductive adhesive 618 (e.g., via another conductive material such as a conductor, a metal, a carbon particulate, carbon nanotubes, an organometallic material, or other suitable conductive material).

In still other non-limiting aspects, non-limiting embodiments of an environmental compensation element can comprise or be associated with exemplary control circuitry (not shown), as further described herein regarding FIGS. 1-4, for example, comprising components, or portions thereof, configured to generate a voltage or other measurable electrical characteristic proportionate to the measured resistance across the FSM 602/604 contacts (e.g., electrical contact 614 of the two or more electrical contacts). In a further non-limiting aspect, non-limiting embodiments of an environmental compensation element can comprise or be associated with exemplary control logic (not shown), as further described herein regarding FIGS. 1-4, for example, configured to the employ the generated voltage or other measurable electrical characteristic to derive a variable factor (e.g., an environmental compensation factor) that can be applied to modify values in a pre-existing calibration table (not shown) for an exemplary force-sensing resistor or resistive touch sensor associated with a force/pressure grid array (e.g., VIA 210) to create an environmentally-compensated calibration table (not shown). In various non-limiting embodiments described herein, an exemplary environmentally-compensated calibration table can be employed to readily compensate for historical environmental changes (including instantaneous environmental changes), as it reports and compensates for whatever electrical properties the FSR 604 material exhibits at any given point in time, regardless of whether they are the same or even close to the original values.

Figure 7:
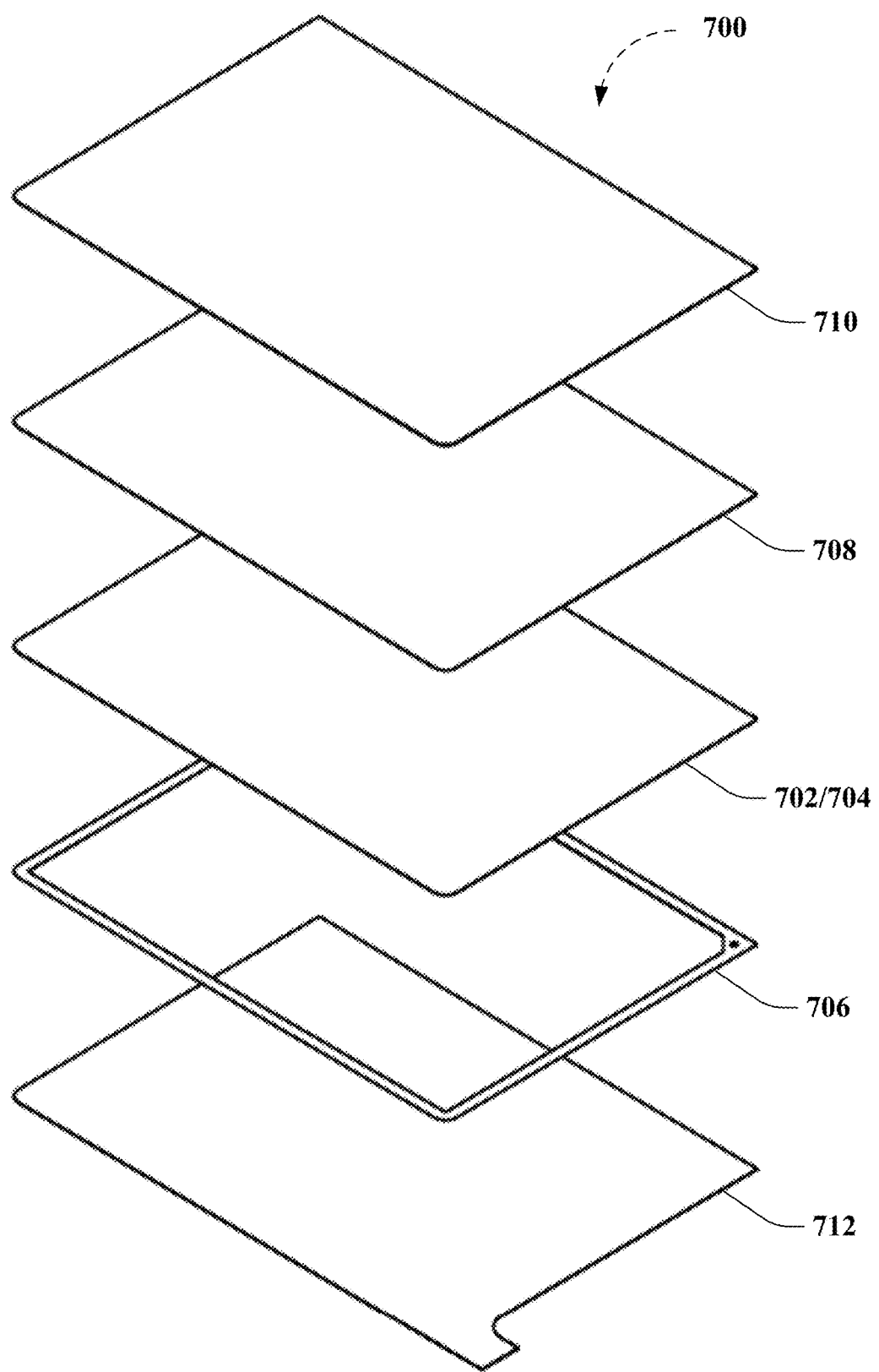
FIG. 7 depicts an exploded view of an another exemplary embodiment of an environmental compensation element associated with a force-sensing membrane (FSM), according to the disclosed subject matter.

Further variations as described above regarding FIG. 5 are applicable in the various embodiments described herein regarding FIGS. 6-7, for example.

FIG. 7 depicts an exploded view 700 of an another exemplary embodiment of an environmental compensation element associated with a FSM 702/704, according to the disclosed subject matter. The embodiment depicted in FIG. 7 employs similar numbering to that of FIGS. 1 and 5-6. As such, the descriptions of various devices, systems, and operations described herein regarding FIGS. 1-4 can be understood, depending on context, to apply to the exemplary embodiment of an environmental compensation element depicted in FIG. 7. Accordingly, exemplary embodiment of environmental compensation element associated with a FSM 702/704 can comprise a flexible membrane 702, a conductive layer 704 (depicted as combined flexible membrane with FSR or conductive layer of FSM 702/704), and adhesive seal-ring 706. In other non-limiting implementations, exemplary FSM 702/704 can comprise or be associated with an adhesive for tactile surface adhesive 708 and a tactile surface membrane 710. FIG. 7 further depicts an exemplary release liner 712, which can be removed preparatory to attaching FSM 702/704 to a suitably configured PCB or other electrode substrate 612 (not shown). Note that in FIG. 7 the views of the sub-components are depicted and described regarding FIGS. 8-12 as showing the top view in FIG. 7.

Figure 8:
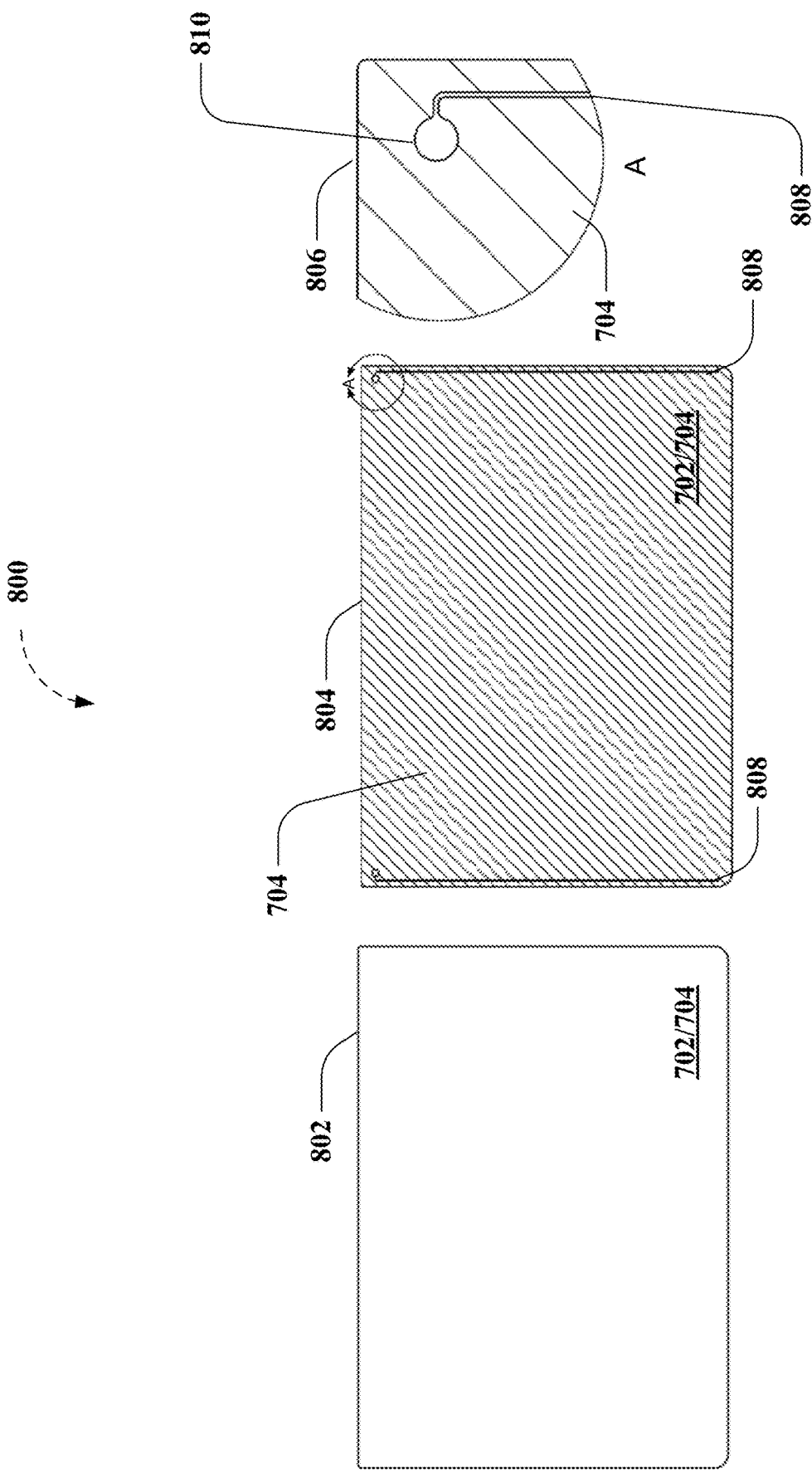
FIG. 8 depicts non-limiting aspects of sub-assemblies of the exemplary embodiment depicted in FIG. 7, according to the disclosed subject matter.

FIG. 8 depicts non-limiting aspects of sub-assemblies 800 of the exemplary embodiment depicted in FIG. 7, according to the disclosed subject matter. FIG. 8 depicts top view 802, bottom view 804, and detail view A 806 of FSM 702/704 as depicted in FIG. 7. Bottom view 804 depicts an application of a FSR ink 704 associated with exemplary FSR 704 material of FSM 702/704, as further described herein. FIG. 8 further depicts a conductive ink 808 (e.g., a conductive ink, a silver-based conductive ink, or another low-resistance material), deposited on FSR ink 704, and configured as portions of an electrical contact 810 of the two or more electrical contacts associated with FSM 702/704, as further described herein.

Figure 9:
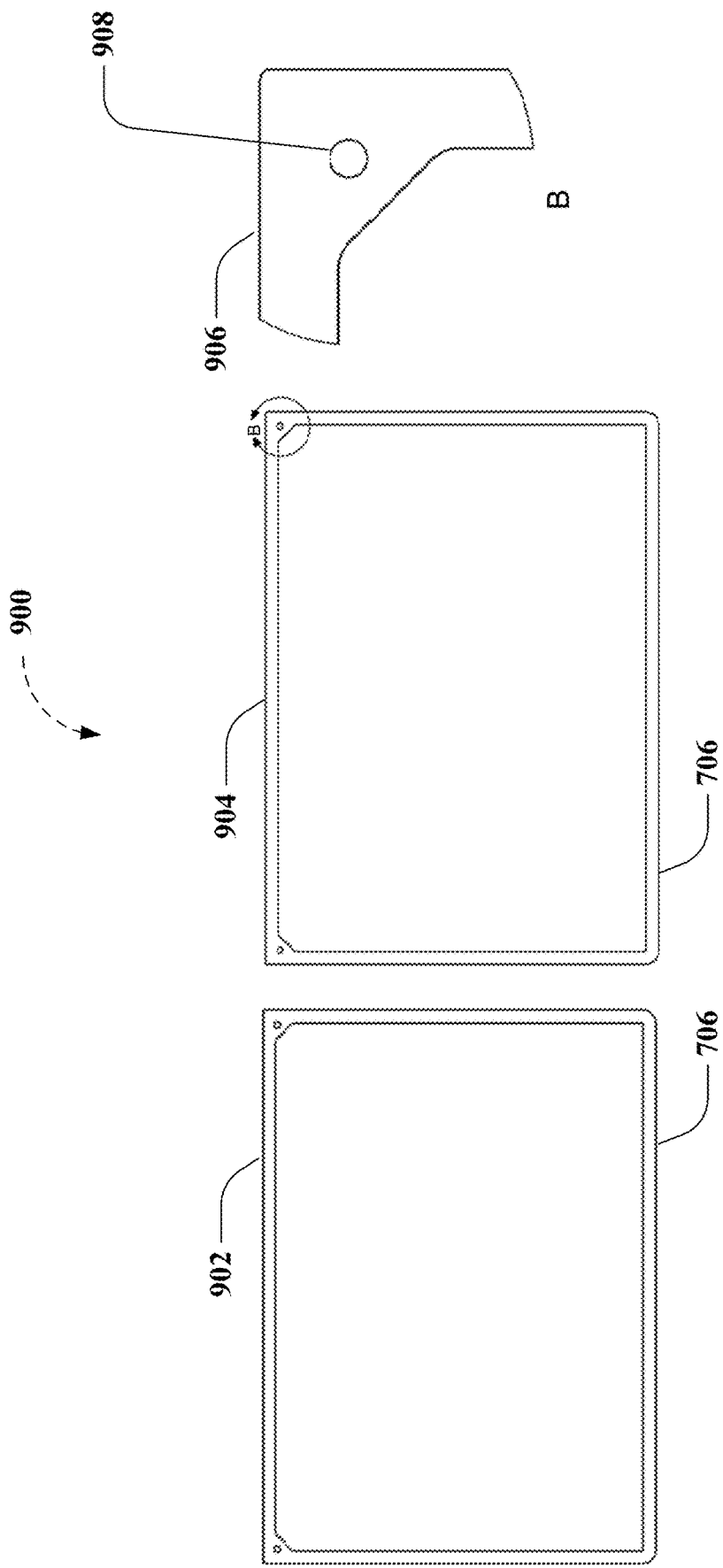
FIG. 9 depicts further non-limiting aspects of sub-assemblies of the exemplary embodiment depicted in FIG. 7.

FIG. 9 depicts further non-limiting aspects of sub-assemblies 900 of the exemplary embodiment depicted in FIG. 7. FIG. 9 depicts top view 902, bottom view 904, and detail view B 906 of adhesive seal ring 706 as depicted in FIG. 7. FIG. 8 further depicts an exemplary opening 908 in the ring adhesive 706, which ring adhesive can be configured to accept a conductive adhesive, such as conductive adhesive 618 (e.g., via an opening in the ring adhesive 606) that can be applied after lamination of the FSM 602/604 with the PCB or other electrode substrate 612 to make electrical contact between the electrical contact 614 of the two or more electrical contacts of the FSM 602/604 with PTH contacts 616 of the PCB or other electrode substrate 612, as described above regarding FIG. 6.

Figure 10:
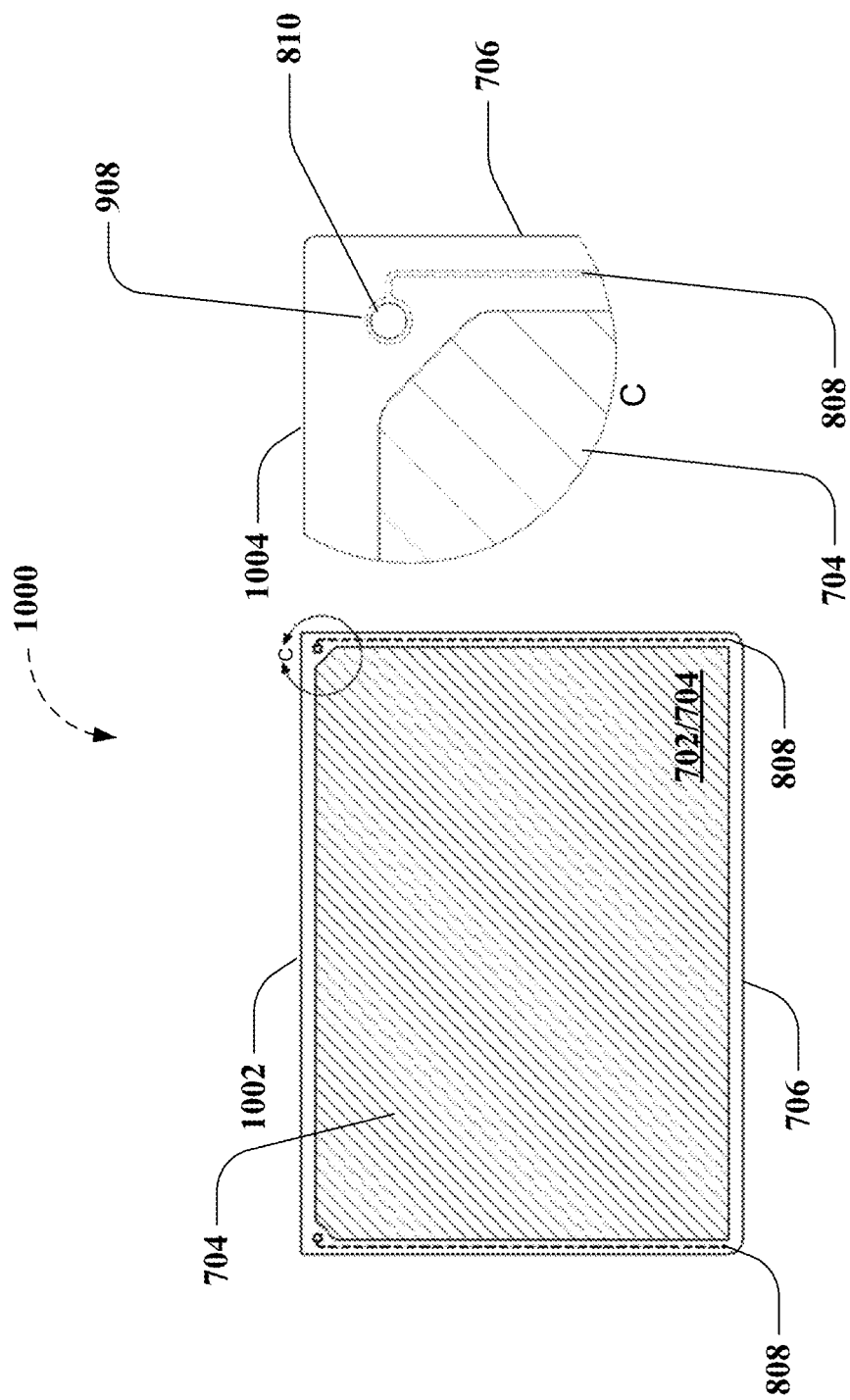
FIG. 10 depicts still further non-limiting aspects of sub-assemblies of the exemplary embodiment depicted in FIG. 7.

FIG. 10 depicts still further non-limiting aspects of sub-assemblies of the exemplary embodiment depicted in FIG. 7. FIG. 10 depicts bottom view 1002 and detail view C 1004 of an exemplary sub-assembly of force-sensing membrane FSM 702/704 and adhesive seal-ring 706, as further described above regarding FIGS. 7-9.

Figure 11:
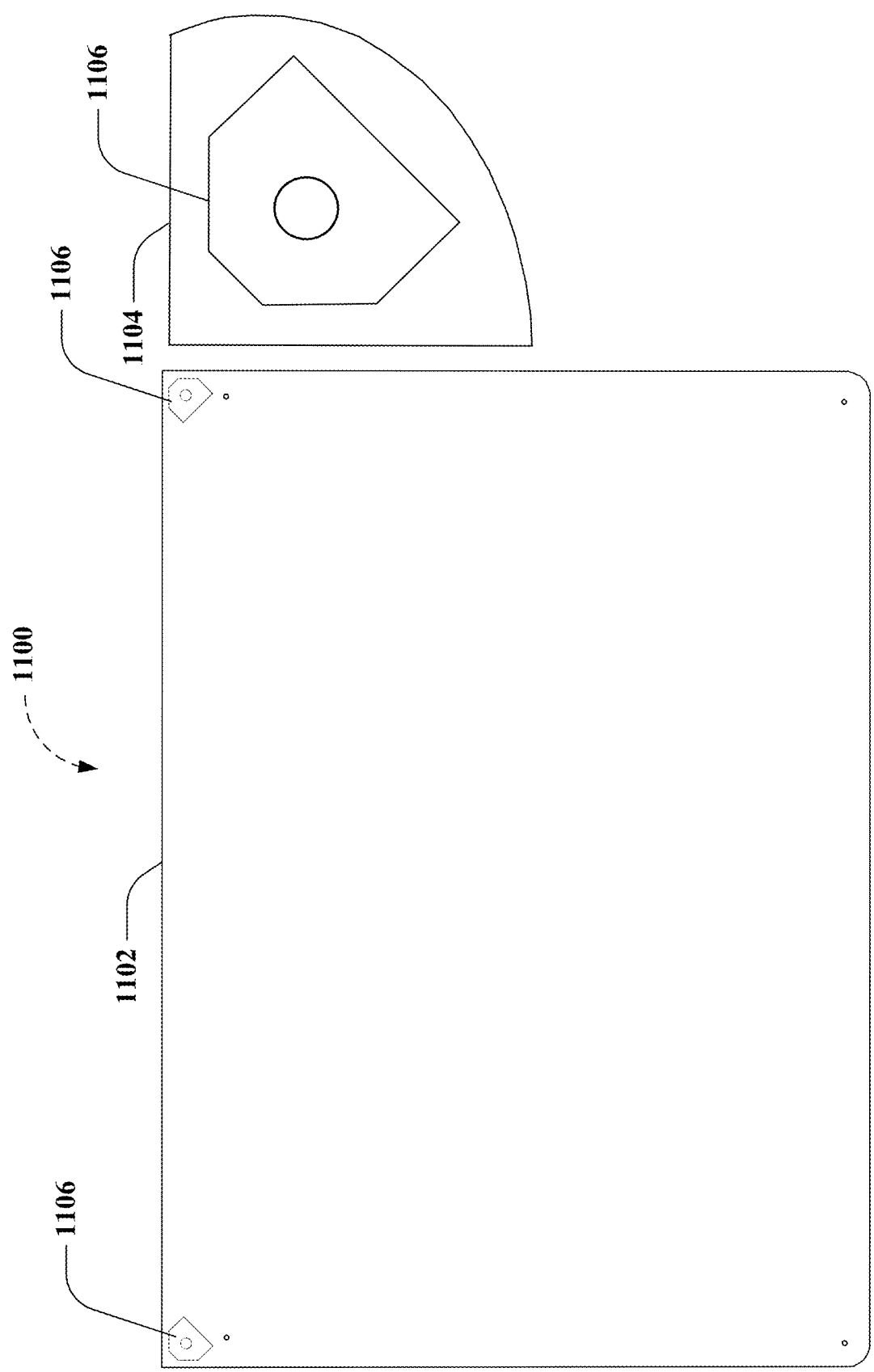
FIG. 11 depicts other non-limiting aspects of sub-assemblies of the exemplary embodiment depicted in FIG. 7, according to the disclosed subject matter.

FIG. 11 depicts other non-limiting aspects of sub-assemblies of the exemplary embodiment depicted in FIG. 7, according to the disclosed subject matter. For instance, FIG. 11 depicts an exemplary PCB or other electrode substrate 1100, top view 1102, and detail view 1104. As described above, FIG. 7 further depicts an exemplary release liner 712, which can be removed preparatory to attaching or laminating FSM 702/704 to a suitably configured PCB or other electrode substrate, such as exemplary PCB or other electrode substrate 1100. Note that exemplary PCB or other electrode substrate 1000 is shown without corresponding electrodes associated with grouping of sensor electrodes 610 associated with a force/pressure grid array (e.g., VIA 210), as described above regarding FIG. 6, for example, formed on exemplary printed circuit board or other electrode substrate 1100. However, as further described above, FIG. 11 depicts exemplary PCB or other electrode substrate 1100 PTH contacts 1106, which, upon attachment or lamination of the FSM 702/704 with the PCB or other electrode substrate 1000 to make electrical contact between electrical contact 810 of the two or more electrical contacts associated with FSM 702/704, exemplary opening 908 in the ring adhesive 706, and PTH contacts 1106, can be configured to align with electrical contact 810 of the two or more electrical contacts associated with FSM 702/704, for example, as further depicted in FIG. 12.

Figure 12:
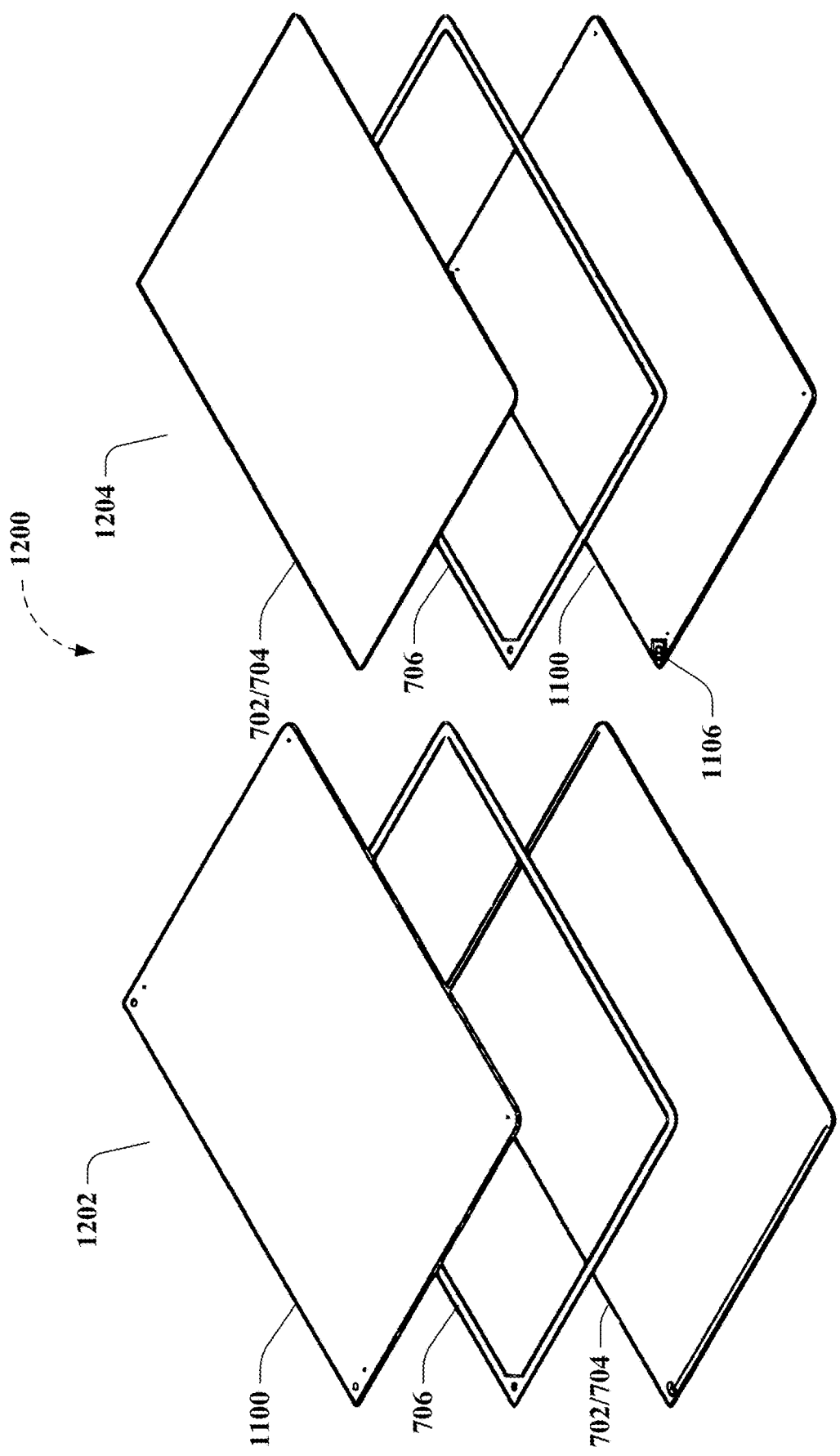
FIG. 12 depicts further non-limiting aspects of sub-assemblies of the exemplary embodiment depicted in FIG. 7.

FIG. 12 depicts further non-limiting aspects of sub-assemblies 1200 of the exemplary embodiment depicted in FIG. 7. For instance, as described above regarding FIG. 11, FIG. 12 depicts a bottom view 1202 and a top view 1204 of an exemplary sub-assembly of exemplary FSM 702/704, ring adhesive 706, and exemplary PCB or other electrode substrate 1100 having exemplary PTH contacts 1106, for which ring adhesive 706 can be configured to accept a conductive adhesive (e.g., such as a conductive adhesive 618 or other conductive material) that can be applied after lamination of the FSM 702/704 with the PCB or other electrode substrate 1100 to make electrical contact between the electrical contact 810 of the two or more electrical contacts of the FSM 702/704 with the PTH contacts 1106 of the PCB or other electrode substrate 1100. According to non-limiting aspects, exemplary PTH contacts 1106 of the PCB or other electrode substrate 1100 can comprise gold PTH contacts 1106. In another non-limiting aspects, conductive ink 808 (e.g., a conductive ink, a silver-based conductive ink, or another low-resistance material), deposited on FSR material or ink 704, and configured as portions of an electrical contact 810 of the two or more electrical contacts associated with FSM 702/704 can comprise a silver-based ink on or in contact with the FSR material or ink 704.

As further described above, FIG. 12 depicts exemplary PCB or other electrode substrate 1100 PTH contacts 1106, which, upon attachment or lamination of the FSM 702/704 with the PCB or other electrode substrate 1100 to make electrical contact between electrical contact 810 of the two or more electrical contacts associated with FSM 702/704, exemplary opening 908 in the ring adhesive 706, and PTH contacts 1106, can be configured to align with electrical contact 810 of the two or more electrical contacts associated with FSM 702/704, for example, as further depicted in FIG. 12. In still further non-limiting aspects, a conductive adhesive, such as conductive adhesive 618 (e.g., via an opening in the ring adhesive 908) can be applied after lamination of the FSM 702/704 with the PCB or other electrode substrate 1100 to make electrical contact between the electrical contact 810 of the two or more electrical contacts of the FSM 702/704 with PTH contacts 1106 of the PCB or other electrode substrate 1100, as further described above regarding FIG. 6, upon which the conductive adhesive, such as conductive adhesive 618, can be cured.

Figure 13:
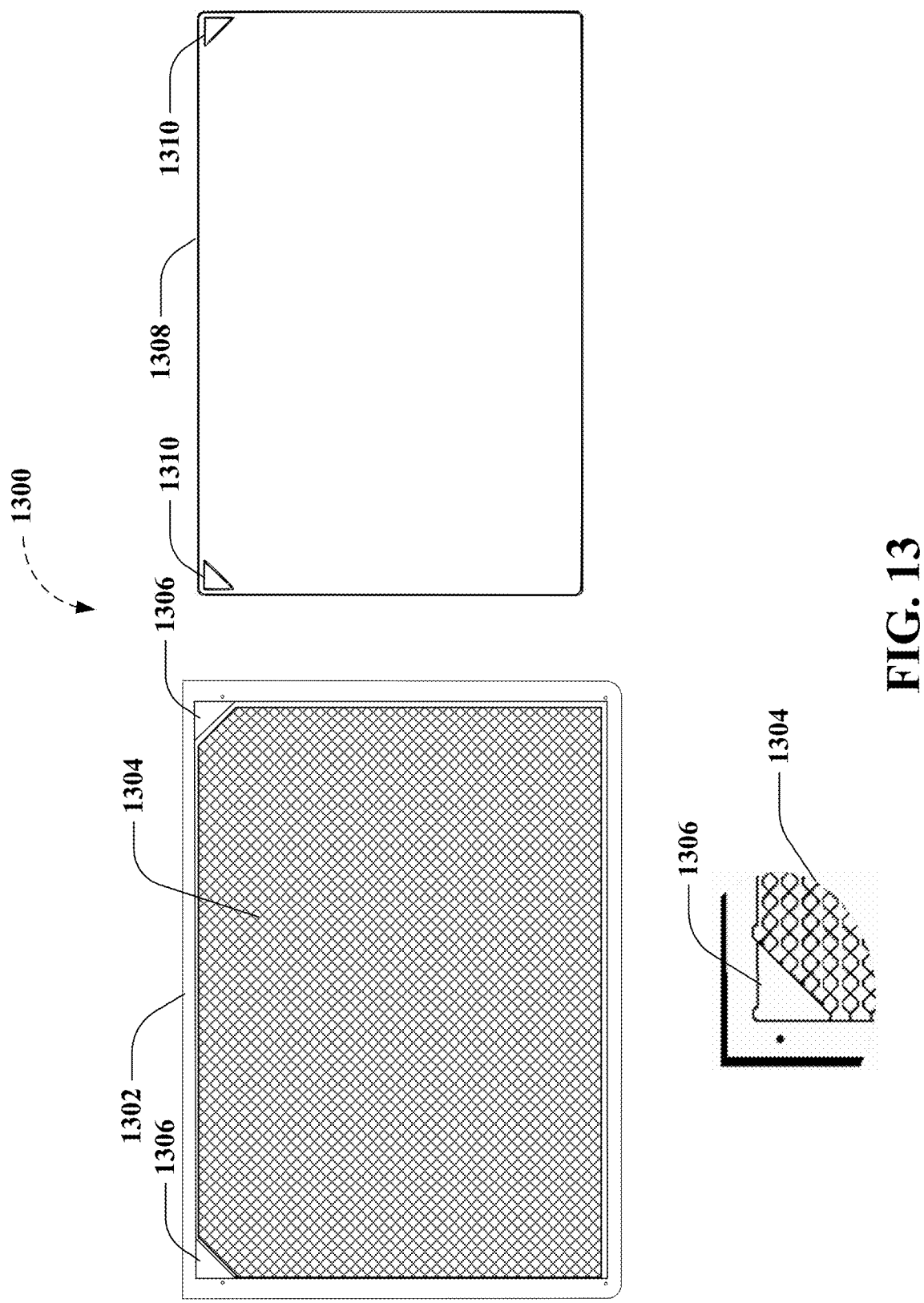
FIG. 13 depicts still other non-limiting aspects of disclosed embodiments of an environmental compensation element.

FIG. 13 depicts still other non-limiting aspects of disclosed embodiments of an environmental compensation element. For instance, FIG. 13 depicts an exemplary FSM 1302/1304 comprising a flexible membrane 130202 and a conductive layer 1304 (depicted as combined flexible membrane with FSR or conductive layer 1304 of FSM 1302/1304). In a non-limiting aspect, FSM 1302/1304 can comprise electrical contacts 1306 of the two or more electrical contacts associated with FSM 1302/1304. FIG. 13 further depicts an exemplary PCB or other electrode substrate 1308 having exemplary electrical contacts 1306 of the two or more electrical contacts associated with FSM 1302/1304. As with FIG. 11, note that exemplary PCB or other electrode substrate 1308 is shown without corresponding electrodes associated with grouping of sensor electrodes (e.g., such as sensor electrodes 510, 610) associated with a force/pressure grid array (e.g., VIA 210), as described above regarding FIGS. 5-6 and 11, for example, formed on exemplary printed circuit board or other electrode substrate 1308.

According to non-limiting aspects, exemplary electrical contacts 1310 of the PCB or other electrode substrate 1308 can comprise gold plated contacts 1310. In another non-limiting aspects, conductive ink 808 (e.g., a conductive ink, a silver-based conductive ink, or another low-resistance material), deposited on FSR material or ink 1304, and configured as electrical contacts 1306 of the two or more electrical contacts associated with FSM 1302/1304 can comprise a silver-based ink on or in contact with the FSR 1304 material or ink. In still further non-limiting aspects, a conductive adhesive, such as conductive adhesive applied before lamination of the FSM 1302/1304 with the PCB or other electrode substrate 1308 to make electrical contact between the electrical contacts 1306 of the two or more electrical contacts of the FSM 1302/1304 with electrical contacts 1310 of the PCB or other electrode substrate 1308, as further described herein regarding FIG. 14.

Figure 14:
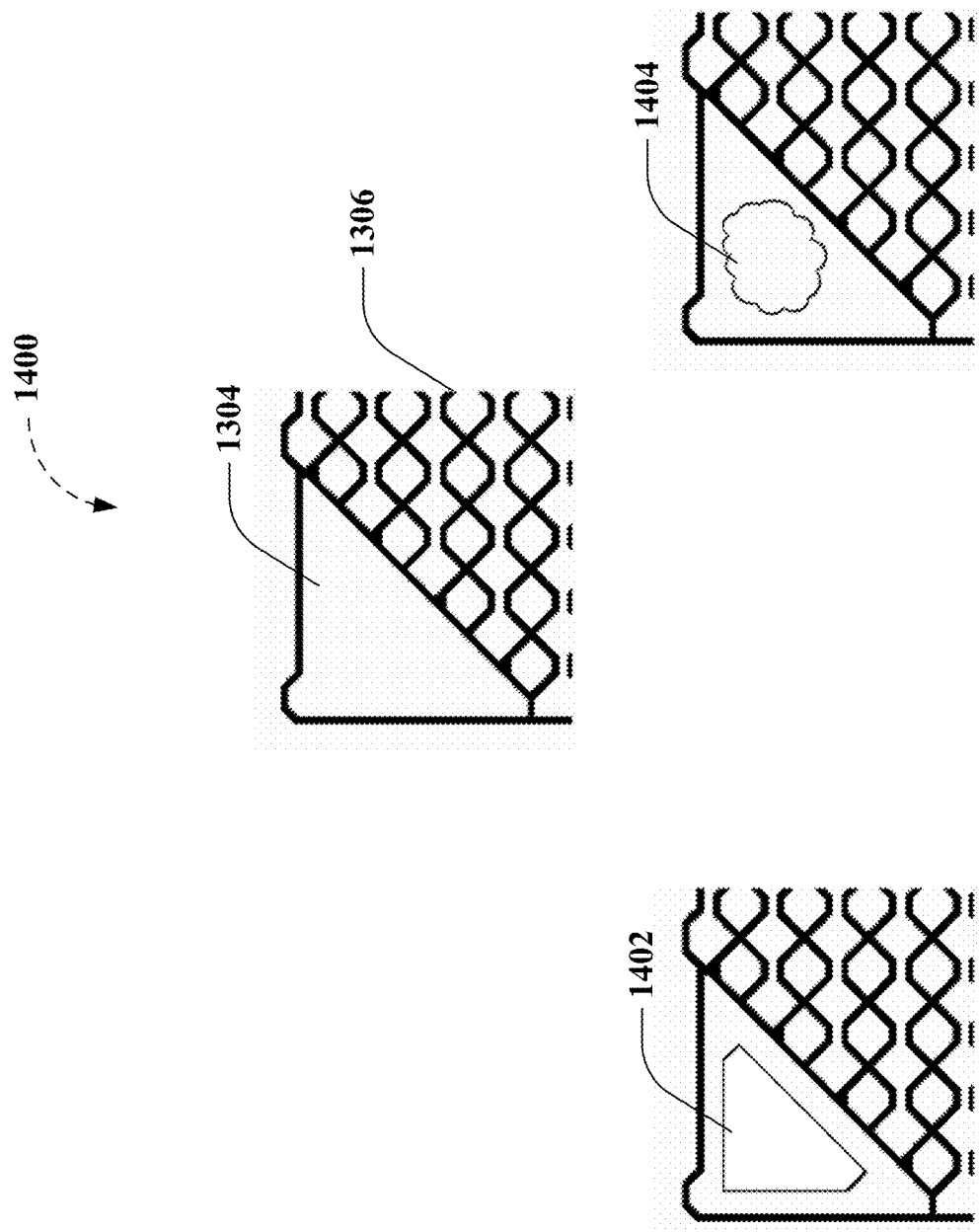
FIG. 14 depicts still other non-limiting aspects of an exemplary environmental compensation element, according to the disclosed subject matter.

FIG. 14 depicts still other non-limiting aspects of an exemplary environmental compensation element, according to the disclosed subject matter. For instance, FIG. 14 depicts a conductive adhesive, such as dry film conductive adhesive 1402 and a liquid adhesive 1404 (e.g., a conductive epoxy) that can applied before lamination of the FSM 1302/1304 with the PCB or other electrode substrate 1308 to make electrical contact between the electrical contacts 1306 of the two or more electrical contacts of the FSM 1302/1304 with electrical contacts 1310 of the PCB or other electrode substrate 1308. In an exemplary application of a liquid adhesive 1404, heat and pressure can be applied to cure the liquid adhesive 1404, which can be optionally performed in the exemplary application of a dry film 1402.

Figure 15:
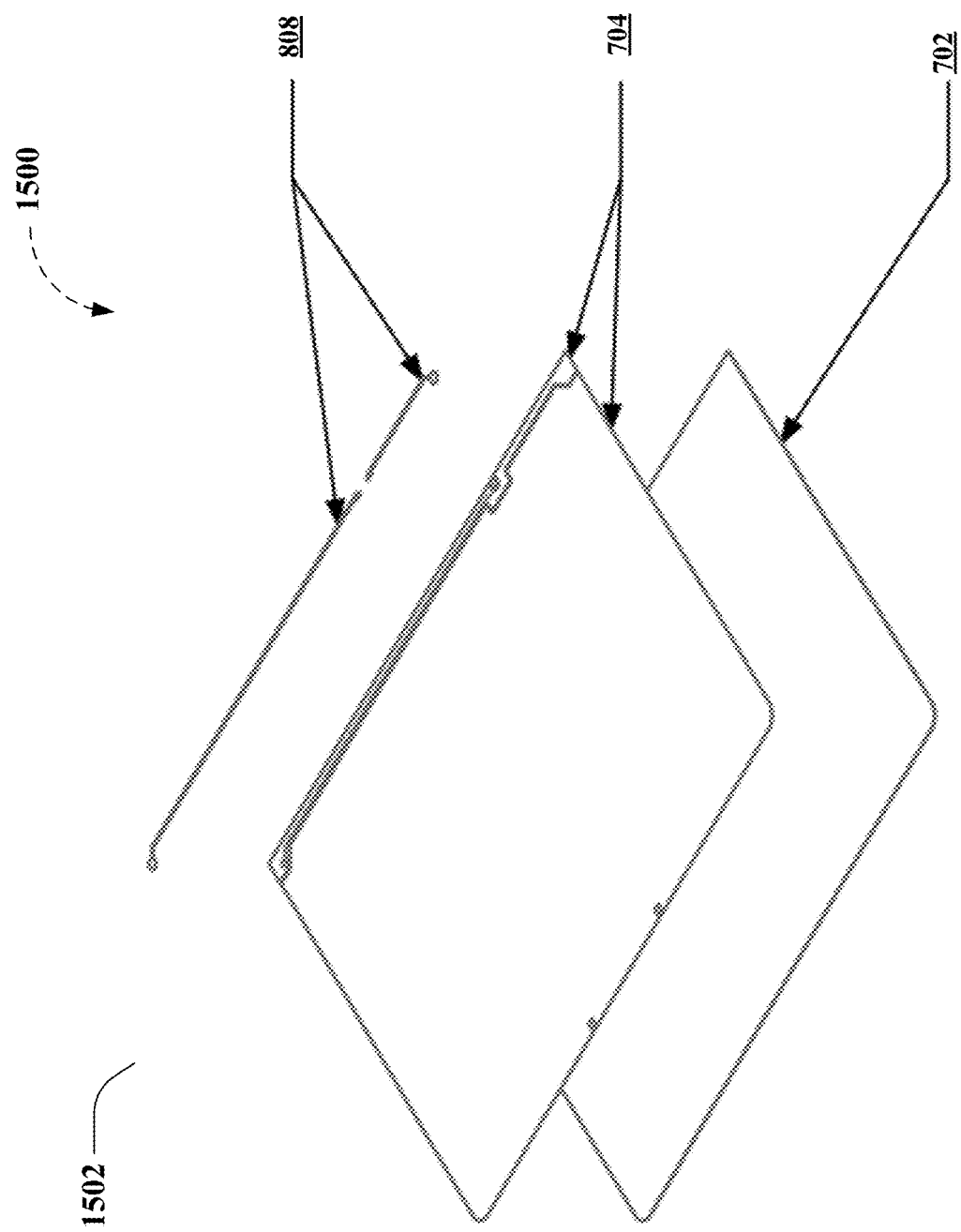
FIG. 15 depicts non-limiting aspects of further exemplary sub-assemblies of the embodiment depicted in FIG. 7, according to the disclosed subject matter.

FIG. 15 depicts further non-limiting aspects of another exemplary sub-assembly 1500 of the exemplary embodiment depicted in FIG. 7. For instance, as described above regarding FIG. 11, FIG. 15 depicts a bottom view 1502 of an exemplary sub-assembly 1500 of exemplary FSM 702/704, for which ring adhesive 706 (not shown) can be configured to accept a conductive adhesive (e.g., such as a conductive adhesive 618 or other conductive material) that can be applied after lamination of the FSM 702/704 with the PCB or other electrode substrate 1100 to make electrical contact between the electrical contact 810 of the two or more electrical contacts of the FSM 702/704 with the PTH contacts 1106 of the PCB or other electrode substrate 1100. According to non-limiting aspects, exemplary PTH contacts 1106 of the PCB or other electrode substrate 1100 can comprise gold PTH contacts 1106. In another non-limiting aspect, conductive ink 808 (e.g., a conductive ink, a silver-based conductive ink, or another low-resistance material), deposited on FSR material or ink 704, and configured as portions of an electrical contact 810 of the two or more electrical contacts associated with FSM 702/704 can comprise a silver-based ink on or in contact with the FSR material or ink 704.

As further described above, regarding FIGS. 7-12, for example, FIG. 15 depicts exemplary sub-assembly of exemplary FSM 702/704, for which exemplary PCB or other electrode substrate 1100 PTH contacts 1106, upon attachment or lamination of the FSM 702/704 with the PCB or other electrode substrate 1100 to make electrical contact between electrical contact 810 of the two or more electrical contacts associated with FSM 702/704, exemplary opening 908 in the ring adhesive 706, and PTH contacts 1106, can be configured to align with electrical contact 810 of the two or more electrical contacts associated with FSM 702/704, for example, as further depicted in FIG. 15. In still further non-limiting aspects, a conductive adhesive, such as conductive adhesive 618 (e.g., via an opening in the ring adhesive 908) can be applied after lamination of the FSM 702/704 with the PCB or other electrode substrate 1100 to make electrical contact between the electrical contact 810 of the two or more electrical contacts of the FSM 702/704 with PTH contacts 1106 of the PCB or other electrode substrate 1100, as further described above regarding FIG. 6, upon which the conductive adhesive, such as conductive adhesive 618, can be cured.

Figure 16:
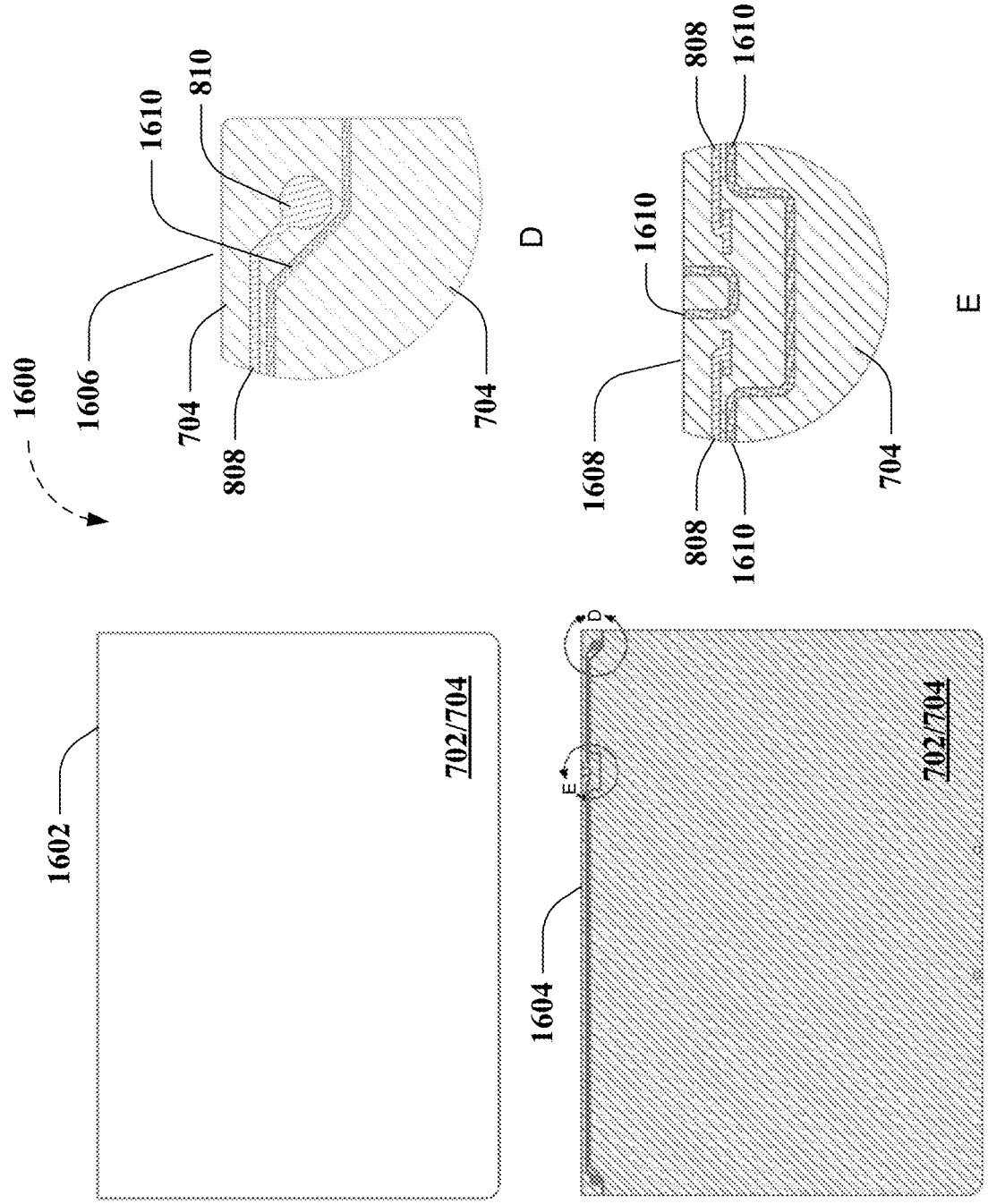
FIG. 16 depicts further non-limiting aspects of sub-assemblies of the exemplary embodiment depicted in FIG. 7.

FIG. 16 depicts non-limiting aspects of sub-assemblies 1500 of the exemplary embodiment depicted in FIG. 15, according to the disclosed subject matter. FIG. 16 depicts top view 1602, bottom view 1604, detail view D 1606, and detail view E 1608 of FSM 702/704 as depicted in FIG. 15. Bottom view 804 depicts an application of a FSR ink 704 associated with exemplary FSR 704 material of FSM 702/704, as further described herein. FIG. 16 further depicts a conductive ink 808 (e.g., a conductive ink, a silver-based conductive ink, or another low-resistance material), deposited on FSR ink 704, and configured as portions of an electrical contact 810 of the two or more electrical contacts associated with FSM 702/704, as further described herein. In addition, FIG. 16 depicts areas 1610 of no FSR ink 704, which separates exemplary resistive force or touch sensor device areas of FSR ink 704 of exemplary FSM 702/704 from an exemplary embodiment of a separate or discrete environmental compensation element associated with a FSM 702/704, associated with exemplary resistive force or touch sensor device areas of FSR ink 704 of exemplary FSM 702/704, thereby creating an exemplary separate or discrete environmental compensation element associated with a FSM 702/704.

FIG. 17 depicts still further non-limiting aspects of sub-assemblies of the exemplary embodiment depicted in FIG. 7. FIG. 17 depicts bottom view 1702, detail view F 1704, and detail view G 1706, of an exemplary sub-assembly of force-sensing membrane FSM 702/704 and adhesive sealring 706, for an exemplary separate environmental compensation element associated with a FSM 702/704, as further described above regarding FIGS. 7-10, for example.

FIG. 18 depicts a non-limiting conceptual block diagram 1800 illustrating exemplary aspects of environmental compensation or correction for a sensor 1802 (e.g., exemplary resistive force or touch sensor device associated with of exemplary FSM 702/704, and so on), according to non-limiting aspects described herein. For instance, block diagram 1800, illustrates, conceptually an overview of the process by which an uncorrected sensor response 1804 can be employed to produce a compensated sensor response 1806, according to various embodiments. As further described herein, environmental factors, such as temperature 1808, humidity and time 1810, and so on can impact the sensitivity a sensor 1802 (e.g., exemplary resistive force or touch sensor device associated with exemplary FSM 702/704, and so on), which can result in an induced change in FSR resistance 1812 associated with FSR ink 704 of exemplary FSM 702/704, and so on. As further described herein, an exemplary processor 410, exemplary control logic component 340, portions thereof, and/or otherwise, such as an MCU (not shown), associated with an exemplary resistive force or touch sensor device, can comprise a temperature sensor 1816, which can be employed to determine a temperature associated with exemplary resistive force or touch sensor device, as further described herein, regarding FIGS. 4-5 and 19-20.

Figure 24:
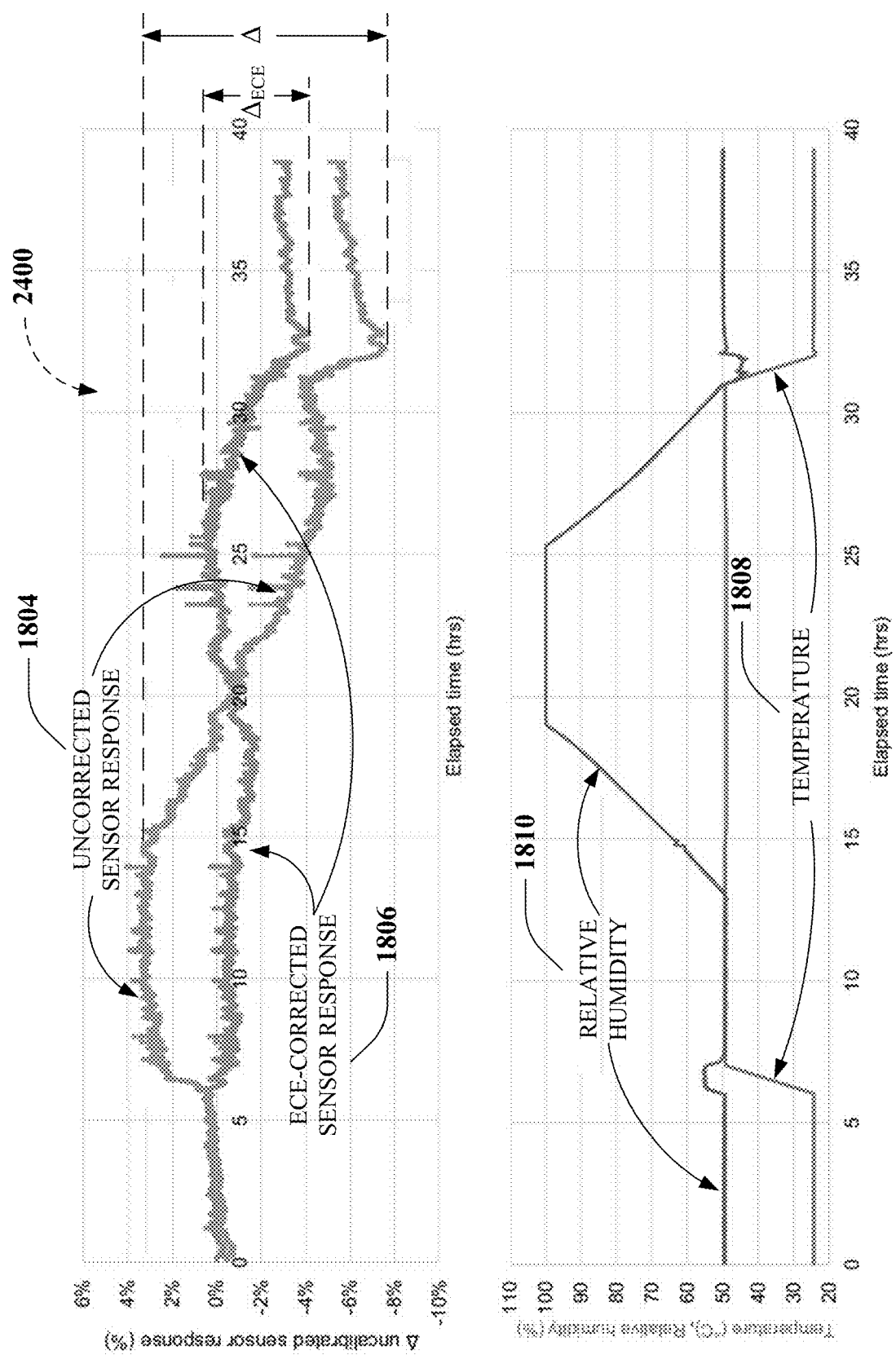
FIG. 24 demonstrates exemplary performance characteristics associated with non-limiting embodiments described herein.

Accordingly, an exemplary environmental compensation element 1814 as described herein can account for such environmental factors as function of varied sheet resistance of FSR ink 704 as a result of changes in such environmental factors, by taking into account temperature 1808 from an exemplary temperature sensor 1816 associated with exemplary resistive force or touch sensor device associated with exemplary FSM 702/704, and so on, and experimentally gathered data 1818 of exemplary FSM 702/704, and so on, to determine an exemplary correction factor or environmental compensation factor 1820, to facilitate correction or compensation of an uncorrected sensor response 1804, and to determine a compensated sensor response 1806, as further described herein, regarding FIGS. 19-20 and 24, for example.

In a non-limiting embodiment, the subject disclosure provides an exemplary apparatus (e.g., an exemplary resistive force or touch sensor device (e.g., exemplary resistive force or touch sensor device associated with FSM 502/504, 602/604, 702/704, 1302/1304)) comprising an exemplary FSM (e.g., FSM 502/504, 602/604, 702/704, 1302/1304) comprising an ECE of the FSM (e.g., FSM 502/504, 602/604, 702/704, 1302/1304) or portions thereof adapted to allow measurement of one or more electrical characteristic associated with sheet resistance, wherein the ECE comprises at least a conductive element (e.g., a conductive ink, a silver-based conductive ink, or another low-resistance material) electrically coupled to the FSM (e.g., FSM 502/504, 602/604, 702/704, 1302/1304).

In a non-limiting aspect, exemplary apparatus (e.g., an exemplary resistive force or touch sensor device (e.g., exemplary resistive force or touch sensor device associated with FSM 502/504, 602/604, 702/704, 1302/1304)) can further comprise two or more electrical contacts (e.g., FSM electrical contacts 514, 614, 810, 1204, 1306) associated with the ECE on the FSM (e.g., FSM 502/504, 602/604, 702/704, 1302/1304) that can be adapted to electrically couple control circuitry configured to determine the one or more electrical characteristic associated with sheet resistance for use in determination of an environmental compensation factor to a measurement of a force applied to the FSM (e.g., FSM 502/504, 602/604, 702/704, 1302/1304) in operation of the apparatus, for example, as further described herein regarding FIGS. 3-4. In another non-limiting aspect, the two or more electrical contacts (e.g., FSM electrical contacts 514, 614, 810, 1204, 1306) associated with the ECE on the FSM (e.g., FSM 502/504, 602/604, 702/704, 1302/1304) can comprise or be associated with a zero insertion force (ZIF) connector or portions thereof.

In other non-limiting aspects, exemplary FSM (e.g., FSM 502/504, 602/604, 702/704, 1302/1304) can comprise one or more of a polymer, a polymer membrane, a polyethylene terephthalate (PET) membrane, a force-sensing layer comprising one or more of a force-sensitive polymer such as a polymer impregnated with carbon particles, a carbon nanotube material, or an indium-tin-oxide (ITO) material, a polymer membrane comprising one or more a FSR material (e.g., FSR material or ink 504, 604, 704, 1306) coating on a surface of the polymer membrane. In still other non-limiting aspects, two or more electrical contacts (e.g., FSM electrical contacts 514, 614, 810, 1204, 1306) can comprise can be located adjacent to the FSR material coating. In still other non-limiting aspects, two or more electrical contacts (e.g., FSM electrical contacts 514, 614, 810, 1204, 1306) associated with the ECE on the FSM can comprise a material consisting of one or more of a metal, a carbon particulate, carbon nanotubes, an organometallic material, or silver.

In a further non-limiting aspect, exemplary apparatus (e.g., an exemplary resistive force or touch sensor device (e.g., exemplary resistive force or touch sensor device associated with FSM 502/504, 602/604, 702/704, 1302/1304)) can further comprise a tactile surface layer (e.g., tactile surface membrane 710) on the FSM (e.g., FSM 502/504, 602/604, 702/704, 1302/1304) opposite the two or more electrical contacts (e.g., FSM electrical contacts 514, 614, 810, 1204, 1306). For instance, exemplary apparatus (e.g., an exemplary resistive force or touch sensor device (e.g., exemplary resistive force or touch sensor device associated with FSM 502/504, 602/604, 702/704, 1302/1304)) can further comprise a tactile surface layer (e.g., tactile surface membrane 710) comprising an adhesive tape (tactile surface adhesive 708) with a tactile surface (tactile surface membrane 710) opposite the two or more electrical contacts (e.g., FSM electrical contacts 514, 614, 810, 1204, 1306).

In still further non-limiting aspects, an exemplary apparatus (e.g., an exemplary resistive force or touch sensor device (e.g., exemplary resistive force or touch sensor device associated with FSM 502/504, 602/604, 702/704, 1302/1304)) can further comprise a two-dimensional array of electrodes, such as a force/pressure grid array (e.g., VIA 210), associated with the FSM (e.g., FSM 502/504, 602/604, 702/704, 1302/1304) adapted to make electrical contact representative of physical contact with the FSM (e.g., FSM 502/504, 602/604, 702/704, 1302/1304) at respective locations of the two-dimensional array with the force applied to the FSM (e.g., FSM 502/504, 602/604, 702/704, 1302/1304). In other non-limiting aspects, an exemplary apparatus (e.g., an exemplary resistive force or touch sensor device (e.g., exemplary resistive force or touch sensor device associated with FSM 502/504, 602/604, 702/704, 1302/1304)) can further comprise a PCB (e.g., PCB or other electrode substrate 512, 612, 1100, 1308) comprising the two-dimensional array of electrodes, such as a force/pressure grid array (e.g., VIA 210), adapted to complete the electrical contact of the two-dimensional array of electrodes, such as a force/pressure grid array (e.g., VIA 210), associated with the FSM (e.g., FSM 502/504, 602/604, 702/704, 1302/1304).

In addition, an exemplary apparatus (e.g., an exemplary resistive force or touch sensor device (e.g., exemplary resistive force or touch sensor device associated with FSM 502/504, 602/604, 702/704, 1302/1304)) can further comprise a bonding structure between the FSM (e.g., FSM 502/504, 602/604, 702/704, 1302/1304) and the PCB that mechanically affixes the FSM (e.g., FSM 502/504, 602/604, 702/704, 1302/1304) to the PCB and aligns the two-dimensional array of electrodes, such as a force/pressure grid array (e.g., VIA 210), associated with the FSM (e.g., FSM 502/504, 602/604, 702/704, 1302/1304). In a non-limiting aspect, an exemplary bonding structure can comprise an adhesive (e.g., ring adhesive 506, 606, 706) configured in a ring-shape and placed adjacent to the FSM (e.g., FSM 502/504, 602/604, 702/704, 1302/1304). In a further non-limiting aspect, exemplary adhesive (e.g., ring adhesive 506, 606, 706) can comprise one or more voids (e.g., opening 908) for accepting a conductive adhesive (e.g., a conductive adhesive, a liquid adhesive, a dry-film adhesive, a conductive epoxy) or a region of conductive material, each of which can be configured to electrically couple the two or more electrical contacts (e.g., FSM electrical contacts 514, 614, 810, 1204, 1306) associated with the ECE on the FSM (e.g., FSM 502/504, 602/604, 702/704, 1302/1304) to the PCB.

In further non-limiting aspects, exemplary PCB (e.g., PCB or other electrode substrate 512, 612, 1100, 1308) can further comprise a set of contacts (e.g., PCB electrical contacts 516, 616, 1106, 1310) corresponding to the two or more electrical contacts (e.g., FSM electrical contacts 514, 614, 810, 1204, 1306) that can be adapted to electrically couple the control circuitry configured to determine the one or more electrical characteristic associated with the sheet resistance, for example, as further described herein regarding FIGS. 3-14. In other non-limiting aspects, the exemplary set of contacts (e.g., PCB electrical contacts 516, 616, 1106, 1310) can comprise one or more of a set of PTH contacts (e.g., PTH contacts 606, 1106, gold PTH contacts) on the PCB or a set of electrical contact pads (e.g., contacts 506, 1310, gold contact pads) on the PCB (e.g., PCB or other electrode substrate 512, 612, 1100, 1308).

In still other non-limiting aspects, exemplary apparatus (e.g., an exemplary resistive force or touch sensor device (e.g., exemplary resistive force or touch sensor device associated with FSM 502/504, 602/604, 702/704, 1302/1304)) can further comprise the exemplary control circuitry that can be configured to determine the one or more electrical characteristic associated with sheet resistance for use in the determination of an environmental compensation factor to a measurement of a force applied to the FSM (e.g., FSM 502/504, 602/604, 702/704, 1302/1304) in operation of the apparatus, for example, as further described herein regarding FIGS. 3-4 and 18-23. In a non-limiting aspect, exemplary control circuitry can be further configured to derive the environmental compensation factor based in part on the sheet resistance during operation of the apparatus, for example, as further described herein regarding FIGS. 18-20. As a non-limiting example, an exemplary environmental compensation factor can comprise a function of varied sheet resistance as a result of a change in one or more environmental characteristic of the apparatus comprising temperature, humidity, or time at one or more of the temperature or the humidity. In addition exemplary control circuitry can be further configured to apply the environmental compensation factor to modify a predetermined calibration table (e.g., initial or permanent calibration table 2010) of a set of apparatus force responses to create an environmentally-compensated calibration table (e.g., compensated or environmentally compensated calibration table 2018).

In further non-limiting aspects, exemplary control circuitry can be further configured to apply the environmental compensation factor to modify the predetermined calibration table (e.g., initial or permanent calibration table 2010) of the set of apparatus force responses to create one or more of a locally environmentally-compensated calibration table (e.g., compensated or environmentally compensated calibration table 2018) specific to particular regions of the FSM (e.g., FSM 502/504, 602/604, 702/704, 1302/1304) or a globally environmentally-compensated calibration table (e.g., compensated or environmentally compensated calibration table 2018) applied globally to the FSM (e.g., FSM 502/504, 602/604, 702/704, 1302/1304), for example, as further described herein regarding FIG. 20. In still other non-limiting aspects, exemplary control circuitry can be electrically coupled to a temperature sensor, such as described herein regarding FIGS. 5 and 18, associated with the apparatus and can be further configured to one or more of derive the environmental compensation factor based on the sheet resistance and a temperature sensed by the temperature sensor or to derive humidity data associated with the apparatus based on one or more of the sheet resistance, the temperature sensed by the temperature sensor and the predetermined calibration table (e.g., initial or permanent calibration table 2010).

Further non-limiting embodiments of an exemplary system can comprise an exemplary ECE or portions thereof configured to allow measurement of one or more electrical characteristic associated with the sheet resistance for determination of an environmental compensation factor to a measurement of a force applied to the FSM (e.g., FSM 502/504, 602/604, 702/704, 1302/1304) in operation of the system, for example, as further described herein. For instance, an exemplary ECE can further comprise a conductive adhesive (e.g., a conductive adhesive, a liquid adhesive, a dry-film adhesive, a conductive epoxy) located between two or more electrical contacts (e.g., FSM electrical contacts 514, 614, 810, 1204, 1306) of the FSM (e.g., FSM 502/504, 602/604, 702/704, 1302/1304) and a corresponding set of contacts (e.g., PCB electrical contacts 516, 616, 1106, 1310) on the PCB that forms low-resistance electrical coupling between the FSM (e.g., FSM 502/504, 602/604, 702/704, 1302/1304) and the PCB (e.g., PCB or other electrode substrate 512, 612, 1100, 1308).

Other non-limiting embodiments of an exemplary system can comprise exemplary control circuitry electrically coupled to the two or more contacts and configured to allow measurement of the one or more electrical characteristic associated with the sheet resistance for use as the environmental compensation factor to a measurement of a force applied to the FSM (e.g., FSM 502/504, 602/604, 702/704, 1302/1304) in operation of the apparatus, for example, as further described herein regarding FIGS. 3-4. In a non-limiting aspect, exemplary control circuitry can be configured to generate a voltage proportionate to the sheet resistance.

In still other non-limiting aspects, an exemplary system can further comprise one or more a memory (e.g., nonvolatile memory 344, memory 406, memory 410, system memory 2006, portions or combinations thereof, or other suitable memory particularly selected and suitable for the purpose) comprising computer executable instructions or components such as compensation component 414, stored data, algorithms, and control logic (e.g., control logic 340, or otherwise, as described herein) for operation and environmental compensation of the system and a processor (e.g., processor 404, processor 410, processing unit 2004) configured to execute one or more of the computer executable instructions or components, algorithms, or control logic, process the stored data, and other operations as disclosed herein. In yet another non-limiting aspect, exemplary control logic can be configured to determine a variable factor applied to modify values in a pre-determined calibration table (e.g., initial or permanent calibration table 1610 2010) of the FSM (e.g., FSM 502/504, 602/604, 702/704, 1302/1304) to create an environmentally-compensated calibration table (e.g., compensated or environmentally compensated calibration table 2018) for the FSM (e.g., FSM 502/504, 602/604, 702/704, 1302/1304), wherein the control logic can be configured to determine the variable factor based on the sheet resistance, in another non-limiting aspect, for example, as described herein regarding FIGS. 18-20.

While for purposes of illustration, and not limitation, various disclosed processes have been described as occurring in or performed by control circuitry and/or control logic or portions or combinations thereof. However, one skilled in the art understands the basic interchangeability of at least some aspects of electrical circuitry and components and control logic executed on a processor such as a microcontroller or a microprocessor. Accordingly, depending on context, various disclosed processes described as being as occurring in or performed by either control circuitry or control logic can be understood to encompass suitable processes occurring in or performed by the counterpart as understood and available to one skilled in the art.

Accordingly, further non-limiting embodiments, according to various disclosed aspects, can comprise a system comprising an exemplary apparatus (e.g., an exemplary resistive force or touch sensor device (e.g., exemplary resistive force or touch sensor device associated with FSM 502/504, 602/604, 702/704, 1302/1304)), a memory that stores computer-executable instructions for operation of the exemplary apparatus and environmental compensation of the exemplary resistive force or touch sensor device, as described herein regarding FIGS. 1-23, and a processor configured to execute one or more computer executable instructions.

In still further non-limiting embodiments, according to various disclosed aspects, can comprise a system comprising an exemplary apparatus (e.g., an exemplary resistive force or touch sensor device (e.g., exemplary resistive force or touch sensor device associated with FSM 502/504, 602/604, 702/704, 1302/1304)), means for measurement of one or more electrical characteristic associated with the sheet resistance for use as the environmental compensation factor to a measurement of a force applied to the FSM (e.g., FSM 502/504, 602/604, 702/704, 1302/1304) in operation of the apparatus, for example, as further described herein. In other non-limiting aspects, exemplary apparatus (e.g., an exemplary resistive force or touch sensor device (e.g., exemplary resistive force or touch sensor device associated with FSM 502/504, 602/604, 702/704, 1302/1304)) can further comprise means for applying an environmental compensation to the apparatus.

In still other non-limiting aspects, exemplary means for applying an environmental compensation to the apparatus can comprise means for modifying a predetermined calibration table (e.g., initial or permanent calibration table 2010) of a set of apparatus force responses to create one or more of a locally environmentally-compensated calibration table (e.g., compensated or environmentally compensated calibration table 2018) specific to particular regions of the FSM (e.g., FSM 502/504, 602/604, 702/704, 1302/1304) or a globally environmentally-compensated calibration table (e.g., compensated or environmentally compensated calibration table 2018) applied globally to the FSM (e.g., FSM 502/504, 602/604, 702/704, 1302/1304), for example, as further described herein regarding FIG. 20. In still other non-limiting aspects, exemplary apparatus (e.g., an exemplary resistive force or touch sensor device (e.g., exemplary resistive force or touch sensor device associated with FSM 502/504, 602/604, 702/704, 1302/1304)) can further comprise means for one or more of deriving or employing the environmental compensation factor based on one or more of sheet resistance associated with the FSM (e.g., FSM 502/ 504, 602/604, 702/704, 1302/1304) or a temperature associated with the FSM (e.g., FSM 502/504, 602/604, 702/704, 1302/1304) or deriving humidity data associated with the apparatus based on the sheet resistance, the temperature associated with the FSM (e.g., FSM 502/504, 602/604, 702/704, 1302/1304), and the predetermined calibration table (e.g., initial or permanent calibration table 2010).

In view of the structures and devices described supra, methodologies that can be implemented in accordance with the disclosed subject matter will be better appreciated with reference to the flowcharts of FIGS. 19-23. While for purposes of simplicity of explanation, the methodologies are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methodologies described hereinafter.

Exemplary Methods

FIGS. 19-20 depict non-limiting flow diagrams demonstrating an overview of exemplary methods associated with developing, manufacturing, and operating an environmental compensation element, in accordance with various aspects described herein. For instance, FIG. 19 depicts a non-limiting flow diagram 1900 demonstrating an overview of exemplary methods associated with an environmental compensation element, in accordance with various aspects described herein.

As a non-limiting example, at 1902, FIG. 19 depicts operations that can be performed in the manufacture of exemplary resistive force or touch sensor devices (e.g., exemplary resistive force or touch sensor device associated with FSM 502/504, 602/604, 702/704, 1302/1304), for example, as further described herein regarding FIGS. 1-14 and 20-21. As a non-limiting aspect, exemplary FSR material or ink (e.g., FSR material or ink 504, 604, 704, 1306) formulation can be characterized, for example, as further described herein regarding FIG. 21.

In a non-limiting aspect, exemplary FSR material or ink (e.g., FSR material or ink 504, 604, 704, 1306) formulation resistance can be measured throughout a range of temperatures and humidity (e.g., temperatures and humidity expected during end use.) to create FSR material or ink (e.g., FSR material or ink 504, 604, 704, 1306) formulation property table. In a further non-limiting aspect, FSR material or ink (e.g., FSR material or ink 504, 604, 704, 1306) formulation property table that relates at least sheet resistance associated with the FSR material or ink (e.g., FSR material or ink 504, 604, 704, 1306) as a function of temperature and relative humidity can be stored in a memory. As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In another non-limiting example, at 1904, FIG. 19 depicts further operations that can be performed in the manufacture of exemplary resistive force or touch sensor devices (e.g., exemplary resistive force or touch sensor device associated with FSM 502/504, 602/604, 702/704, 1302/1304), for example, as further described herein regarding FIGS. 1-14 and 20-21. For instance, an exemplary FSM (e.g., FSM 502/504, 602/604, 702/704, 1302/1304) with ECE or FSM contacts (e.g., FSM electrical contacts 514, 614, 810, 1204, 1306) can be prepared, as further described herein regarding FIGS. 5-14 and 21. In another non-limiting aspect, an exemplary FSM (e.g., FSM 502/504, 602/604, 702/704, 1302/1304) can be assembled or laminated to a PCB or other electrode substrate (e.g., PCB or other electrode substrate 512, 612, 1100, 1308) having corresponding PCB electrical contacts (e.g., PCB electrical contacts 516, 616, 1106, 1310), for example, as further described herein regarding FIGS. 7-14. In yet another further non-limiting aspect, after application of any conductive adhesive establishing electrical contact between FSM electrical contacts (e.g., FSM electrical contacts 514, 614, 810, 1204, 1306) and PCB electrical contacts (e.g., PCB electrical contacts 516, 616, 1106, 1310), and any required cure processes, as further described herein, a basic function test of the assembly can be performed. In a further non-limiting aspect, an exemplary basic function test can comprise a continuity check (e.g., continuity check between PCB electrical contacts (e.g., PCB electrical contacts 516, 616, 1106, 1310) and across the FSR material or ink (e.g., FSR material or ink 504, 604, 704, 1306) of the FSM (e.g., FSM 502/504, 602/604, 702/704, 1302/1304)).

FIG. 19 further depicts, at 1904, FSR material or ink (e.g., FSR material or ink 504, 604, 704, 1306) formulation property table storage, such as, for example, storage in a memory associated with exemplary resistive force or touch sensor devices (e.g., exemplary resistive force or touch sensor device associated with FSM 502/504, 602/604, 702/704, 1302/1304). As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In still another non-limiting aspect, resistance of an exemplary ECE can be measured (e.g., $R_0$) and ECE resistance (e.g., $R_0$) as a value of sheet resistance of the FSM (e.g., FSM 502/504, 602/604, 702/704, 1302/1304) determined during manufacture (e.g., ECE resistance, $R_0$) of the exemplary resistive force or touch sensor devices (e.g., exemplary resistive force or touch sensor device associated with FSM 502/504, 602/604, 702/704, 1302/1304) can be stored (e.g., stored in a memory). As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

At this point, it should be understood that a reference to ECE resistance (e.g., $R_0$ or initial ECE resistance, $R_n$ or ECE resistance at time n) can refer, similar to the continuity check (albeit with potentially different measurement schemes), to measuring resistance across the exemplary ECE. In a non-limiting aspect, measurement of ECE resistance can refer to a measurement of resistance or other electrical characteristic associated with resistance between PCB electrical contacts (e.g., PCB electrical contacts 516, 616, 1106, 1310) and across the FSR material or ink (e.g., FSR material or ink 504, 604, 704, 1306) of the FSM (e.g., FSM 502/504, 602/604, 702/704, 1302/1304). As it is understood that the desired property is the resistance of the FSR material or ink (e.g., FSR material or ink 504, 604, 704, 1306) of the FSM (e.g., FSM 502/504, 602/604, 702/704, 1302/1304) between the FSM electrical contacts (e.g., FSM electrical contacts 514, 614, 810, 1204, 1306) as the property of interest relative to environmental compensation of an exemplary resistive force or touch sensor devices (e.g., exemplary resistive force or touch sensor device associated with FSM 502/504, 602/604, 702/704, 1302/1304), any suitable method for measuring an electrical characteristic that is relatable to or representative of this resistance for the purposes of environmental compensation of the exemplary resistive force or touch sensor devices (e.g., exemplary resistive force or touch sensor device associated with FSM 502/504, 602/604, 702/704, 1302/1304) is sufficiently defined as measuring resistance across the ECE.

In addition, temperature associated with the FSM (e.g., FSM 502/504, 602/604, 702/704, 1302/1304) (e.g., from temperature sensor associated with the FSM 502/504, 602/604, 702/704, 1302/1304), can be measured and/or stored in a memory. In a non-limiting aspect, a temperature sensor, depending on context, can be associated with exemplary resistive force or touch sensor devices (e.g., exemplary resistive force or touch sensor device associated with FSM 502/504, 602/604, 702/704, 1302/1304) either as a portion of sensor 200, a portion of an exemplary resistive force or touch sensor device (e.g., exemplary resistive force or touch sensor device associated with FSM 502/504, 602/604, 702/704, 1302/1304), a portion of pointing device 408, computing device 402, such as described herein regarding FIGS. 5 and 18, or a facility of manufacture associated with manufacturing exemplary resistive force or touch sensor devices (e.g., exemplary resistive force or touch sensor device associated with FSM 502/504, 602/604, 702/704, 1302/1304). In a further non-limiting aspect, such temperature can be employed in the subsequent determination of relative humidity, as further described herein, based on subsequent determinations of temperature (e.g., from temperature sensor associated with the FSM 502/504, 602/604, 702/704, 1302/1304). As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In yet another non-limiting aspect, a temperature and relative humidity associated with the FSM (e.g., FSM 502/504, 602/604, 702/704, 1302/1304) (e.g., during manufacture measuring environment of the facility) can be stored (e.g., stored in a memory). In contrast to the above, in a non-limiting aspect, temperature and relative humidity is typically associated with a facility of manufacture associated with manufacturing exemplary resistive force or touch sensor devices (e.g., exemplary resistive force or touch sensor device associated with FSM 502/504, 602/604, 702/704, 1302/1304) and can be provided via sensors specifically configured and suited to the measurement and recording of the temperature and relative humidity associated with the FSM (e.g., FSM 502/504, 602/604, 702/704, 1302/1304). As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In still further non-limiting aspects, a geometry correction factor associated with the FSM (e.g., FSM 502/504, 602/604, 702/704, 1302/1304) defined as a relation between measured resistance of ECE (e.g., R0) and the FSR material or ink (e.g., FSR material or ink 504, 604, 704, 1306) formulation property table that relates sheet resistance as a function of temperature and relative humidity can be determined.

As further described herein, recorded values including, but not limited to, temperatures, relative humidity, electrical characteristics, correction factors, and the like, can be stored and/or retrieved from a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In another non-limiting example, at 1904, FIG. 19 depicts further operations that can be performed in the operation of exemplary resistive force or touch sensor devices (e.g., exemplary resistive force or touch sensor device associated with FSM 502/504, 602/604, 702/704, 1302/1304), for example, as further described herein regarding FIGS. 1-14 and 20-23. In typical operation of an exemplary resistive force or touch sensor device (e.g., exemplary resistive force or touch sensor device associated with FSM 502/504, 602/604, 702/704, 1302/1304), monitoring, measuring, recording, and/or storing in (or retrieving from) a memory a resistance of the ECE at any time n (e.g., $R_n$) can be conducted periodically, continuously, at predetermined times or at predetermined intervals, or based on other considerations, typically without interruption of the normal operation (e.g., when a force applied or touch is not being detected) of the exemplary resistive force or touch sensor devices (e.g., exemplary resistive force or touch sensor device associated with FSM 502/504, 602/604, 702/704, 1302/1304), in non-limiting aspects. In further non-limiting aspect, exemplary resistive force or touch sensor devices (e.g., exemplary resistive force or touch sensor device associated with FSM 502/504, 602/604, 702/704, 1302/1304) can be first determined to be not in use prior to attempting to measure resistance of the ECE at any time n (e.g., $R_{n+}$).

In addition, with a temperature sensor associated with the FSM (e.g., FSM 502/504, 602/604, 702/704, 1302/1304) a temperature associated with the FSM (e.g., FSM 502/504, 602/604, 702/704, 1302/1304) (e.g., from temperature sensor associated with the FSM 502/504, 602/604, 702/704, 1302/1304), such as described herein regarding FIGS. 5 and 18, if available, can be monitored, measured, recorded, and/or stored in (or retrieved from) a memory, in further non-limiting aspects. As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

As further described herein, regarding FIG. 19, for example, a correction factor associated with the FSM (e.g., FSM 502/504, 602/604, 702/704, 1302/1304) can be determined, based on one or more of the temperature associated with the FSM 502/504, 602/604, 702/704, 1302/1304, the geometry correction factor, resistance of the ECE, temperature associated with the FSM 502/504, 602/604, 702/704, 1302/1304.

Further non-limiting aspects of the manufacture and/or operation of exemplary resistive force or touch sensor devices (e.g., exemplary resistive force or touch sensor device associated with FSM 502/504, 602/604, 702/704, 1302/1304) are described herein, regarding FIGS. 20-23, for example.

For instance, FIG. 20 depicts a further non-limiting flow diagram 2000 demonstrating an overview of further exemplary methods associated with an environmental compensation element, in accordance with various aspects described herein. As a non-limiting example, at 2002, FIG. 20 depicts operations that can be performed in the manufacture 2002 and operation 2004 of exemplary resistive force or touch sensor devices (e.g., exemplary resistive force or touch sensor device associated with FSM 502/504, 602/604, 702/704, 1302/1304), for example, as further described herein regarding FIGS. 1-19 and 21-23.

Thus, at 2006, FIG. 20 depicts operations that can be performed in the manufacture 2002 of exemplary resistive force or touch sensor devices (e.g., exemplary resistive force or touch sensor device associated with FSM 502/504, 602/604, 702/704, 1302/1304), for example, as further described herein regarding FIGS. 1-19 and 21-23. As described above regarding FIG. 19, for example, resistance of an exemplary ECE can be measured (e.g., $R_0$) and ECE resistance (e.g., $R_0$) as a value of sheet resistance of the FSM (e.g., FSM 502/504, 602/604, 702/704, 1302/1304) determined during manufacture (e.g., ECE resistance, R0) of the exemplary resistive force or touch sensor devices (e.g., exemplary resistive force or touch sensor device associated with FSM 502/504, 602/604, 702/704, 1302/1304) can be stored (e.g., stored in a memory). As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose. Thus, ECE1 and ECE2 represent two contacts of the two or more contacts by which to obtain initial ECE resistance during manufacture (e.g., $R_0$). As further described above regarding FIG. 19, as it is understood that the desired property is the resistance of the FSR material or ink (e.g., FSR material or ink 504, 604, 704, 1306) of the FSM (e.g., FSM 502/504, 602/604, 702/704, 1302/1304) between the FSM electrical contacts (e.g., FSM electrical contacts 514, 614, 810, 1204, 1306) as the property of interest relative to environmental compensation of an exemplary resistive force or touch sensor device (e.g., exemplary resistive force or touch sensor device associated with FSM 502/504, 602/604, 702/704, 1302/1304), any suitable method for measuring an electrical characteristic that is relatable to or representative of this resistance for the purposes of environmental compensation of the exemplary resistive force or touch sensor devices (e.g., exemplary resistive force or touch sensor device associated with FSM 502/504, 602/604, 702/704, 1302/1304) is sufficiently defined as measuring resistance across the ECE (e.g., between ECE1 and ECE2, either at time 0, or at time n).

In addition, at 2008, FIG. 20 depicts operations that can be performed in the manufacture 2002 of exemplary resistive force or touch sensor devices (e.g., exemplary resistive force or touch sensor device associated with FSM 502/504, 602/604, 702/704, 1302/1304), for example, as further described herein regarding FIGS. 1-19 and 21-23. For instance, an exemplary resistive force or touch sensor device (e.g., exemplary resistive force or touch sensor device associated with FSM 502/504, 602/604, 702/704, 1302/1304) associated with a grouping of sensor electrodes associated with a force/pressure grid array (e.g., VIA 210) can be calibrated initial by measuring location (e.g., X and Y coordinates in a two dimensional grid), force applied, and resistance or other electrical characteristic indicative of the force applied to the exemplary resistive force or touch sensor device associated with FSM 502/504, 602/604, 702/704, 1302/1304 with suitable calibration equipment (e.g., Ultron), which information can be stored in a memory. As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In a non-limiting aspect, collecting and storing this information during manufacture can establish permanent values in a memory associated with the exemplary resistive force or touch sensor device associated with FSM 502/504, 602/604, 702/704, 1302/1304 provides an initial calibration that relates certain values of output "counts" from the exemplary resistive force or touch sensor device associated with FSM 502/504, 602/604, 702/704, 1302/1304 to an actual force applied by an end user as measured initial by the suitable calibration equipment (e.g., Ultron). In a further aspect, because force applied by the suitable calibration equipment (e.g., Ultron), the X-Y location of the applied force, and output "counts" can be collected simultaneously and stored for later use, the resulting data can comprise an initial or permanent calibration table 2010 associated with the exemplary resistive force or touch sensor device associated with FSM 502/504, 602/604, 702/704, 1302/1304 for use in operation of the exemplary resistive force or touch sensor device associated with FSM 502/504, 602/604, 702/704, 1302/1304 throughout the life of the exemplary resistive force or touch sensor device associated with FSM 502/504, 602/604, 702/704, 1302/1304.

In a further non-limiting aspect, applied force, X-Y location of the applied force, and output "counts" can be collected simultaneously and stored global as one or more of a global calibration table or a local calibration table as the initial calibration table 2010. As a non-limiting example, applied force, X-Y location of the applied force, and output "counts" can be collected simultaneously, and an average relationship of applied force to output "count" at each force level can be determined by averaging together all X-Y locations, and the resultant global calibration table stored in a memory associated with the exemplary resistive force or touch sensor device associated with FSM 502/504, 602/604, 702/704, 1302/1304, which can be employed throughout the life of the exemplary resistive force or touch sensor device associated with FSM 502/504, 602/604, 702/704, 1302/1304 to relate output counts to a force applied in operation of the exemplary resistive force or touch sensor device associated with FSM 502/504, 602/604, 702/704, 1302/1304. In a further non-limiting example, applied force, X-Y location of the applied force, and output "counts" can be collected simultaneously, and the relationship of applied force to output "count" at each X-Y location can be determined, and the resultant local calibration table stored in a memory as a matrix of specific, local X-Y values associated with the exemplary resistive force or touch sensor device associated with FSM 502/504, 602/604, 702/704, 1302/1304, which can be employed throughout the life of the exemplary resistive force or touch sensor device associated with FSM 502/504, 602/604, 702/704, 1302/1304 to relate output counts to a force applied in operation of the exemplary resistive force or touch sensor device associated with FSM 502/504, 602/604, 702/704, 1302/1304. As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose.

In a further non-limiting example, at 2012, FIG. 20 depicts operations that can be performed in the operation 2004 of exemplary resistive force or touch sensor devices (e.g., exemplary resistive force or touch sensor device associated with FSM 502/504, 602/604, 702/704, 1302/1304), for example, as further described herein regarding FIGS. 1-19 and 21-23. Thus, as described above, at time n, resistance between ECE1 and ECE2 of an exemplary ECE can be measured (e.g., $R_n$) and ECE resistance (e.g., $R_n$) as a value of sheet resistance of the FSM (e.g., FSM 502/504, 602/604, 702/704, 1302/1304) determined during operation (e.g., ECE resistance, Rn) of the exemplary resistive force or touch sensor devices (e.g., exemplary resistive force or touch sensor device associated with FSM 502/504, 602/604, 702/704, 1302/1304) can be stored (e.g., stored in a memory). As further described herein, a memory associated with exemplary resistive force or touch sensor devices (e.g., exemplary resistive force or touch sensor device associated with FSM 502/504, 602/604, 702/704, 1302/1304) can comprise one or more of nonvolatile memory 344, memory 406, memory 410, portions or combinations thereof, or other suitable memory particularly selected and suitable for the purpose. As further described above regarding FIG. 19, as it is understood that the desired property is the resistance of the FSR material or ink (e.g., FSR material or ink 504, 604, 704, 1306) of the FSM (e.g., FSM 502/504, 602/604, 702/704, 1302/1304) between the FSM electrical contacts (e.g., FSM electrical contacts 514, 614, 810, 1204, 1306) as the property of interest relative to environmental compensation of an exemplary resistive force or touch sensor device (e.g., exemplary resistive force or touch sensor device associated with FSM 502/504, 602/604, 702/704, 1302/1304), any suitable method for measuring an electrical characteristic that is relatable to or representative of this resistance for the purposes of environmental compensation of the exemplary resistive force or touch sensor devices (e.g., exemplary resistive force or touch sensor device associated with FSM 502/504, 602/604, 702/704, 1302/1304) is sufficiently defined as measuring resistance across the ECE (e.g., between ECE1 and ECE2, either at time 0, or at time n).

In another non-limiting example, at 2014, FIG. 20 depicts operations that can be performed in the operation 2004 of exemplary resistive force or touch sensor devices (e.g., exemplary resistive force or touch sensor device associated with FSM 502/504, 602/604, 702/704, 1302/1304), for example, as further described herein regarding FIGS. 1-19 and 21-23. In a non-limiting aspect, a correction factor can be calculated and/or determined based on a comparison of the sheet resistance (e.g., at time n or $R_n$) of the FSM (e.g., FSM 502/504, 602/604, 702/704, 1302/1304) with a sheet resistance of the FSM (e.g., FSM 502/504, 602/604, 702/704, 1302/1304) determined during manufacture of the device (e.g., at time 0 or $R_0$), for example, as further described herein. This correction factor (e.g., $R_n/R_0$) can be stored in a memory associated with exemplary resistive force or touch sensor devices (e.g., exemplary resistive force or touch sensor device associated with FSM 502/504, 602/604, 702/704, 1302/1304). As further described, this correction factor (e.g., $R_n/R_0$) can be employed as an environmental compensation factor to a measurement of a force (e.g., "counts") applied to the FSM (e.g., FSM 502/504, 602/604, 702/704, 1302/1304) in operation of the exemplary resistive force or touch sensor devices (e.g., exemplary resistive force or touch sensor device associated with FSM 502/504, 602/604, 702/704, 1302/1304), for example, according to the disclosed relationship between environmental conditions (e.g., historical and instantaneous) and resistance of an FSM (e.g., FSM 502/504, 602/604, 702/704, 1302/1304) provided by various disclosed embodiments of ECEs as a result of temperature, humidity, and the amount of humidity by absorption and adsorption.

For instance, at 2016, FIG. 20 depicts operations that can be performed in the operation 2004 of exemplary resistive force or touch sensor devices (e.g., exemplary resistive force or touch sensor device associated with FSM 502/504, 602/604, 702/704, 1302/1304), for example, as further described herein regarding FIGS. 1-19 and 21-23. In a non-limiting aspect, this correction factor (e.g., $R_n/R_0$) can be applied (e.g., multiplied by) to the initial or permanent calibration table 2010 associated with the exemplary resistive force or touch sensor device associated with FSM 502/504, 602/604, 702/704, 1302/1304, to generate a compensated or environmentally compensated calibration table 2018 (e.g., a compensated or environmentally compensated global or local calibration table) associated with the exemplary resistive force or touch sensor device associated with FSM 502/504, 602/604, 702/704, 1302/1304 for use in operation, at 2020, of the exemplary resistive force or touch sensor device associated with FSM 502/504, 602/604, 702/704, 1302/1304 throughout the life of the exemplary resistive force or touch sensor device associated with FSM 502/504, 602/604, 702/704, 1302/1304.

As further described above, even though resistance increases with temperature, the sensitivity of exemplary resistive force or touch sensor device associated with FSM 502/504, 602/604, 702/704, 1302/1304 can also increase with temperature. Accordingly, in another non-limiting aspect, a temperature measurement determined via a temperature sensor, such as described herein regarding FIGS. 5 and 18, associated with the exemplary resistive force or touch sensor device associated with FSM 502/504, 602/604, 702/704, 1302/1304 can be stored in or retrieved from a memory, as further described herein and can be further employed to facilitate creation of an environmental compensation factor. In still other non-limiting aspects, exemplary compensation factors can be linear or non-linear and can be applied at the acquisition of the force applied (e.g., "counts") associated with a grouping of sensor electrodes associated with a force/pressure grid array (e.g., VIA 210) or at later stages in the post-process touch/force/contact data process pipeline. As described herein, global calibration factor table can comprise a curve that relates a reading of force applied (e.g., "counts") that is applied globally across the FSM (e.g., FSM 502/504, 602/604, 702/704, 1302/1304) to the whole FSM (e.g., FSM 502/504, 602/604, 702/704, 1302/1304) and scaled based on the correction factor (e.g., $R_n/R_0$). As further described herein, in another aspect, a local calibration table can be applied using specific calibration factor tables that can be applied locally to the respective areas of the FSM (e.g., FSM 502/504, 602/604, 702/704, 1302/1304) and scaled based on the correction factor (e.g., $R_n/R_0$).

Figure 21:
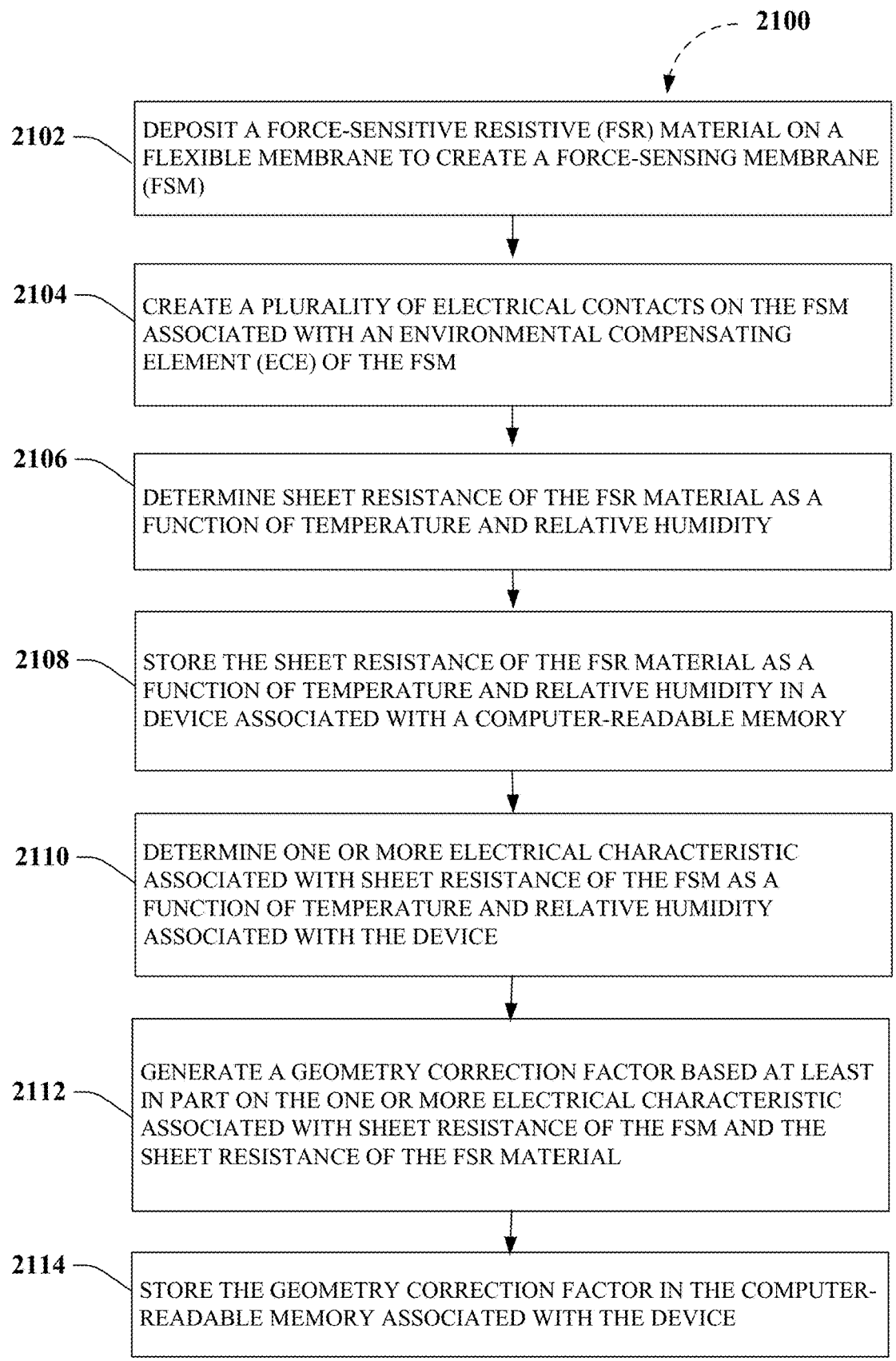
FIG. 21 depicts a non-limiting flow diagram of exemplary methods associated with an environmental compensation element, according to aspects of the disclosed subject matter.

FIG. 21 depicts a non-limiting flow diagram of exemplary methods 2100 associated with an environmental compensation element, according to aspects of the disclosed subject matter. For instance, exemplary methods 2100 can comprise, at 2102, depositing a FSR material (e.g., FSR material or ink 504, 604, 704, 1306) material on a flexible membrane to create a FSM (e.g., FSM 502/504, 602/604, 702/704, 1302/1304), as described herein. At 2104, exemplary methods 2100 can further comprise creating a plurality of or two or more of electrical contacts (e.g., FSM electrical contacts 514, 614, 810, 1204, 1306) on the FSM (e.g., FSM 502/504, 602/604, 702/704, 1302/1304) associated with an ECE of the FSM (e.g., FSM 502/504, 602/604, 702/704, 1302/1304). As a non-limiting example, creating the two or more of electrical contacts (e.g., FSM electrical contacts 514, 614, 810, 1204, 1306) on the FSR material (e.g., FSR material or ink 504, 604, 704, 1306) associated with the ECE can comprise creating the two or more of electrical contacts (e.g., FSM electrical contacts 514, 614, 810, 1204, 1306) on the FSM (e.g., FSM 502/504, 602/604, 702/704, 1302/1304) associated with the ECE, wherein the ECE can be adapted to electrically couple control circuitry configured to determine one or more electrical characteristic associated with sheet resistance of the FSM (e.g., FSM 502/504, 602/604, 702/704, 1302/1304) for use in determination of an environmental compensation factor to a measurement of a force applied to the FSM (e.g., FSM 502/504, 602/604, 702/704, 1302/1304), for example, as further described herein.

In addition, exemplary methods 2100 can comprise, at 2106, determining sheet resistance of the FSR material (e.g., FSR material or ink 504, 604, 704, 1306) as a function of temperature and relative humidity, for example, as further described herein regarding FIGS. 19-20. In another non-limiting aspect, exemplary methods 2100 can comprise, at 2108, storing the sheet resistance of the FSR material (e.g., FSR material or ink 504, 604, 704, 1306) as a function of temperature and relative humidity in a device (e.g., an exemplary resistive force or touch sensor device associated with FSM 502/504, 602/604, 702/704, 1302/1304) associated with a computer-readable memory (e.g., nonvolatile memory 344, memory 406, memory 410, system memory 2006, portions or combinations thereof, or other suitable memory particularly selected and suitable for the purpose).

At 2110, exemplary methods 2100 can further comprise, determining the one or more electrical characteristic associated with sheet resistance of the FSM (e.g., FSM 502/504, 602/604, 702/704, 1302/1304) as a function of temperature and relative humidity associated with the device. As further described herein, regarding FIGS. 19-20, for example, exemplary methods 2100 can further comprise, at 2112, generating a geometry correction factor based on the one or more electrical characteristic associated with sheet resistance of the FSM (e.g., FSM 502/504, 602/604, 702/704, 1302/1304) and the sheet resistance of the FSR material (e.g., FSR material or ink 504, 604, 704, 1306). As a non-limiting example, generating the geometry correction factor can comprise generating the geometry correction factor to facilitate generation of the environmental compensation factor to the measurement of the force applied to the FSM (e.g., FSM 502/504, 602/604, 702/704, 1302/1304), based on the one or more electrical characteristic associated with sheet resistance of the FSM (e.g., FSM 502/504, 602/604, 702/704, 1302/1304) and the geometry correction factor.

In addition, at 2114, exemplary methods 2100 can comprise storing the geometry correction factor in the computer-readable memory associated with the device (e.g., nonvolatile memory 344, memory 406, memory 410, system memory 2006, portions or combinations thereof, or other suitable memory particularly selected and suitable for the purpose).

FIG. 22 depicts yet another non-limiting flow diagram of exemplary methods 2200 associated with an environmental compensation element, in accordance with various aspects described herein. For instance, exemplary methods 2200 can comprise, at 2202, determining one or more electrical characteristic associated with sheet resistance of a FSM (e.g., FSM 502/504, 602/604, 702/704, 1302/1304) of a device (e.g., an exemplary resistive force or touch sensor device associated with FSM 502/504, 602/604, 702/704, 1302/1304) for use in determination of an environmental compensation factor to a measurement of a force applied to the FSM (e.g., FSM 502/504, 602/604, 702/704, 1302/1304). In a non-limiting aspect, determining the one or more electrical characteristic associated with the sheet resistance of the FSM (e.g., FSM 502/504, 602/604, 702/704, 1302/1304) of the device can comprise determining the one or more electrical characteristic via two or more of electrical contacts (e.g., FSM electrical contacts 514, 614, 810, 1204, 1306) electrically coupled across a FSR material or ink (e.g., FSR material or ink 504, 604, 704, 1306) material of the FSM (e.g., FSM 502/504, 602/604, 702/704, 1302/1304) and associated with an ECE of the FSM (e.g., FSM 502/504, 602/604, 702/704, 1302/1304). In another non-limiting aspect, determining the one or more electrical characteristic can comprise generating a voltage proportionate to the sheet resistance, for example, as further described herein.

At 2204, exemplary methods 2200 can further comprise determining a correction factor based on a comparison of the sheet resistance of the FSM (e.g., FSM 502/504, 602/604, 702/704, 1302/1304) with a sheet resistance of the FSM (e.g., FSM 502/504, 602/604, 702/704, 1302/1304) determined during manufacture of the device and stored in a (e.g., nonvolatile memory 344, memory 406, memory 410, system memory 2006, portions or combinations thereof, or other suitable memory particularly selected and suitable for the purpose) associated with the device (e.g., an exemplary resistive force or touch sensor device associated with FSM 502/504, 602/604, 702/704, 1302/1304).

In addition, exemplary methods 2200 can comprise, at 2206, correcting a calibration table (e.g., initial or permanent calibration table 2010) comprising position and force information associated with the FSM (e.g., FSM 502/504, 602/604, 702/704, 1302/1304) of the device with the correction factor to create a compensated calibration table (e.g., compensated or environmentally compensated calibration table 2018) as the environmental compensation factor, for example, as further described herein regarding FIGS. 19-20. In another non-limiting aspect, exemplary methods 2200 can comprise, at 2208, determining one or more of force applied or position of the force applied for a contact with the FSM (e.g., FSM 502/504, 602/604, 702/704, 1302/1304) of the device based on the compensated calibration table (e.g., compensated or environmentally compensated calibration table 2018) as the environmental compensation factor, for example, as further described herein regarding FIGS. 19-20.

At 2210, exemplary methods 2200 can further comprise storing one or more of the one or more electrical characteristic associated with the sheet resistance, the sheet resistance of the FSM (e.g., FSM 502/504, 602/604, 702/704, 1302/1304) determined during manufacture of the device, the calibration table (e.g., initial or permanent calibration table 2010), the correction factor, or the compensated calibration table (e.g., compensated or environmentally compensated calibration table 2018) in the computer-readable memory (e.g., nonvolatile memory 344, memory 406, memory 410, system memory 2006, portions or combinations thereof, or other suitable memory particularly selected and suitable for the purpose) associated with the device (e.g., an exemplary resistive force or touch sensor device associated with FSM 502/504, 602/604, 702/704, 1302/1304).

In addition, at 2212, exemplary methods 2200 can comprise executing, with a processor (e.g., processor 404, processor 410, processing unit 2004) associated with the device (e.g., an exemplary resistive force or touch sensor device associated with FSM 502/504, 602/604, 702/704, 1302/1304), control logic stored in the computer-readable memory (e.g., nonvolatile memory 344, memory 406, memory 410, system memory 2006, portions or combinations thereof, or other suitable memory particularly selected and suitable for the purpose) associated with the device (e.g., an exemplary resistive force or touch sensor device associated with FSM 502/504, 602/604, 702/704, 1302/1304), wherein the control logic can be configured to determine one or more of the correction factor or the compensated calibration table (e.g., compensated or environmentally compensated calibration table 2018) as the environmental compensation factor.

Figure 23:
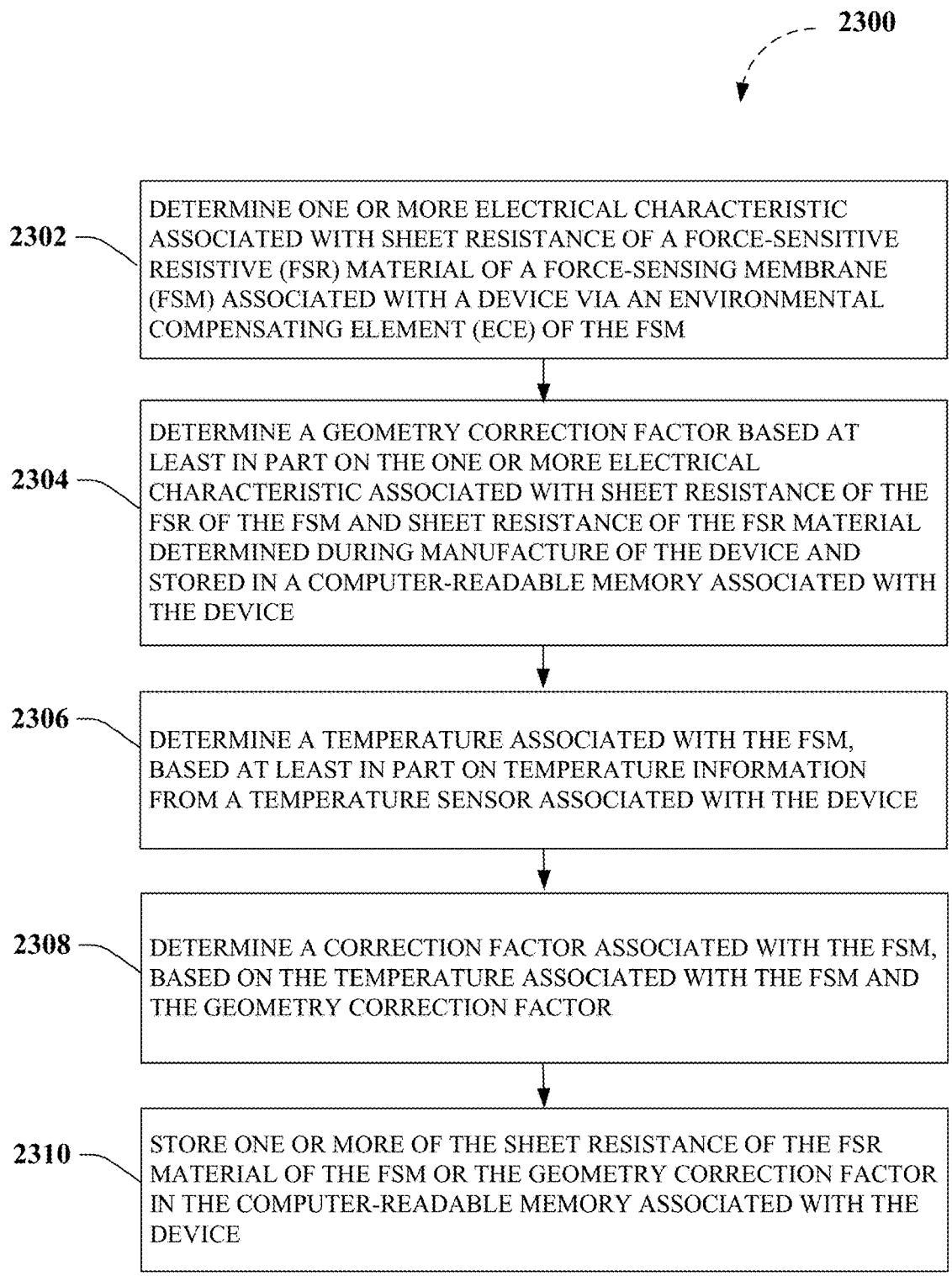
FIG. 23 depicts another non-limiting flow diagram of exemplary methods associated with an environmental compensation element, according to aspects of the disclosed subject matter.

FIG. 23 depicts another non-limiting flow diagram of exemplary methods 2300 associated with an environmental compensation element, according to aspects of the disclosed subject matter. For instance, exemplary methods 2300 can comprise, at 2302, determining one or more electrical characteristic associated with sheet resistance of a FSR material or ink (e.g., FSR material or ink 504, 604, 704, 1306) material of a FSM (e.g., FSM 502/504, 602/604, 702/704, 1302/1304) associated with a device via an ECE of the FSM (e.g., FSM 502/504, 602/604, 702/704, 1302/1304). As a non-limiting example, determining the one or more electrical characteristic associated with the sheet resistance of the FSR of the FSM (e.g., FSM 502/504, 602/604, 702/704, 1302/1304) can comprise determining the one or more electrical characteristic via a two or more of electrical contacts (e.g., FSM electrical contacts 514, 614, 810, 1204, 1306) electrically coupled across the FSR material (e.g., FSR material or ink 504, 604, 704, 1306) of the FSM (e.g., FSM 502/504, 602/604, 702/704, 1302/1304) and associated with the ECE of the FSM (e.g., FSM 502/504, 602/604, 702/704, 1302/1304).

In a further non-limiting example, the determining the one or more electrical characteristic via the two or more of electrical contacts (e.g., FSM electrical contacts 514, 614, 810, 1204, 1306) electrically associated with the ECE of the FSM (e.g., FSM 502/504, 602/604, 702/704, 1302/1304), can comprise determining the one or more electrical characteristic via the two or more of electrical contacts (e.g., FSM electrical contacts 514, 614, 810, 1204, 1306) associated with the ECE of the FSM (e.g., FSM 502/504, 602/604, 702/704, 1302/1304), wherein the ECE can be electrically coupled to a processor (e.g., processor 404, processor 410, processing unit 2004) associated with the device (e.g., an exemplary resistive force or touch sensor device associated with FSM 502/504, 602/604, 702/704, 1302/1304) and configured to execute control logic stored in the computer-readable memory (e.g., nonvolatile memory 344, memory 406, memory 410, system memory 2006, portions or combinations thereof, or other suitable memory particularly selected and suitable for the purpose) associated with the device (e.g., an exemplary resistive force or touch sensor device associated with FSM 502/504, 602/604, 702/704, 1302/1304), wherein the control logic can be configured to determine one or more of the geometry correction factor, the relative humidity, or a compensated calibration table (e.g., compensated or environmentally compensated calibration table 2018) as an environmental compensation factor that relates the one or more electrical characteristic associated with sheet resistance of the FSR of the FSM (e.g., FSM 502/504, 602/604, 702/704, 1302/1304) to one or more of a force applied to the FSM (e.g., FSM 502/504, 602/604, 702/704, 1302/1304) or a location of the force applied to the FSM (e.g., FSM 502/504, 602/604, 702/704, 1302/1304).

At 2304, exemplary methods 2300 can further comprise determining a geometry correction factor based on the one or more electrical characteristic associated with sheet resistance of the FSR of the FSM (e.g., FSM 502/504, 602/604, 702/704, 1302/1304) and sheet resistance of the FSR material (e.g., FSR material or ink 504, 604, 704, 1306) determined during manufacture of the device and stored in a computer-readable memory (e.g., nonvolatile memory 344, memory 406, memory 410, system memory 2006, portions or combinations thereof, or other suitable memory particularly selected and suitable for the purpose) associated with the device (e.g., an exemplary resistive force or touch sensor device associated with FSM 502/504, 602/604, 702/704, 1302/1304), for example, as further described herein regarding FIGS. 19-20. In addition, exemplary methods 2300 can comprise, at 2306, determining a temperature associated with the FSM (e.g., FSM 502/504, 602/604, 702/704, 1302/1304), based on temperature information from a temperature sensor associated with the device, for example, as further described herein regarding FIGS. 19-20.

In another non-limiting aspect, exemplary methods 2300 can comprise, at 2308, determining a correction factor associated with the FSM (e.g., FSM 502/504, 602/604, 702/704, 1302/1304), based on the temperature associated with the FSM (e.g., FSM 502/504, 602/604, 702/704, 1302/1304) and the geometry correction factor, for example, as further described herein regarding FIGS. 19-20. At 2310, exemplary methods 2300 can further comprise, storing one or more of the sheet resistance of the FSR material (e.g., FSR material or ink 504, 604, 704, 1306) of the FSM (e.g., FSM 502/504, 602/604, 702/704, 1302/1304) or the geometry correction factor in the computer-readable memory (e.g., nonvolatile memory 344, memory 406, memory 410, system memory 2006, portions or combinations thereof, or other suitable memory particularly selected and suitable for the purpose) associated with the device (e.g., an exemplary resistive force or touch sensor device associated with FSM 502/504, 602/604, 702/704, 1302/1304).

FIG. 24 demonstrates exemplary performance characteristics 2400 associated with non-limiting embodiments described herein. For instance, as described above regarding FIG. 18, an exemplary environmental compensation element 1814 can account for environmental factors, such as temperature 1808, humidity and time 1810, to determine an exemplary correction factor or environmental compensation factor 1820 to facilitate correction or compensation of an uncorrected sensor response 1804 to determine an ECE-corrected sensor response or compensated sensor response 1806, as further described herein. As can be seen in FIG. 24, maximum $\Delta_{ECE}$ of the ECE-corrected sensor response or compensated sensor response 1806 is +0.5%, −4.1%, whereas maximum Δ of the uncorrected sensor response 1804 is +3.3%, −7.0%, thus resulting in an ECE 1814 correction reduced sensor response (e.g., from uncorrected sensor response 1804 to ECE-corrected sensor response or compensated sensor response 1806) deviation from −7.0% to −4.1%.

While the disclosed subject matter has been described in connection with the preferred embodiments of the various figures, it is to be understood that other similar embodiments may be used or modifications and additions may be made to the described embodiments for performing the same function of the disclosed subject matter without deviating there from. For example, one skilled in the art will recognize that aspects of the disclosed subject matter as described in the various embodiments of the present application may apply to other configurations of touch or force-sensing sensors or other sensors that would benefit from the disclosed environmental compensation techniques.

In other instances, variations of process parameters (e.g., dimensions, configuration, concentrations, concentration profiles, process step timing and order, addition and/or deletion of process steps, addition of pre-processing and/or post-processing steps) may be made to further optimize the provided structures, devices and methodologies, as shown and described herein. In any event, the structures and devices, as well as the associated methodologies described herein have many applications in the field of environmental compensation of sensors. Therefore, the disclosed subject matter should not be limited to any single embodiment described herein, but rather should be construed in breadth and scope in accordance with the appended claims.

Exemplary Computing Environment

Figure 25:
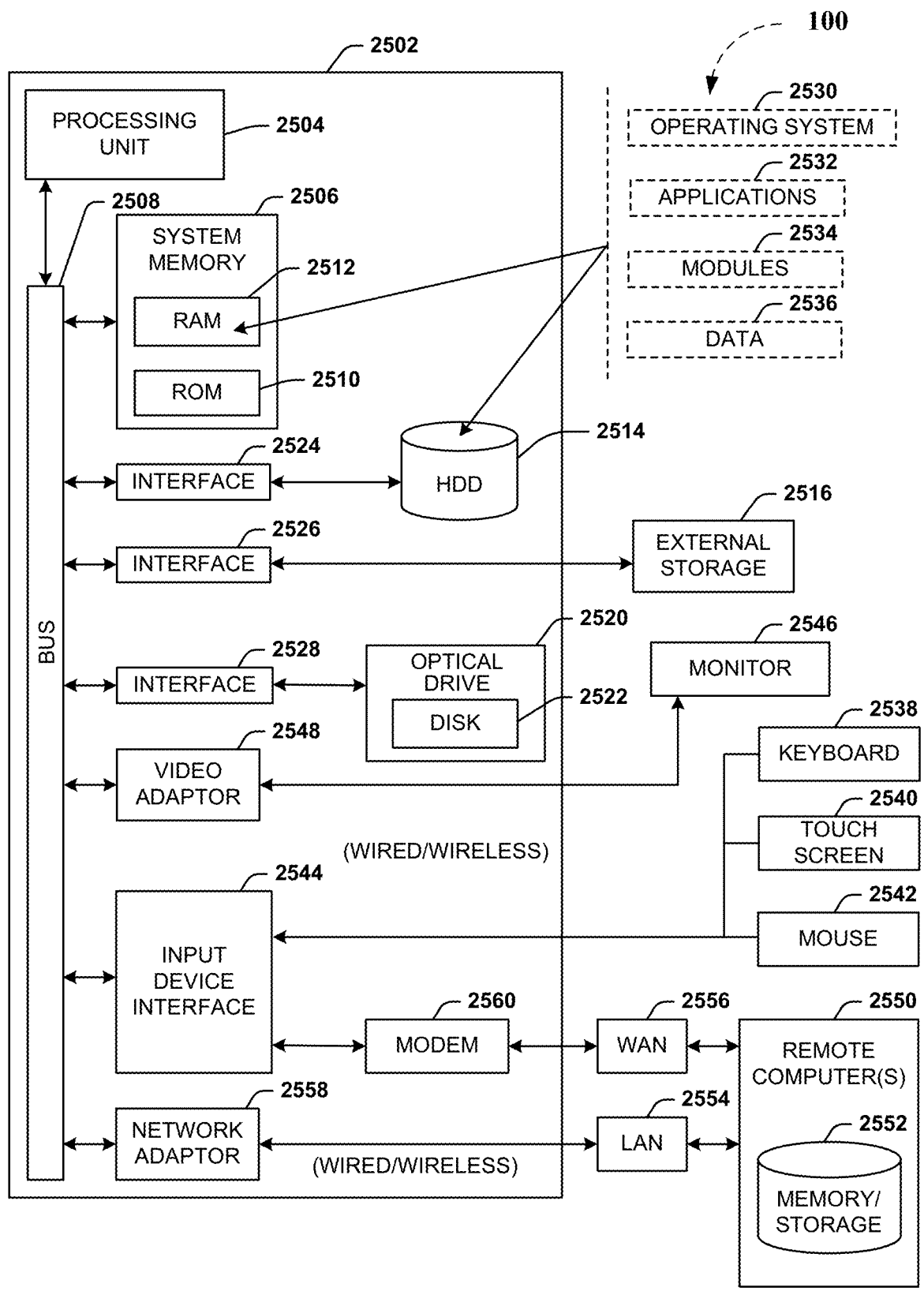
FIG. 25 depicts a functional block-diagram of an exemplary computing device suitable for practicing various non-limiting aspects described herein.

FIG. 25 depicts a functional block-diagram of an exemplary computing device suitable for practicing various non-limiting aspects described herein. In order to provide additional context for various embodiments described herein, FIG. 25 and the following discussion are intended to provide a brief, general description of a suitable computing environment 2500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and related data, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 25, the example environment 2500 for implementing various embodiments of the aspects described herein includes a computer 2502, the computer 2502 including a processing unit 2504, a system memory 2506 and a system bus 2508. The system bus 2508 couples system components including, but not limited to, the system memory 2506 to the processing unit 2504. The processing unit 2504 can be any of various commercially available processors. Dual microprocessors and other multi-processor architectures can also be employed as the processing unit 2504.

The system bus 2508 can be any of several types of bus structure that can further interconnect to a memory bus (with or without a memory controller), a peripheral bus, and a local bus using any of a variety of commercially available bus architectures. The system memory 2506 includes ROM 2510 and RAM 2512. A basic input/output system (BIOS) can be stored in a non-volatile memory such as ROM, erasable programmable read only memory (EPROM), EEPROM, which BIOS contains the basic routines that help to transfer information between elements within the computer 2502, such as during startup. The RAM 2512 can also include a high-speed RAM such as static RAM for caching data.

The computer 2502 further includes an internal hard disk drive (HDD) 2514 (e.g., EIDE, SATA), one or more external storage devices 2516 (e.g., a magnetic floppy disk drive (FDD) 2516, a memory stick or flash drive reader, a memory card reader, and similar devices) and an optical disk drive 2520 (e.g., which can read or write from a CD-ROM disc, a DVD, a BD, and similar devices). While the internal HDD 2514 is illustrated as located within the computer 2502, the internal HDD 2514 can also be configured for external use in a suitable chassis (not shown). Additionally, while not shown in environment 2500, a solid state drive (SSD) could be used in addition to, or in place of, an HDD 2514. The HDD 2514, external storage device(s) 2516 and optical disk drive 2520 can be connected to the system bus 2508 by an HDD interface 2524, an external storage interface 2526 and an optical drive interface 2528, respectively. The interface 2524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2512, including an operating system 2530, one or more application programs 2532, other program modules 2534 and program data 2536. All or portions of the operating system, applications, modules, and/or data can also be cached in the RAM 2512. The systems and methods described herein can be implemented utilizing various commercially available operating systems or combinations of operating systems.

Computer 2502 can optionally comprise emulation technologies. For example, a hypervisor (not shown) or other intermediary can emulate a hardware environment for operating system 2530, and the emulated hardware can optionally be different from the hardware illustrated in FIG. 25. In such an embodiment, operating system 2530 can comprise one virtual machine (VM) of multiple VMs hosted at computer 2502. Furthermore, operating system 2530 can provide runtime environments, such as the Java runtime environment or the .NET framework, for applications 2532. Runtime environments are consistent execution environments that allow applications 2532 to run on any operating system that includes the runtime environment. Similarly, operating system 2530 can support containers, and applications 2532 can be in the form of containers, which are lightweight, standalone, executable packages of software that include, e.g., code, runtime, system tools, system libraries and settings for an application.

Further, computer 2502 can be enable with a security module, such as a trusted processing module (TPM). For instance with a TPM, boot components hash next in time boot components, and wait for a match of results to secured values, before loading a next boot component. This process can take place at any layer in the code execution stack of computer 2502, e.g., applied at the application execution level or at the operating system (OS) kernel level, thereby enabling security at any level of code execution.

A user can enter commands and information into the computer 2502 through one or more wired/wireless input devices, e.g., a keyboard 2538, a touch screen 2540, and a pointing device, such as a mouse 2542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2504 through an input device interface 2544 that can be coupled to the system bus 2508, but can be connected by other interfaces, such as a parallel port, an IEEE 1394 serial port, a game port, a USB port, an IR interface, a BLUETOOTH® interface, and similar interfaces.

A monitor 2546 or other type of display device can be also connected to the system bus 2508 via an interface, such as a video adapter 2548. In addition to the monitor 2546, a computer typically includes other peripheral output devices (not shown), such as speakers, printers, and similar devices.

The computer 2502 can operate in a networked environment using logical connections via wired and/or wireless communications to one or more remote computers, such as a remote computer(s) 2550. The remote computer(s) 2550 can be a workstation, a server computer, a router, a personal computer, portable computer, microprocessor-based entertainment appliance, a peer device or other common network node, and typically includes many or all of the elements described relative to the computer 2502, although, for purposes of brevity, only a memory/storage device 2552 is illustrated. The logical connections depicted include wired/wireless connectivity to a local area network (LAN) 2554 and/or larger networks, e.g., a wide area network (WAN) 2556. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 can be connected to the local network 2554 through a wired and/or wireless communication network interface or adapter 2558. The adapter 2558 can facilitate wired or wireless communication to the LAN 2554, which can also include a wireless access point (AP) disposed thereon for communicating with the adapter 2558 in a wireless mode.

When used in a WAN networking environment, the computer 2502 can include a modem 2560 or can be connected to a communications server on the WAN 2556 via other means for establishing communications over the WAN 2556, such as by way of the Internet. The modem 2560, which can be internal or external and a wired or wireless device, can be connected to the system bus 2508 via the input device interface 2544. In a networked environment, program modules depicted relative to the computer 2502 or portions thereof, can be stored in the remote memory/storage device 2552. It will be appreciated that the network connections shown are example and other means of establishing a communications link between the computers can be used.

When used in either a LAN or WAN networking environment, the computer 2502 can access cloud storage systems or other network-based storage systems in addition to, or in place of, external storage devices 2516 as described above. Generally, a connection between the computer 2502 and a cloud storage system can be established over a LAN 2554 or WAN 2556 e.g., by the adapter 2558 or modem 2560, respectively. Upon connecting the computer 2502 to an associated cloud storage system, the external storage interface 2526 can, with the aid of the adapter 2558 and/or modem 2560, manage storage provided by the cloud storage system as it would other types of external storage. For instance, the external storage interface 2526 can be configured to provide access to cloud storage sources as if those sources were physically connected to the computer 2502.

The computer 2502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, bin), and telephone. This can include Wireless Fidelity (Wi-Fi) and BLUETOOTH® wireless technologies. Thus, the communication can be a predefined structure as with a conventional network or simply an ad hoc communication between at least two devices.

What has been described above includes examples of the embodiments of the disclosed subject matter. It is, of course, not possible to describe every conceivable combination of configurations, components, and/or methods for purposes of describing the claimed subject matter, but it is to be appreciated that many further combinations and permutations of the various embodiments are possible. Accordingly, the claimed subject matter is intended to embrace all such alterations, modifications, and variations that fall within the spirit and scope of the appended claims. While specific embodiments and examples are described in disclosed subject matter for illustrative purposes, various modifications are possible that are considered within the scope of such embodiments and examples, as those skilled in the relevant art can recognize.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word, "exemplary," is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while an aspect may have been disclosed with respect to only one of several embodiments, such feature may be combined with one or more other features of the other embodiments as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements. Numerical data, such as voltages, ratios, and the like, are presented herein in a range format. The range format is used merely for convenience and brevity. The range format is meant to be interpreted flexibly to include not only the numerical values explicitly recited as the limits of the range, but also to include all the individual numerical values or sub-ranges encompassed within the range as if each numerical value and sub-range is explicitly recited. When reported herein, any numerical values are meant to implicitly include the term "about." Values resulting from experimental error that can occur when taking measurements are meant to be included in the numerical values.

What is claimed is:

1. A system, comprising:
   a force-sensing membrane (FSM);
   at least two electrical contacts of the FSM, spaced apart on and in contact with an area of force-sensing resistive (FSR) material coating on a surface of the FSM;
   a two-dimensional array of electrodes associated with the FSM adapted to make electrical contact representative of physical contact with the FSM at respective locations of the two-dimensional array with a force applied to the FSM, where the at least two electrical contacts are configured to allow sheet resistance measurement of the FSM during operation of the system;
   an environmental compensating element (ECE) configured to allow measurement of at least one electrical characteristic associated with the sheet resistance for determination of an environmental compensation factor to a measurement of a force applied to the FSM in operation of the system;
   control circuitry electrically coupled to the at least two electrical contacts and configured to allow measurement of the at least one electrical characteristic associated with the sheet resistance for use as the environmental compensation factor;
   a memory comprising computer executable instructions, algorithms, and control logic for operation and environmental compensation of the system; and
   a processor configured to execute at least one of the computer executable instructions, algorithms, or control logic, wherein the at least one of the computer executable instructions, algorithms, or control logic is configured to determine a variable factor, based at least in part on the environmental compensation factor, applied to modify values in a pre-determined calibration table of the FSM to create an environmentally-compensated calibration table for the FSM.

2. The system of claim 1, wherein the ECE comprises a conductive ink.

3. The system of claim 1, wherein the ECE comprises a silver-based conductive ink or another low-resistance material.

4. The system of claim 1, further comprising:
   a printed circuit board (PCB) comprising the two-dimensional array of electrodes adapted to complete the electrical contact of the two-dimensional array of electrodes associated with the FSM.

5. The system of claim 4, wherein the ECE further comprises a conductive adhesive located between at least two electrical contacts of the FSM and a corresponding set of contacts on the PCB that forms low-resistance electrical coupling between the FSM and the PCB.

6. The system of claim 5, wherein the conductive adhesive comprises at least one of a liquid conductive adhesive or a dry film conductive adhesive.

7. The system of claim 5, wherein the conductive adhesive comprises a conductive epoxy.

8. The system of claim 1, wherein the control circuitry is configured to generate a voltage proportionate to the sheet resistance.

9. The system of claim 1, wherein the at least one of the computer executable instructions, algorithms, or control logic is configured to determine the variable factor based at least in part on the sheet resistance.

* * * * *